(12) United States Patent
Miller et al.

(10) Patent No.: US 12,002,055 B1
(45) Date of Patent: Jun. 4, 2024

(54) ADAPTABLE PROCESSING FRAMEWORK

(71) Applicant: PROGRESSIVE CASUALTY INSURANCE COMPANY, Mayfield Village, OH (US)

(72) Inventors: Amanda Miller, Mayfield Village, OH (US); Ruei Chen, Mayfield Village, OH (US); Ben Siegel, Mayfield Village, OH (US); Thomas Nebesar, Mayfield Village, OH (US); Bret Phillips, Mayfield Village, OH (US); Atul Ojha, Mayfield Village, OH (US)

(73) Assignee: PROGRESSIVE CASUALTY INSURANCE COMPANY, Mayfield Village, OH (US)

( * ) Notice: Subject to any disclaimer, the term of this patent is extended or adjusted under 35 U.S.C. 154(b) by 0 days.

(21) Appl. No.: 18/367,998

(22) Filed: Sep. 13, 2023

(51) Int. Cl.
| | |
|---|---|
| *G06Q 20/40* | (2012.01) |
| *G06F 21/53* | (2013.01) |
| *G06Q 20/38* | (2012.01) |
| *G06Q 30/0601* | (2023.01) |

(52) U.S. Cl.
CPC ......... *G06Q 20/4016* (2013.01); *G06F 21/53* (2013.01); *G06Q 20/389* (2013.01); *G06Q 30/0631* (2013.01)

(58) Field of Classification Search
None
See application file for complete search history.

(56) References Cited

U.S. PATENT DOCUMENTS

| | | | |
|---|---|---|---|
| 6,064,987 | A | 5/2000 | Walker et al. |
| 6,315,193 | B1 | 11/2001 | Hogan |
| 6,793,131 | B2 | 9/2004 | Hogan |
| 7,542,935 | B2 | 6/2009 | Fuentes-torres |
| 7,676,425 | B1 | 3/2010 | Noles |
| 8,095,459 | B2 | 1/2012 | Noles |
| 8,165,941 | B2 | 4/2012 | Fuentes-torres |
| 8,290,864 | B2 | 10/2012 | Raz et al. |
| 8,326,747 | B2 | 12/2012 | Ang et al. |
| 8,374,936 | B2 | 2/2013 | Fuentes-Torres |
| 8,554,668 | B2 | 10/2013 | Hogan |
| 8,589,284 | B2 | 11/2013 | Ang et al. |
| 8,666,880 | B2 | 3/2014 | Ang et al. |
| 8,706,624 | B2 | 4/2014 | Don et al. |

(Continued)

*Primary Examiner* — Ajit Patel
(74) *Attorney, Agent, or Firm* — Lempia Summerfield Katz LLC

(57) ABSTRACT

A system delivers access to remote resources and remote data across geographic regions through a parallel circuit that transfers data between components. The system includes a volatile memory and processors that read to and write to the volatile memory. A computer readable medium storing a program in a non-transitory media provides access to remote resources locally by processing requests received from different computer devices remote from the processors from a publicly accessible distributed network that is addressed by a single address. The system generates routing commands based on a content of a payload, a protocol used to deliver the data, and detections of data types. The system routes requests from different computer devices remote to the processors to intended devices based on the single device address. The different computers includes physical devices and endpoints that sever a plurality of entry points for accessing a cloud.

30 Claims, 53 Drawing Sheets

(56) References Cited

U.S. PATENT DOCUMENTS

| | | |
|---|---|---|
| 8,788,353 B2 | 7/2014 | Hills |
| 8,799,151 B2 | 8/2014 | Ang et al. |
| 9,785,933 B2 | 10/2017 | Ferreira Da Silva |
| 9,824,394 B1 | 11/2017 | Boates et al. |
| 10,019,697 B2 | 7/2018 | Ang et al. |
| 10,402,806 B2 | 9/2019 | George et al. |
| 10,529,016 B2 | 1/2020 | Abela et al. |
| 10,540,645 B2 | 1/2020 | Desilva et al. |
| 10,692,140 B1 | 6/2020 | Kim et al. |
| 10,755,349 B1 | 8/2020 | Boates et al. |
| 10,783,510 B2 | 9/2020 | George et al. |
| 10,929,839 B2 | 2/2021 | Macedo et al. |
| 11,030,685 B1 | 6/2021 | Levchin et al. |
| 11,107,157 B1 | 8/2021 | Kerof et al. |
| 11,169,830 B2 | 11/2021 | Mclachlan et al. |
| 11,222,372 B2 | 1/2022 | Garcia, III et al. |
| 11,227,331 B2 | 1/2022 | Galit et al. |
| 11,238,530 B1 | 2/2022 | Kurani et al. |
| 11,250,407 B2 | 2/2022 | Chen et al. |
| 11,263,616 B2 | 3/2022 | Tada et al. |
| 11,282,050 B2 | 3/2022 | Philipson et al. |
| 11,321,714 B2 | 5/2022 | Prabhu |
| 11,348,085 B2 | 5/2022 | Molnar et al. |
| 11,379,821 B2 | 7/2022 | Butvin et al. |
| 11,386,488 B2 | 7/2022 | Atieque et al. |
| 11,449,844 B1 | 9/2022 | Harris et al. |
| 2013/0297486 A1 | 11/2013 | Colborn |
| 2014/0207654 A1 | 7/2014 | Don et al. |
| 2015/0278948 A1 | 10/2015 | Don et al. |
| 2019/0228399 A1 | 7/2019 | Molnar et al. |
| 2019/0236577 A1 | 8/2019 | Schmid et al. |
| 2019/0340595 A1 | 11/2019 | Bhargava |
| 2019/0378110 A1 | 12/2019 | Steinmetz |
| 2020/0019941 A1 | 1/2020 | Ramnani |
| 2020/0098040 A1 | 3/2020 | Ben-natan et al. |
| 2020/0265414 A1 | 8/2020 | Koranne et al. |
| 2021/0012313 A1 | 1/2021 | Don et al. |
| 2021/0049683 A1 | 2/2021 | Jones et al. |
| 2021/0065160 A1 | 3/2021 | Butvin et al. |
| 2021/0073777 A1 | 3/2021 | Bialick |
| 2021/0150624 A1 | 5/2021 | Tucker et al. |
| 2021/0304270 A1 | 9/2021 | Garcia, III et al. |
| 2021/0366040 A1 | 11/2021 | Levchin et al. |
| 2022/0036452 A1 | 2/2022 | Schmidt et al. |
| 2022/0044219 A1 | 2/2022 | Harish et al. |
| 2022/0108292 A1 | 4/2022 | Terrell et al. |
| 2022/0114260 A1* | 4/2022 | Udupi Raghavendra ................... G06F 21/566 |
| 2022/0114660 A1 | 4/2022 | Carson et al. |
| 2022/0129895 A1 | 4/2022 | Mahalec et al. |
| 2022/0138719 A1 | 5/2022 | Chen et al. |
| 2022/0138806 A1 | 5/2022 | Sharma et al. |
| 2022/0164868 A1 | 5/2022 | Dill et al. |
| 2022/0207520 A1 | 6/2022 | Prabhu et al. |
| 2022/0207521 A1 | 6/2022 | Prabhu et al. |
| 2022/0215388 A1 | 7/2022 | Prabhu |
| 2022/0230170 A1 | 7/2022 | Ene et al. |
| 2022/0253920 A1 | 8/2022 | Jeong et al. |
| 2022/0261888 A1 | 8/2022 | Senthil |
| 2022/0270060 A1 | 8/2022 | Swimmer et al. |
| 2022/0284413 A1 | 9/2022 | Alruwaili |
| 2022/0292465 A1 | 9/2022 | Schnitt et al. |
| 2022/0292487 A1 | 9/2022 | Ene |
| 2023/0095834 A1* | 3/2023 | Gupta .................. G06Q 20/405 705/44 |
| 2023/0107104 A1* | 4/2023 | Nash ...................... G06F 21/53 726/1 |
| 2023/0169553 A1* | 6/2023 | Bousis ................ G06Q 20/206 705/26.1 |

* cited by examiner

Account Home

ADAPTABLE PROCESSING FRAMEWORK

BACKGROUND OF THE DISCLOSURE

1. Technical Field

This disclosure relates to computer architectures, and specifically to publicly accessible distributed processing that makes mobile applications secure and accessible.

2. Related Art

Many computer systems are designed to service static user levels and data loads. The systems are unscalable, making them susceptible to fluctuations in user demands and data volumes. As traffic increases, response times decrease, performance suffers, and productivity declines. During computing sessions, these systems experience instability, resulting in service disruptions and compromised outcomes.

Due to reliance on legacy infrastructures and outdated software, many computer systems are not compatible with state of the art computer platforms and cannot effectively interface third party systems. The differences between them hinder the seamless delivery of services and prevent the systems from serving newer operating systems and mobile devices.

Because many computer systems are susceptible to hacking, data breeches, and fraud, some systems serve users from a single location. These configurations keep the computer systems further away from many of its users and make them less resilient to failures.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

Scalable computer architectures and/or processes (referred to as system(s), scalable computer architecture system(s)) deliver content and services to users. The systems improve response times, especially in real time, and scale loads across multiple geographic regions. When regulations necessitate compliance within one or more specific geographic regions, the systems' edge resources ensure data sovereignty, meaning that the systems' processing and data are in compliance with the laws and regulations that govern the users in those geographic regions. The systems' dynamic infrastructure allow the systems to interface state of the art platforms cost effectively. The systems' seamless compatibility ensures efficient data management, storage, and security.

The systems deliver localized and customized services closer to the user, enhancing the users' experience. In some use cases, the systems' intelligence predicts future events and when those events are likely to occur. In response, the systems provide customized and/or personalized offers, products, execute tasks, provide advice, and/or route the user to one or more appropriate communication channels automatically. Some of the systems' optional predictive service analytics systems predict future behavior, and/or provides information that modifies user behavior. The behavior modification may prevent fraudulent activities, facilitate legitimate activities, and/or prevent/facilitate/suggest user transactions, for example. The optional predictive anomaly analytics systems 5306 prevent malware infections and unstable operating conditions, for example.

Figure 3:
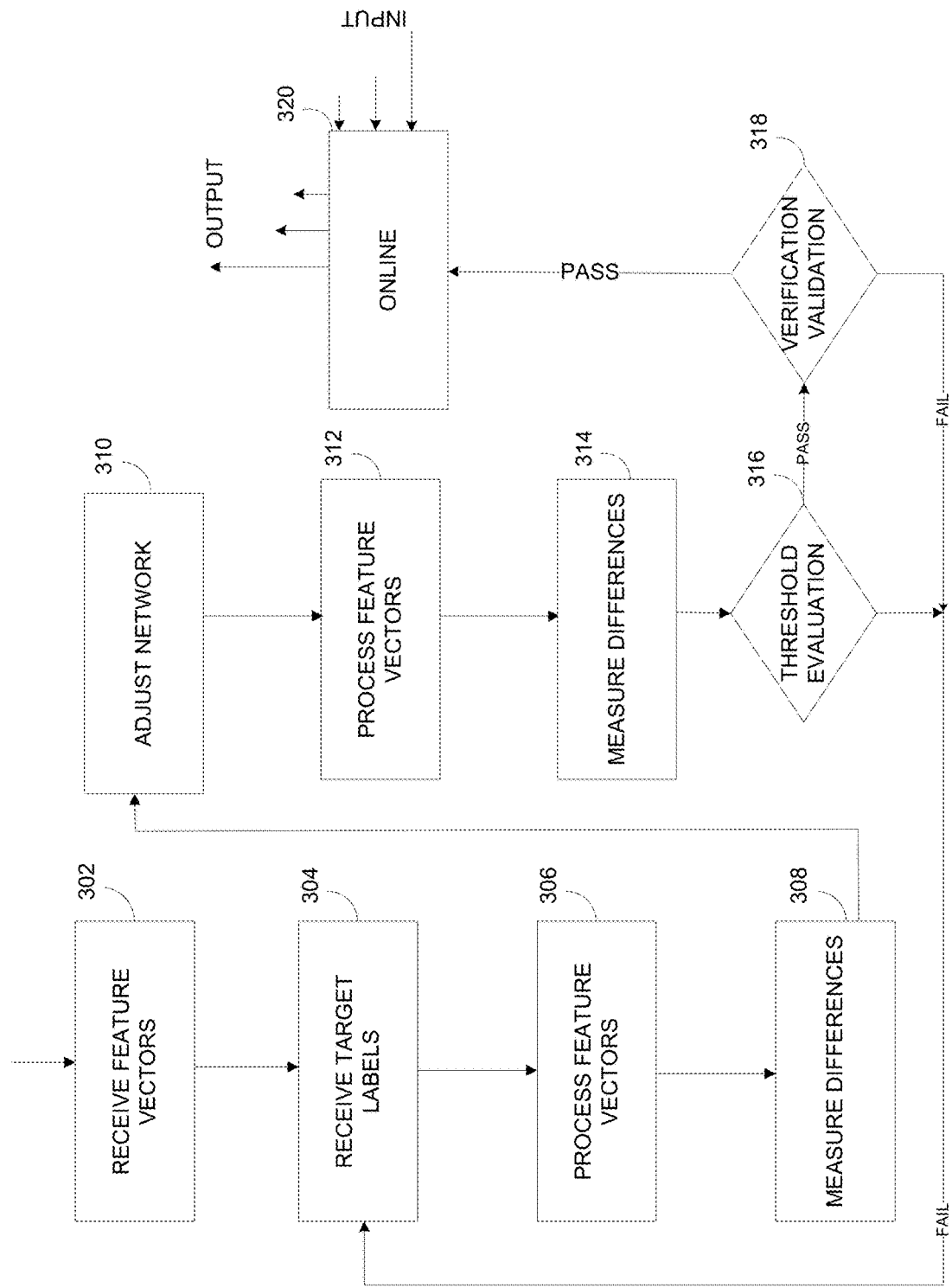
FIG. 3 is epoch sequences of a neural network of a predictive analytics system.

Some optional predictive service analytics systems 5304 (shown in FIG. 53) include neural network engines that process information in parallel trained by legacy data objects that are indicators of exemplary transactions and/or serve strategic goals and/or serve different tasks. For example, some legacy data objects comprise one or more feature vectors at act 302 of FIG. 3, comprising images, text, and/or audio that are associated with and/or include one or more target labels at act 304 that collectively comprise training data objects 5312. A target label refers to a desired output or to one or more values that the neural network engine should predict when processing an associated input. The legacy data objects are processed by the neural network engines at act 306, and the neural network engine's output is compared to the target label, which quantify differences between the neural network engine's output and the target label at act 308. The corresponding functional order or physical circuit layer order of the neural network engine may be modified (e.g., randomly change the order, or change the order in a predetermined sequence), and weights and bias of the neural network engines adjusted, based on those differences through a back-propagation and an optimization algorithm that minimize the calculated difference between the output(s) of the neural network engine and the target label(s) at act 310 before the training process repeats with other training data objects 5312 at act 312 until a threshold difference with the target tables, a training time period, or a convergence is reached at act 314 and 316. In some use cases, the training process changes the order of the neural network layers, changes the order of the neural network's functions order, and/or changes physical circuit layers that comprise the neural network engine, which changes the order of the network engine's layers that communicate directly, exclusively, and uninterrupted (e.g., a point-to-point connection) with each other and occurs in a pipeline flow. Limiting rules may apply one or more progressive constraints that are tracked and stored in a memory and/or a database to ensure that changes in a preceding neural network engine layers and/or its order is compliant with and cascade through the input and other requirements of the subsequent neural network engine layer it interfaces.

When a desired threshold difference or convergence is reached at 316, some neural network engines are next evaluated by a verification and validation assessment at act 318 with one or more evaluation feature vectors and one or more evaluation target labels (collectively 5308) that are separate, distinct, and different from the training feature vectors and target labels (collectively 5312) that originally trained and configured the neural network engines. The evaluation feature vectors are processed by the neural network engines, and the neural network engine's output is compared to one or more evaluation target labels, which quantify differences between the neural network's evaluation output and the evaluation target labels. When the difference falls within a predetermined confidence interval or convergence interval, the trained neural network engines may move to production and/or online at act 320 to process user input in parallel and/or serially when executed by the backend networks 102 and 104 shown in FIG. 1 and/or by users' mobile wireless devices 5302 or mobile wireless processors. If the difference does not fall within the confidence interval or the convergence interval at act 318, the generate, train, and evaluate processes repeat asynchronously starting at act 304 until the trained neural network engines pass verification and validation at act 318. In some financial technology (fintech) applications 5310 and/or apps, optional predictive service analytics systems issue commands to processors that minimize or prevent fraudulent transactions and/or make cash flow predictions, make users' payment predictions, manage users' credit risk, make installment loan offers, and/or suggest alternative terms, and/or generate other tasks that enable the fintech applications 5310 and/or apps to recommend products to users, manage user finances, and/or manage products or any combinations of these functions. Examples of fraudulent transactions include those occurring through account takeovers where a cardholder's credentials are compromised allowing unauthorized individuals to gain access to an account and make unauthorized transactions; those known as friendly fraud where a cardholder disputes legitimate charges or makes false claims that a transaction was unauthorized; those known as triangulation fraud where a cardholder knowingly makes a transaction with a fraudulent source that is later disputed and the recipient of the transaction uses the funds of the transaction to make another transaction with a legitimate source sending the benefits of the legitimate transaction (e.g., the products) to the cardholder washing the prior transaction out, and/or etc. In other optional systems, other neural network engines are created/trained/evaluated/verified to detect anomalies and/or pre-failure conditions to proactively identify unstable, abnormal, or unusual data patterns, processing functions, and/or power consumption. The predictive anomaly analytics systems 5306 are further described below.

Figure 1:
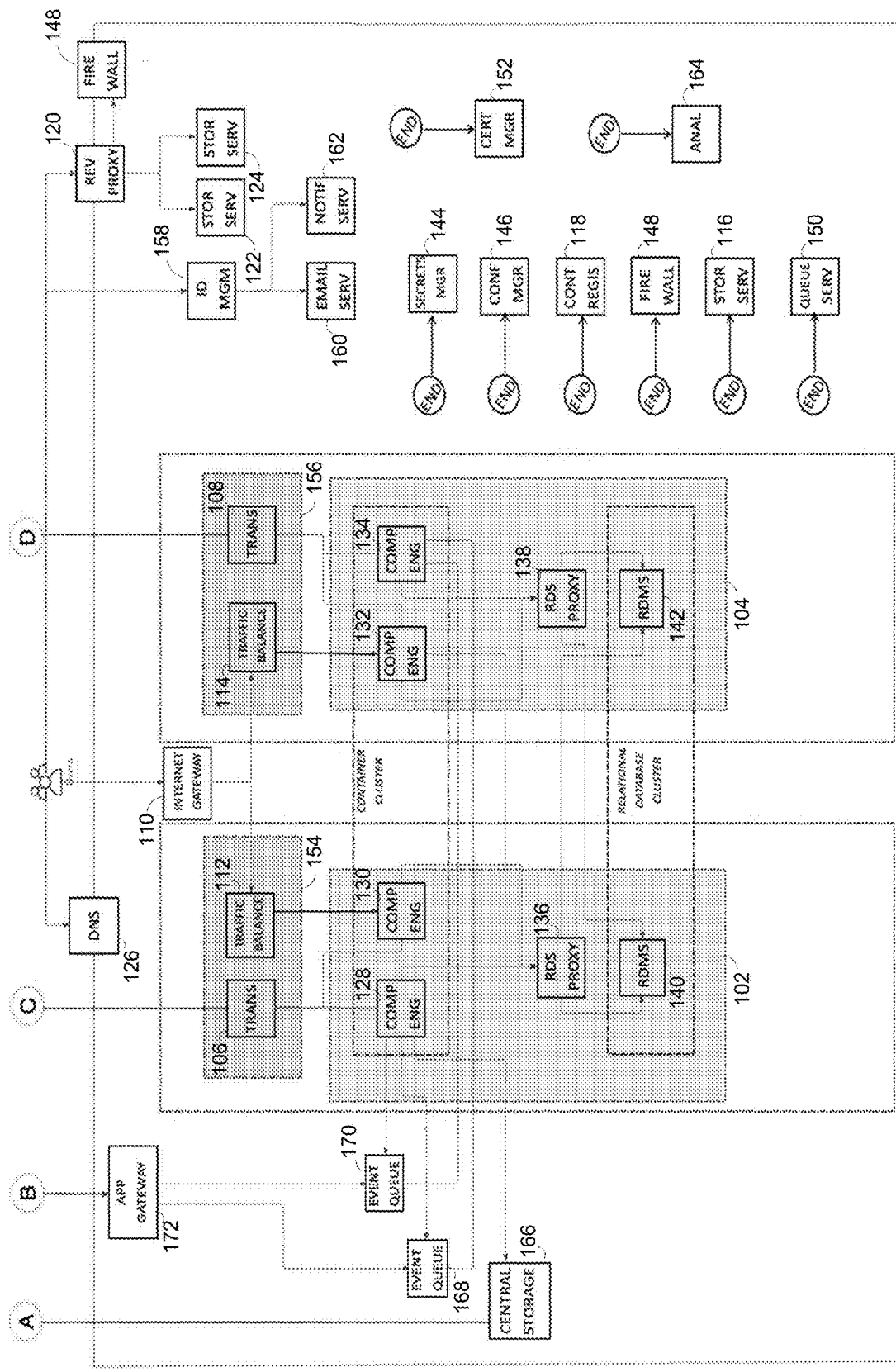
FIG. 1 is an adaptable processing network that combines physical computing with cloud computing in a distributed environment.

An exemplary scalable computer architecture and/or process is shown in FIG. 1. The system comprise a plurality of backend networks shown as internal networks 102 and 104 that interact with corresponding intermediary edge networks 154 and 156. The backend networks 102 and 104 are smaller private networks that facilitate efficient access to Internet Protocol (IP) addresses that uniquely identify resources and facilitate communications through data packet transfers. The division of the system into the separate networks that serve different functions or tasks, serve different geographic areas, and/or in which one network serves as a shadow network of the other network, increases the systems' security, simplifies the network's management, and provides faster response times to end user and resource requests. Each network 102 and 104 is assigned a unique and different IP address and associated with a mask with the first three octets associated with the logical networks, respectively, and the last octets associated with the resources the networks serve. The IP addresses are rendered in a dot quad format comprising four bytes.

In FIG. 1, the backend networks 102 and 104 do not have a direct route to the Internet (e.g., a publicly accessible distributed network); instead, communications occur through translators 106 and 108 that are part of the edge networks 154 and 156, respectively. The translators 106 and 108 assign multiple resources (e.g., devices) within each backend network 102 and 104, respectively to a single IP address. The translators 106 and 108 conserve IP addresses and facilitate connections to multiple external devices on publicly accessible networks like the Internet. In operation, the translators 106 and 108 execute a masquerade that replaces the IP addresses of the resources/devices that comprise their network with their own IP address, respectively, and in some applications, assign a unique dynamic number to each resource (e.g., socket) and/or device it serves through local area networks that are stored in translation tables with some number ranges reserved for specific purposes and/or functions. In alternative systems, unique numbers are not assigned. Instead, the translators 106 and 108 apply a dynamic routing that makes routing decisions based on the content and/or characteristics of the data being processed instead of relying on traditional protocols and/or network addresses.

When unique numbers are used, they identify the devices and/or resources (e.g., unique devices and/or resources) in the backend networks 102 and 104 it serves and are processed to generate routing commands that establish where responses/requests are routed to (e.g., what device/socket each response/request is routed to) through the translation table. When a response is received, the translators 106 and 108 access the translation table and processes the output of the translation table to generate commands that route responses to the device and/or socket.

When routing is based on content and/or characteristics of the data being processed, inspections are executed by the translators 106 and 108 that review the payloads of the packets received by the translators 106 and 108 to generate commands that route the content to the device/socket each response/request is routed to. It makes routing decisions and generates routing commands through a granular control. Those commands may be based on the recognition of certain patterns in the data, protocols used to construct and/or deliver the data, the detection of device specific data or data types, the detection of application specific data, the detection of socket specific data, the headers of the payload of packets (e.g., blocks of data that are added to the beginning of each data packet) and other protocol-specific overhead, and/or combinations thereof). Other protocol-specific overhead protocol headers may include error checking codes, encapsulations of additional protocols such as IP security, tunneling protocols such as point-to-point protocols, flow control features that add control data, the sequence of the packets, and/or etc.

In another alternative, the dynamic routing is based on real-time network conditions that makes optimal path selections, transmission decisions, and generates routing commands based on the availability of the intended device/socket, congestion in the backend networks 102 and 104, and/or in response to the changing network topology. The alternative dynamic routing generates routing commands based on the content and/or characteristics of the data being processed and the current operating conditions of the backend networks 102 and 104.

By its IP address translations, which may include combinations of the above in some systems, the systems conserve IP addresses by assigning two, three, or more (e.g., up to all) devices/resources to a single IP address. The translators 106 and 108 enhance security by making the translators 106 and 108 a second and third firewall, respectively, that hide the location of the devices/software services they serve/provide behind a common public address, which prevents direct access to the devices/software. Network management is improved by connecting some or all of the devices to the Internet without assigning unique IP addresses to each of them.

In some use cases, the backend networks 102 and 104 and edge networks 154 and 156 comprise subnets (e.g., a segmented portion of a respective larger physical network) that in some use cases comprise private cloud computing networks. The subnets render physical enterprise hardware network functionality that scale cloud resources when responding to changing user demands and data volumes. In some applications, the subnets serve one or more geographic regions exclusively, with the Internet gateway 110 facilitating communication between the users and traffic balancers 112 and 114. While two hierarchical subnets are shown, with each efficiently allocating IP addresses, alternate systems comprise three or more subnet instances applying the same address allocation structure and/or process described herein, with the number of some subnets varying with the user densities they serve and/or a predetermined level of network segmentations.

Application programming interface endpoints (shown as " " in FIG. 1) and software interfaces allow the networks 102 and 104 to interact with other services. The application programming endpoints serve as an entry point or input/output port for accessing computer-based functionality through a standard set of protocols and processes between client applications and service providers without passing through a public and/or a private gateway. Each application programming interface endpoint comprises an entry point that comprises a network address or a location designator and a port number, which uniquely identify a communication endpoint for a different computer service or device. For example, an application programming interface endpoint to the storage services module 116 provides processes and/or processing for uploading, downloading, deleting, and/or storing data and/or files, while the endpoint to the virtual container registries 118 provides application programming interfaces for managing virtual containers and container clusters. Container clusters are a group of independent clusters that operate and appear to clients as if they were a single container. Clustering improves software processing capacity by, among other things, enabling the containers within the cluster to shift processing.

Virtual containers, in the context of software, are standalone units that package software and its dependencies, allowing the software to run across different computing environments. Containers are portable allowing them to deploy and move between different systems and provide isolation meaning each container operates within its own isolated runtime environment, ensuring issues with one container do not affect the operation of other containers. A runtime environment refers to the software infrastructure that supports the execution of the computer program or application and includes the tools, libraries, and/or services necessary to run the program and interact with the underlying operating system and hardware. Containers share the host system's kernel reducing the need for resource duplication and are scalable allowing the container registries 118 to allocate and/or manage multiple virtual containers instances automatically as workload increases (e.g., horizontal scaling).

The endpoint to the secrets manager module 144 provides secure centralized storage for sensitive information, such as device and/or user credentials, application programming interface keys, access tokens, and other secrets that facilitate their secure retrieval, their rotation, and their management. The secrets manager module's 144 access control allow system managers to establish permissions and access policies for different clients. The secrets managers' rotation supports the automatic periodic changing of credentials, access tokens, and/or public and/or private encryption keys to decrease the likelihood of compromised secrets. In FIG. 1 the secrets manager module 144 interfaces the backend networks 102 and 104 and an identity management services module 158 that includes the access token generator to ensure the access tokens are secure like the other secrets.

When communicating with an authentication service or an authorization service, the access token generator may generate access tokens to authenticate clients and/or authorize certain resources and services. The access token, which is a nonreducible encrypted textual element in some systems, determines which systems and/or components are given access to content at the system at the level for which they are approved. In some systems, an access token includes a tracking code that is used to identify a plurality of client devices and is used to identify a user's active device from the user's plurality of devices.

An exemplary authorization process may automatically occur when a request for a resource and/or a request for access to an endpoint occurs. An endpoint represents and address to a specific device or an application running on that specific device or a specific service provided by that device and a socket represents a software interface that allow programs to interact. If the request falls within the scope of the client's access rights, at the client's approved security level, and the requesting client is not currently authorized, an authorization code is generated by the access token generator of the identity management services module 158. In some systems, the authorization code comprises the access token, and in alternative systems, the authorization code comprises a client application uniform resource locator. When the uniform resource locator is generated, actuation of the uniform resource locator results in the issuance of the access token. In both systems, the access token credentialed with the requesters security levels and/or authorization levels with permissions allow access to specific resources for a specified period of time. The access token is passed in each client request thereafter, and allows the system's providers to authenticate the requesters security and authorization levels when servicing a request for a temporary and/or limited period of time. When the access token is not authenticated, an authentication error issues and access is denied.

The system's access tokens may be denied because the access token is invalid, tampered with, revoked, does not provide authorization to the requested resource, does not adhere to system specified formats, and/or, for other reasons.

The endpoint to the certificates manager module 152 creates, stores, and/or renews public and/or private digital certificates and keys that protect the systems Web applications from external entities. By issuing certificates through the certificates manager module 152 or by importing them from trusted third party sources, some systems verify Web sites, entities, and/or users. Some certificates manager modules 152 manage the lifecycle of the digital certificates from creation, to renewal, to revocation, to expiration and/or provide secure storage through private and/or public key encryptions. Some certificates manager modules 152 revoke certificates when they are compromised or expired, automatically renew certificates in response to notifications from certificate authorities, execute discoveries when certificate are deployed outside of the certificates manager module 152, and/or enforce the system's policies related to certificate use and certificate management (e.g., certificate strength, certificate length, certificate restrictions, and/or etc.)

The endpoint to the configuration management module 146 enables the system to manage the systems' configurations by separating the systems' code (e.g., the application code) from the systems' configuration settings. The systems' configuration settings refer to the settings of software, hardware, and/or other components that comprise the system. It encompasses the hardware operating system settings, driver settings, and/or software settings that determine how the systems function and interact with their environment. In FIG. 1, the configuration management module 146 allows systems to generate multiple computing environments (from a development environment, to a testing environment, to a public use commercial environment, for example) at different stages of the systems' lifecycles. It allows the systems to update applications quickly and/or rollout updates slowly without interruptions, and in some instances, without deploying one or more entire updates at once. It allows the systems and its administrators to enable and disable specific functions based on configuration settings to assess the impact of the changes that may be used in split testing, phased rollouts, and/or feature tags within and outside of production traffic, for example. Split testing may compare two or more versions of content delivered by the systems or user experiences to the systems to determine which one is preferred by the user or results in more transaction conversions. Feature tags comprise a software process that enable or disables features and/or functions served by the systems.

The firewall modules 148 and its endpoint allows the system to position a security system in front of and behind the public facing Web applications that include the Internet gateway 110 and the reverse proxy 120, for example. The security system protects the systems' Web applications against external threats by acting as a network filter that analyzes client requests and/or system responses in real-time, including inspecting content, headers, and/or other parameters to identify potential security vulnerabilities, and applies a set of rules that determine whether to allow or block data packets based on predefined criteria. Besides enforcing security policies, the systems compare client requests against known attack patterns and/or pre-attack conditions and enforce the rules to block current and/or potential external threats. Some firewall modules 148 identify and block attack signatures (e.g., patterns and/or characteristics that identify or indicate potential malicious activity), compare requests to reputation lists to authorize access, and/or process other threat intelligence to identify and block malicious activity. To minimize the impact on traffic, some instances of the firewall modules 148 execute request/response buffering and retrieve pre-cache responses to minimize the latency that some real-time monitoring causes. Pre-cache responses refers to one or more responses generated by the system and cached in anticipation of one or more future requests. Some firewall modules 148 preload and/or pre-cache and/or deliver the responses to clients such as mobile wireless devices 5302 in advance before they are requested to optimize system performance. Predelivery of cache responses may be based on rules and/or algorithms that estimate that likelihood of future requests for one or more resources.

To couple and/or decouple the system's components and/or functions, a queueing service module 150 (also referred to as the queue service module) served through an endpoint enables scalable messaging and/or object exchanges between the system's components. The queueing service module 150 generates a multielement data structure from which messages and/or objects are delivered from and replicated across multiple instances of the networks 102 and 104 reducing the risk of loss and increasing message/object availability. The queueing service module's data structures seamlessly scales as demand varies ensuring messages and/or objects are retained and/or retrieved during high traffic periods.

In FIG. 1, the queueing service module 150 receives and stores one or more messages and/or objects in the storage services module 116 and/or a local data store. The multi-element data structure follows a first-in-first-out (FIFO) sequence. In alternate systems, messages and/or objects removal from the queueing service module 150 is based on factors other than the order of insertion; for example, when a priority sequence value is assigned to one or more messages and/or objects, the priority sequence value may change the output sequence. The priority sequence refers to the ordered lists in which items and/or tasks are ranked and prioritized based on their relative importance or urgency. It determines the order in which the items are retrieved and/or processed. In yet another alternate system, the queueing service module 150 serves one or more dequeues in which messages and/or objects are added or removed from either an insertion input/output (I/O) port or a removal I/O port of the one or more dequeues or both ends. That is, the dequeue (e.g., a double ended queue) can operate in a last-in-first-out (LIFO) sequence, a FIFO sequence, or a combination of LIFO, FIFO, and/or a priority sequence from both of its ends during a session. A session in a queue context, refers to the time during which the system process messages and/or objects.

In FIG. 1, the traffic balancers 112 and 114 enable the distribution of traffic in a microservice configuration using a virtual container cluster across two or more network instances (e.g., two backend network instances are shown 102 and 104). In the microservice configuration, the systems' software is deployed as a collection of small, weakly coupled, and/or independent service modules in which functions, such as the specific functions described in this disclosure. The microservices modules are self-contained, generally stateless, and execute distinct tasks. Some microservice modules are stateful meaning the microservice modules monitor the state of the activity in which it participates in or executes, such as transactions that requires multiple roundtrips such as an interface of a database and/or a queue, for example, that may be served by the storage service module 116 or queue service module 150, respectively. The term module in this disclosure refers to a self-contained unit that performs a specific function and/or provides a set of functions as a software element and/or a physical hardware component. In a software context, it comprises a self-contained unit of code. In terms of hardware, it comprises a self-contained physical device that integrates into or interfaces other physical components. It may interface other physical components through the physical module's optional Ethernet ports (such as 10 megabits per second (Mbps)/100 Mbps/1 gigabytes per second (Gbps)/10 Gbps/40 Gbps) megabits per second, for example), its optional fiber optic ports (e.g., small form-factor pluggable (SFP) and SFP plus), its optional serial ports (e.g., Universal Serial Bus port), its optional parallel bus, though its optional network switches and/or etc. The hardware or physical module may have light indicators that provide visual indicators of its performance and a power supply unit (PSU) or a configuration powered by an external source. Some physical modules include cooling mechanisms including active cooling components (e.g., fans, circulating coolant fluids, etc.) and/or passive cooling components such as heat sinks to prevent overheating. In both a hardware context and a software context, respectively, functionally defined modules are designed to be interchangeable in their respective software or hardware contexts, making the scalable computer architecture and/or process flexible, adaptable, and customizable.

Each microservice scales and operates independently, allowing the service to execute different microservices simultaneously through common and/or different user sessions. Due to microservice configurations, different microservices modules (also referred to as micro-components) are developed through different technology including artificial intelligence (AI), for example. The microservices provide iterative, incremental, and adaptive software development, by breaking down complex programming applications into smaller manageable components allowing the systems to continuously evolve and adapt to user demands and offer different services incrementally and/or holistically.

In FIG. 1, the microservice modules are deployed in virtual containers and container clusters allowing the microservice modules to be maintained, modified, and/or taken off-line when fraud is detected, when pre-failure conditions are detected, when failures occur, and/or when intrusive programs such as malware infects them and/or is detected. In some systems, pre-failure conditions are detected by the optional predictive anomaly analytics systems 5306 that in some systems comprise other trained neural network engines that are trained and verified on the legacy data objects or simulated data and their associated target labels and evaluated with evaluation data objects that reflect potential problems, irregular operating conditions, network and/or communication conditions that precede failures (e.g., reflect conditions that are strongly predictive of failure events and/or indicative of undesired or unstable conditions that are detectable in normal operating conditions) and those conditions that occur during system, physical component and/or software failures. Some training and evaluation data and their respective target labels (legacy objects and simulated data) exclude data that represents routine failures such as authentication failures and transitory failures. Transitory failures may cause temporary interruptions. They may occur for a fraction of a second or for milliseconds or for microseconds, for example.

Figure 53:
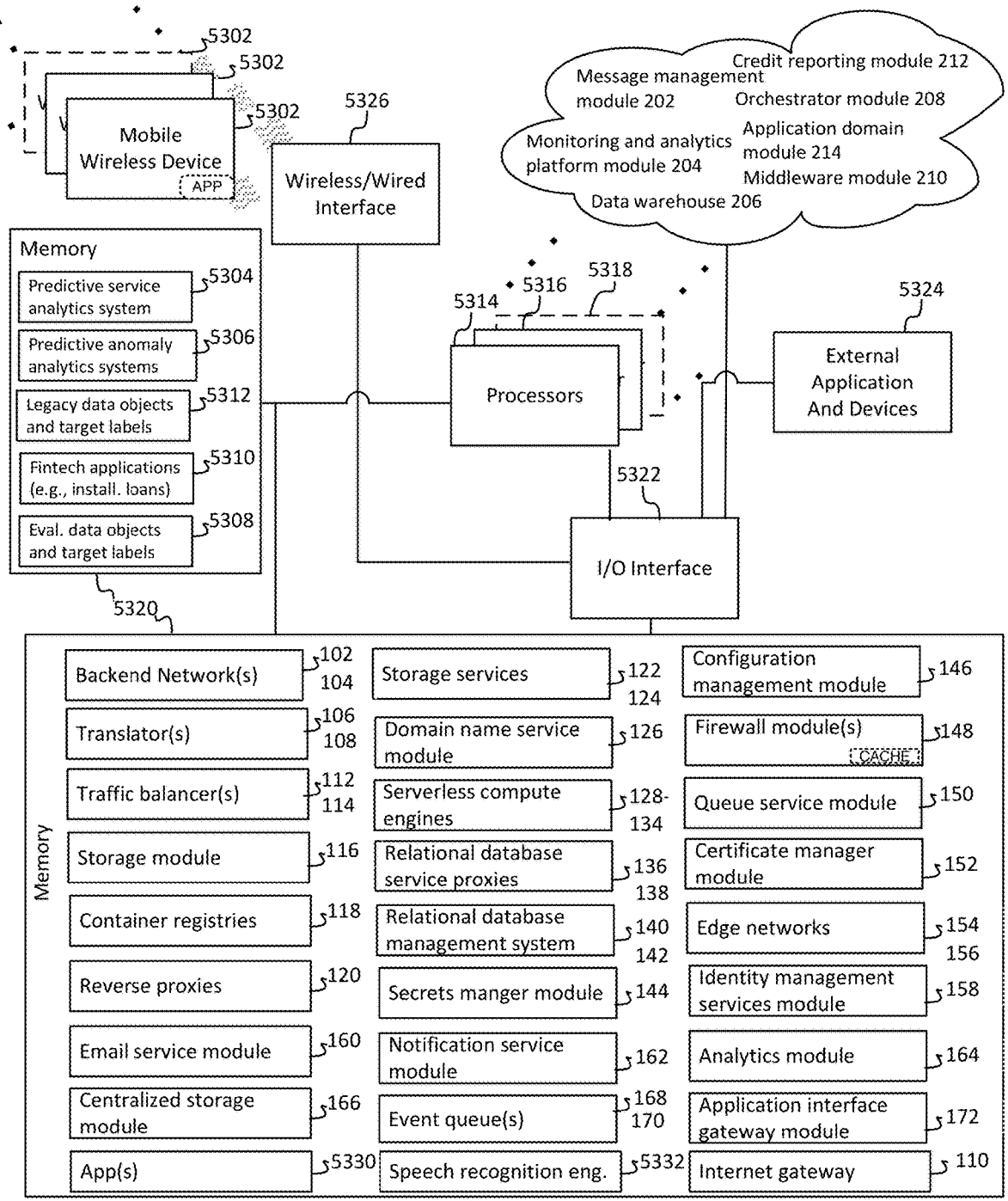
FIG. 53 is an alternative adaptable processing network that combines physical computing with cloud computing in a distributed environment interfacing a mobile wireless device.

The predictive anomaly analytics systems 5306 detect trends and patterns that predict potential failures for one or more processors, servers, software modules, and/or physical components, and in some instances, issue commands to processors that mitigate the failures before they occur. Mitigation may occur by detecting conditions that occur immediately before failures occur (e.g., a bounded timed period that precedes one or more physical component and/or software failures often based or defined by real-world or simulated empirical data) and predict failures and/or undesired states. The optional predictive anomaly analytics systems 5306 are trained and evaluated like the optional predictive service analytic systems 5304 training shown in the epoch sequences of FIG. 3 and is represented in FIG. 53. The system may be executed by the backend networks 102 and 104 shown in FIG. 1 and/or by the user's wireless mobile device 5302 or the user's phone processors. Because the neural networks generated by the optional predictive anomaly analytics systems 5306 train on empirical data generated before a device or system fails (e.g., during its normal functioning period) and those that precede device and/or system instability (e.g., within a conditioned time period that excludes temporary or short-lived failures or temporary instability events), the predictive anomaly analytics systems 5306 protect against known and unknown causes of system and/or device failures.

System mitigation upon failure prediction and/or pre-failure detections are automatically executed when predictions and/or detections occur and may include the system and/or wireless device 5302 restricting communication with infected or failing microservice modules and hardware modules, isolating them, apps and/or functions, restricting access to memory, databases, the microservice module's and container memory space (e.g., data isolation), quarantining, rebuilding, wiping, and/or replacing microservice modules and/or other physical components (to eliminate hidden backdoors, rootkits, unknown vulnerabilities), and/or siphoning, extracting, and/or diverting data or removing data from physical components and/or virtual containers and moving that data to other uninfected and/or stable physical components, processors, and/or virtual containers, respectively, before the instability or failures occur. The mitigation enhances system and device stability, maintains system access, and minimizes downtime.

Access to the system occurs through one or more reverse proxies 120 that sit in front of the backend origin servers that are part of the backend networks 102 and 104. The reverse proxies 120 make system data and files stored in storage service 122 and 124 (e.g., cascading style sheets, HTML files, JavaScript images, video, etc.,) available at geographically distributed data centers and/or edge locations. The reverse proxies 120 cache the data and files from the storage services 122 and 124 at locations closer to the systems' users in compliance with the systems' caching policies (e.g., its time based expiration rules, framework, and/or retention directives). When requests are received for expired content, the reverse proxies 120 solicit content responsive to the requests from the originating backend server (e.g., backend origin server). When newer or updated versions of content are available, it is copied to the requesting location and replicated to other distributed network locations before similar requests are made at those locations. When new and updated versions are not available, the backend origin server may respond to the reverse proxies 120 with an unmodified status code, which causes the reverse proxies 120 to serve previously expired content from its cache and reset the associated expiration time of the expired content at the reverse proxies 120 in line with the system's caching policies refreshing it. Alternatively, the origin server may return a no-cache, no-store directive and/or return application programming interface calls instructing the reverse proxies 120 not to store or serve cache copies, which effectively deletes it and/or prevents rendering of the content from the reverse proxies 120 and/or prevents its public delivery. The term reverse proxies 120 also refers to reverse proxy clusters that comprise a group of independent network proxy servers that operate and appear to clients as if they were a single unit. The reverse proxy clusters improve network capacity by, among other things shifting requests to other proxy servers serving geophonic areas. By allowing one proxy server to take over for another within the cluster, the reverse proxy clusters enhance the systems' stability and minimizes system failures.

To ensure data sovereignty, some alternate reverse proxies 120 route requests based on the geographical location of the user and/or based on the content of a request. When regulations necessitate compliance with the local and/or regional laws and regulations that govern the physical locations of the users, some reverse proxies 120 route requests based on the location of the user to specific backend origin servers that service requests in compliance with that user's local and/or regional laws and regulations. In these instances, compliant services and content is copied to the requesting location and not replicated to other distributed locations not subject to the same local and/or regional laws and regulations. Some reverse proxies 120 analyze the content of the requests and make routing decisions based on one or more specific criteria. For example, some requests for specific products and/or transaction types, are routed to different backend origin servers that service the specific products and/or transaction types. Alternatively, routing mechanisms distribute client requests to reverse proxies 120 based on a combination of these factors and other factors, which may also include load balancing (e.g., using weighted cyclic scheduling algorithms, least connections algorithms, server metrics, and/or etc.), protocol routing (e.g., routing based on the protocol used), and/or server health checks (e.g., temporarily excluding unhealthy reverse proxies 120). A weighted cyclic scheduling algorithm allocates client traffic to distributed locations in a cyclic manner, ensuring specific traffic is serviced in a specified or predetermined amount of time. When the predetermined amount of time expires, a scheduler preemptively places the traffic at the back end of a reverse proxies' queue for further processing based on the order of insertion and/or its priority, and the process repeats until the process is completed. The weighted cyclic scheduling algorithm maintains a queue of servers for each incoming client request or traffic, and selects a server based on their respective weights. The servers with the higher weights receive the larger proportional share of the incoming traffic, while the servers with lower weights receive a lower proportional share. The least connections algorithm distributes traffic based on the real-time load conditions, processing capacity, and/or load conditions, and assigns client traffic to the servers with the capacity and fewest active connections. Processor utilization rates, memory usage rates, the amount of data to be transmitted, and/or the amount of data received over a time period, the time taken for a server to process and/or respond to incoming requests, and/or the number of active connections are some of the server metrics used alone or in combination to distribute client requests to reverse proxies 120 based on server metrics.

An unhealthy reverse proxy metric will vary with the criteria assessing it and may reflect hardware and/or software failures, network connectivity issues, and/or a level of resource utilizations, for example, established by the administrator. Network connectivity issues describe systems that are unable to establish or maintain consistent and/or persistent communication connections with other systems that may be detected by latency measurements exceeding predetermined thresholds (e.g., elapsed time between initiating a request and receiving a response), packet loss, jitter (e.g., variation in elapsed time between consecutive data packets), excessive power consumption, and/or etc., for example. A high resource utilization refers to utilizing an amount of circuit resources greater than a predetermined operational level of processing time, memory, network bandwidth, and/or etc., that may be measured by network monitoring, throughput tests, quality of service monitoring, etc.

To reach the reverse proxy 120, users are serviced by a domain name service module 126 that connects the user to one or more reverse proxies 120. The domain name service module 126 registers the name of Websites, content providers, and/or applications the networks 102 and 104 are serving, so that when a domain name is requested, the domain name service module 126 retrieves the associated IP address for the reverse proxy 120 serving that geographical location and returns the IP address to the user's domain name service resolver.

In FIG. 1, virtual containers are generated, deployed, and/or executed by the networks 102 and 104 through physical and/or virtual compute engines 128-134. The compute engines 128-134 run virtual containers that host the microservice modules and/or other software applications through servers provisioned and scaled by one or more computing models that, in some exemplary use cases, are provisioned and scaled by the system and/or a cloud service. The compute engines 128-134 comprise backend origin servers, server clusters, switches, etc., interface relational database service proxy instances 136 and open-source relational database management systems 140 and 142, translators 106 and 108, and traffic balancers 112 and 114 through a local area network. They interface an elastic container service through a container cluster that provisions the underlying infrastructure, auto-scales, and/or orchestrates the virtual containers based on workload processing demands and/or resource utilizations. Autoscaling allows the container application to dynamically handle varying levels of traffic and/or workloads by automatically adding and/or removing container instances. It ensures there are enough container instances to handle incoming requests, prevents server disruptions during peak load conditions, ensures resources are provisioned when needed (minimizing the costs associated with underutilized containers), and simplifies container management by reducing manual scaling decisions by automatically applying predefined scaling policies and/or predefined rules. Some elastic container services also allow users to deploy, manage, and/or scale containers through application programming interfaces.

The compute engines 128-134 interface relational database service proxy instances 136 and 138. The relational database service proxy instances 136 and 138 sit between the compute engines 128-134 and the open-source relational database management systems 140 and 142 that comprise the relational database cluster. The open-source relational database management systems 140 and 142 comprise relational databases that support user-defined data types, customized functions, stored procedures and microservices, triggers, and/or extensions that tailor the relational database systems 140 and 142 to different requirements. The open-source relational database management systems 140 and 142 support built-in data types, including Structured Query Language types (SQL types, such as integer, text, date) as arrays, JavaScript Object Notation, eXtensible Mark Language, hash store values (such as key-value store), geometric types, and/or more. The open-source relational database management systems 140 and 142 also support indexing and querying on these data types. The open-source relational database management systems 140 and 142 allow multiple clients (e.g., the relational database service proxy instances 136 and 138) to access the database concurrently while maintaining data consistency. The open-source relational database management systems 140 and 142 also support synchronous and/or asynchronous replication that ensure high data availability, data redundancy, and/or failover capabilities.

An exemplary user authentication to the system begins with a request to access the identity management services module 158. Users sign-up and sign-in through its user registration and functionality. It supports multiple authentication methods, including username and passwords, Short Message Service verifications, and authentications from remote identity providers (e.g., Google®, Microsoft®, other enterprise identify providers, for example—Google® and Microsoft® are mentioned in this disclosure solely for descriptive purposes and their references does not imply an endorsement, affiliation, or an association with their trademarks or their businesses). The identity management services module 158 stores user profiles, attributes, and preferences, and provides application programming interfaces and software development kits (e.g., a collection of software tools, libraries and code) to facilitate updating profiles and managing user groups.

The identity management services module 158 manages user authentication through the access token generator that generates access tokens when the user is authenticated, and which authorizes access to protected sources. The access tokens are credentialed with the requesters' security levels and/or authorization levels with permissions to access specific resources for a specified period of time. Some access tokens provide temporary access through temporary credentials, such as when users sign in as guests; some reflect registered users where users sign in through user pool authentications, and some alternative access tokens provide federated identity access that allow users to sign in through remote external identity providers that allow users to access multiple applications and domains based on a single set of credentials, for example.

An email service module 160 comprises a scalable email platform that allows the system to send, receive, and/or manage messages electronically through email. Through server clusters, the system uses protocols, such as simple mail transfer protocol, post office protocol, and Internet message access protocol, to send and receive email communication. The email service module 160 interface allows the system to compose, organize, and/or manage emails and the user's contacts. The email service module allows the system to attach files, documents, images, and/or videos as attachments, and includes short-term and long-term storage in a memory and/or databases for system retention. The email service module's 160 synchronization manager facilitates multi-way communication between the server clusters and the client apps, which ensures changes made on one device are reflected in real time across all of the devices.

In use, the email service module 160 sends and receives emails in response to events, for example. Emails may be sent in response to account creation, and account access from a different geographic area, and/or as email notifications or confirmations, which involve automatically generating and sending an email to a user to provide information or validate actions. For example, an account creation email is an email sent upon the successful creation of an account. It includes a confirmation link and/or instructions to verify an email address with a newly created account. A sign-in verification comprises an email or a Short Message Service message that includes a verification link or code a user enters to verify their identity when signing in from a different geographic location or area When a user changes the user's password, an email confirmation is often sent to inform the user of the password change. Email confirmations maintain the security of the user's accounts and keeps users informed about user account activities.

A notification service module 162 enables the management, delivery, and receipt of notifications to users and/or subscribers. It allows the system to provide users with timely information through various communication channels and interfaces. The notifications may be received through mobile wireless device applications (also referred to as apps or app), browsers, Short Message Service, electronic mail, and/or push notifications. The push notifications allow the system to deliver real time information, even when an app or browser on the mobile wireless device 5302 is not running in the foreground or background. The notifications allow the system to actively engage users in real time, provide relevant information, and prompt users to execute one or more specific actions. Push notifications to the user's mobile wireless device 5302 may bypass the app or service that is running on it. In a use case, notifications are personalized to a user or user segment delivering content that in some applications include text, images, video and/or interactive buttons allowing the user to take actions directly from the notification itself, such as launching a mobile app on a client device and/or performing an activity.

An engagement and analytics module 164 analyzes and engages users across the multiple communication channels. In some systems, the engagement and analytics module 164 track, measure, and/or analyze user activities to understand how users interact with the system. The engagement and analytics module 164 allows the system to create target, personalize, and/or transmit multi-channel messages to engage users, which include sending/receiving emails, sending/receiving short-message-services (SMS), sending push notifications, sending/receiving in-app messaging, and/or sending/receiving voice messages. The multi-channel connections allow the system to reach users through their preferred channels or their designated channels ensuring communication across multiple user platforms and/or devices.

In some systems, engagement and analytics module 164 tracks user activities, events, and behaviors within the users' mobile devices and/or the user's apps. Tracking may include monitoring and/or recording user logins, content visits, clicks, conversions and other interactions that may include monitoring and/or recording Global Positioning System (GPS) data and other mobile wireless device 5302 generated and/or received sensor data. The engagement and analytics module 164 stores data related to user engagement and/or behavior in a database or data warehouse, such as the storage services module 116 and/or the open-source relational database management systems 140 and 142, for example, which allow for efficient storage, retrieval, and/or analysis. The analysis may measure user and/or task or transaction conversion rates, user retentions, session durations, click-through rates, revenue per user, and/or any other metrics relevant to understanding the user's engagement or use of the mobile wireless device app. Alternative exemplary analysis may identify trends, maps and/or analyze user's interactions (e.g., the user's experience with a financial application) through conversion paths via the mobile wireless device app, which allows the system to identify where users drop off from an interaction or transaction and/or face challenges to transaction conversions.

Access to remote services and/or other data occurs through an application interface gateway module 172. The application interface gateway module 172 allows the plurality of backend networks 102 and 104 to interact with remote applications and/or remote devices through an application programming interface ecosystem or an application programming portfolio. The application programming interface ecosystem or application programming portfolio serve an as entry point for clients that route, and in some instances, aggregate multiple requests for services. The application interface gateway module 172 manages requests by its protocol translations, caching, and/or load balancing. In some instances, the application interface gateway module 172 modifies requests and responses to match client and server requirements, consolidates server results by aggregating data from difference sources, and/or enforces bandwidth limits by throttling bandwidth access and/or providing transmission rate limits based on predetermined backend network load thresholds and/or predefined communication channel capacity levels. In FIG. 1, some routers and/or switches that are part of the application interface gateway module 172 are configured to limit bandwidth access to specific devices, ports, and/or IP addresses through monitoring and comparisons to pre-stored application files and/or through updatable configuration files that also retain the predefined network load thresholds and/or predefined channel capacity levels.

Some interface application interface gateway modules 172 authenticate and/or authorize client requests through authentication schemes, such as through the access tokens generated by the access token generator. In use, the application interface gateway module 172 provides seamless integration with the remote sources and the backend networks 102 and 104, while providing traffic control, bandwidth rate limiting, security, and/or client authentications.

Event queues 168 and 170 interface the application interface gateway module 172 in FIG. 1 and process asynchronous events, objects, and/or messages through one or more multielement data structures. The event queues 168 and 170 decouple the remote applications and/or remote devices, allowing the service providers to publish events to the event queues 168 and 170 and provide persistence without waiting for immediate local processing. The decoupling provides resilience and scalability by allowing further instances of the backend networks 102 and 104, containers, and/or the remote applications and/or remote devices to be added or removed, allowing the system to handle larger/smaller datasets, client exchanges, and/or transaction volumes (e.g., support larger volumes, sizes, and/or complexities) without affecting the system's operation and/or response times. It eliminates downtime associated with adding or removing hardware and/or software. In FIG. 1, the event queues 168 and 170 enable the distribution of events, objects, and/or messages to two or more internal networks 102 and 104 and/or the remote applications and/or remote device instances enabling parallel processing of events, objects, and/or messages through its FIFO, LIFO, dequeue and/or priority-based insertions and retrievals.

A centralized storage module 166 stores data in its native format between the backend networks 102 and 104 and/or the remote applications and/or remote devices. The centralized data storage stores structured and semi-structured data without enforcing a schema when storing the data. Instead, data is interpreted and structured when the data is read. The centralized storage module 166 eliminates data silos between the system and the remote applications and/or remote device instances while maintaining separations, and is capable of increasing its storage size (e.g., the actual amount of data stored in the storage device), capacity (e.g., the total amount of data the storage device is capable of holding), and scope (e.g., its range of capabilities such as the number of connectivity options, speed of performance, reliability to store data over time, etc.). Some centralized storage modules 166 add capacity automatically. Scaling may occur by an automatic provisioning and/or in some alternate systems, a distributed storage process that assigns more storage capacity to the centralized storage module 166 when monitored storage levels exceed a predetermined threshold that is detected by comparisons.

Figure 2:
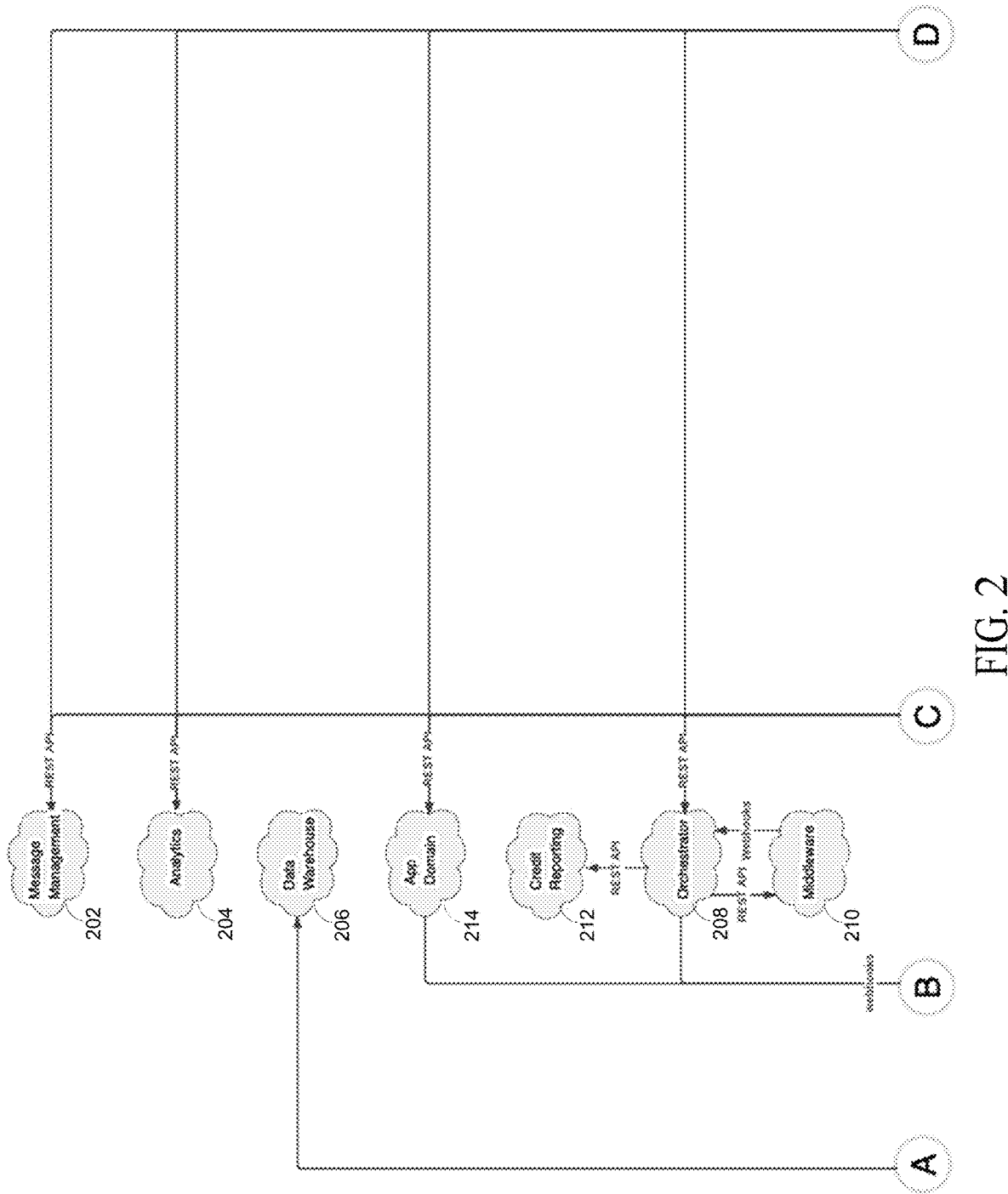
FIG. 2 is an exemplary interface to the adaptable processing network to cloud resources.

The systems interface many integrated and/or remote applications, including remote physical sources, cloud-based services, and technology applications, such as financial technology, for example. In FIG. 2, a message management module 202 provides a cloud-based messaging infrastructure that ensures messages are sent and delivered to recipients. The message management module's 202 application programming interfaces integrate cloud-based message functionality, including electronic mail, Short-Message Service messaging, and in some alternate systems, real-time text messages through mobile/wireless apps. By including two or more communication services in some scalable computer architectures, the localized physical and cloud-based systems maintain redundancy and ensure continuous consistent communication. In some systems, different communication managements and/or modules transmit different types of communication and process messages that have different requirements. For example, messages sent in response to user's account creation, account access from different geographic areas, and password notifications may include different features that require the messages to be optimized to the mobile device's form factor, meet distribution requirements, and ensure faultless delivery; while other messages, such as marketing messages, for example, may require subscription management features, publish and subscribe subscriptions and/or social sharing features that another or separate message management and/or email service module. Subscription management allow recipients to subscribe and unsubscribe to content. Social sharing features allow content to be shared on social media platforms, which encourage promotion.

The cloud-based monitoring and analytics platform module 204 collects and analyzes the system's servers, databases, containers, networks, and/or applications to track resource allocation, trends, identify bottlenecks, etc. In some use cases, the systems monitor the system's data to generate correlations, track error rates, database queries, and/or identify latency issues. The analysis optimizes code in some use cases and generates notifications related to significant events and conditions that may be based on load thresholds comparisons (e.g., when processing exceeds thresholds), pattern detections (e.g., when error or infection sequences are detected), and/or when deviations exceed a predetermined threshold by comparisons, which may also indicate certain anomalies.

A cloud-based data warehouse module 206 utilizing a columnar data storage format automatically manages data storage, data organization, and/or distribution across multiple nodes allowing for parallel processing, including the parallel processing that may occur in backend networks 102 and 104. In some systems, the cloud-based data warehouse module 206 stores data from cloud sources, physical computing systems, and other sources. The cloud-based data warehouse module's 206 application programming interfaces allow access from two or more nodes or computer systems allowing for the isolation and scalability of processes and independent parallel processing.

A cloud-based orchestrator module 208 manages and coordinates multiple tasks and services in a sequence to execute an operation, such as a workflow. A workflow defines the order in which the tasks are performed, the dependencies between steps, the conditions and decision points to determine selected paths based on criteria, and the inputs and outputs of a task. For example, a cloud-based orchestrator module 208 in a fintech application 5310 may ensure all systems can communicate with each other. In an exemplary fintech application 5310, the cloud-based orchestrator module 208 may connect financial accounts to eligible computer applications and services through a cloud-based middleware module 210. The cloud-based middleware module 210 may allow fintech users to add a bank account or connect to a different type of account, interface cloud-based credit reporting modules 212, etc., through their mobile wireless device apps. The cloud-based middleware module 210 may identify financial institutions and authenticate financial accounts.

The cloud-based application domain module 214 manages the functional domain of the system. It is self-contained and includes related functionality, data, and business logic. In another exemplary fintech use case, the cloud-based application domain module 214 may include application programming interfaces and business logic used to create one or more financial accounts, add or remove financial account holder(s), and/or to update to financial account attributes. Its application programming interfaces and business logic create and activates accounts in response to client information that is linked to one or more user's account in a financial context. Some cloud-based application domain module 214 and/or some fintech applications 5310 generate credit cards with installment loan option numbers that are issued to users and referred to as an installment loan card and/or an installment card. A unique installment loan card number is linked to a specific app account number. If a customer completes monetary transactions using the installment loan card associated with an account, those transactions are recorded for that account and that installment loan card in a memory such in the centralized storage module 166, for example.

The application domain module's application programming interfaces and business logic and/or fintech applications 5310 may also generate the installment loan cards in digital form and/or physical form when supporting a financial application. Physical cards are generated and shipped to users by transmitting an authorized request to a printing vendor. The application domain module's application programming interfaces and business logic and/or fintech applications 5310 activate the installment loan cards, registers the installment loan card for online and/or physical use, define users' loan limits, block the installment loan card's use when required, reissue or replace the installment loan cards in case of loss/theft/damage, provide status updates, retrieve installment loan card account numbers when authorized and requested, and/or provide account holder's data when authorized and requested. In some use cases, the application domain module 214 and/or fintech applications 5310 interface on-line services modules, such as services that provide specialized financial service through Internet-based channels that offer a range of financial products and services that may include lending services and other card issuance that allow users to make purchases on credit and repay the borrowed amount over time.

Users may access the system through browsers, web applications, application programming interfaces, and/or mobile wireless devices 5302 and their apps, for example. Some mobile wireless device apps (also referred to as an app or apps) provide a dedicated interface optimized for accessing and displaying content through the form factor of the mobile wireless devices 5302. In some applications, the mobile wireless device apps run in the foreground and/or background. When operating in the foreground of the mobile wireless device 5302, the app is actively displayed on the screen and receives user input and communicates with the system. Users may interact with the mobile wireless device apps' interfaces, perform tasks, access features and/or execute tasks through their mobile wireless devices 5302.

When operating in the background of a mobile wireless device 5302 (also referred to as a mobile device or wireless device), the mobile wireless device app is not actively displayed to the user on the mobile wireless device's screen or receiving external input directed to it but it still performs tasks and processes. For example, in a fintech use case, a mobile wireless device app running in the background (e.g., an intervenor app or intervenor mobile app) may detect a request for a payment service to another mobile wireless device app running in the foreground (e.g., a mobile wireless device app running in an active state receiving and/or responding to user input) or a request for payment processing from one or more users despite not directly serving or fulfilling the transaction. When the detection occurs, the mobile wireless device app not directly serving the transaction may maintain its concurrent operation in the background of the mobile wireless device 5302 or alternatively transition from its background operating state to a foreground operating state automatically creating a multithreaded environment to directly engage the user upon the detection of a payment request. In either state, the mobile wireless device app not directly serving the transaction may offer a payment product and/or make an installment loan card payment offer in response to the payment request allowing the intervenor mobile wireless device app to serve as a payment service to the active mobile wireless device app serving or otherwise fulfilling the transaction. The payment service comprises a provider that facilitates the transfer of money and/or funds between parties of the transaction for the exchange of goods, services, or other obligations. It enables users, businesses, and/or organizations to manage, send, and/or receive payments securely and conveniently among merchants, among peers (e.g., peer-to-peer), and among those that do not usually engage in commercial transactions.

In some open source mobile wireless devices 5302 or mobile device operating systems, a mobile wireless device app may execute tasks in the background without displaying a user interface. A background service in the mobile wireless device 5302 runs in the background and listens for event launch events from active or foreground apps (e.g. the monitored app), generates notifications, and/or executes tasks served by the monitoring app. To start, a manifest declaration may be programmed in the mobile wireless devices 5302 that contains declarations about the mobile wireless device app, such as its name, components, features and requirements. The service may be created by an 'Intent" with an exemplary 'AppLaunchFeatureService' class from the monitoring app. A background service is generated by creating an AppLaunchFeatureService( ) through an instance of an AppLaunchReceiver instance as a subclass of a BroadcastReceiver. Using an onCreate( ) lifecycle callback routine that is part of an Activity class, an open source mobile device operating system registers the AppLaunchFeatureService as an event listener in the mobile wireless device 5302 and registers it as a receiver for intentFilter.addAction(Intent.Action_Package_Feature_Executed) and/or intentFilter.addAction(Intent.Action_Package_Feature_Called). The Intent.Action Package Feature Called and Intent.Action Package Feature Executed are triggered when an app feature is called or performed on the mobile device. Using an int OnstartCommand and a return START STICKY, the service is started and initialization occurs. The 'START STICKY' command from the 'onStartCommand' ensures that the monitoring service is restarted, if it is terminated (e.g., due to resource constraints) after the 'onStartCommand' is called.

Within the AppLaunchReceiver class, an onReceive( )method is called when an app event is received from the foreground or active apps. The mobile wireless device app code checks to determine if the action is invoking or executing a specific function, and extracts the name of the called or performed function from intent data. If the extracted name matches the desired feature, such as requesting a payment service (e.g., PaymentMethodActivity), for example, a silent/non-visual notification and/or data message is sent through a local on device messaging service and/or off device messaging service, such as a local or cloud-based-messaging service. The messaging service may use token registrations that may include data payloads related to the called and/or executed feature to the background app. The silent/non-visual notification and/or data message may be transmitted to the monitoring backend app without displaying the notification or message on the display or to the user.

When the notification is received, the background mobile wireless device app may launch an activity, such as providing a user interface that brings the background mobile app to the foreground. An exemplary activity may offer a payment service, including installment loan card service and/or loan fulfillment details, for example. Some user interfaces automatically populate fields of the monitored foreground mobile app serving the transaction when authorized, reducing repetitive and streamlining activities, such as filling in payment details of the installment loan card in the monitored app, for example.

In an alternative configuration, the background mobile wireless device app may receive notifications when a monitored app is launched and/or when the monitored app is replaced by setting up an AppLaunchReceiver class. When the 'onReceive( )' method is triggered upon receiving an app launch, the mobile app running in the background verifies whether the action corresponds to an added app. (e.g., 'Action Package Added') or a replaced app (e.g., "Action Package Replaced") and offers it services accordingly.

Some closed source wireless or mobile wireless device 5302 (also referred to as a wireless mobile device or mobile device) operating systems run apps in sandboxes, meaning the apps operate independently and may not be directly tracked or have their activities tracked. In these closed source mobile wireless device operating systems, an interprocess communication may allow a servicing app (also referred to as the background app) and serviced apps (also referred to as the active or the foreground app) to communicate with one another to integrate the services of the servicing app with the serviced app. In this alternative, the background app creates an extension, such as a payment request extension, that integrates payment functionality into the foreground app. Customized statements that specify a transmission protocol and an identifying number, such as a customized uniform resource locator, allows the foreground app to pass data to background app to perform specific actions, such as offering alternative payment services like offering an installment loan card for payment, for example, without displaying the data. By registering the customized statements in the background app, the background app executes tasks, such as offering installment payment card options, for example, to other native and non-native apps. A customized statement scheme handler responds to the customized statements extracts the relevant information from the statement and invoke the functionality provided by the background app. In this alternative, the app running in the foreground provides the additional information and functionality to the user it services, but, in some use cases, does not make the background app an active app when the extension is activated.

In yet another alternative wireless or mobile wireless device use, a natural language processing engine uses grammars to identify one or more intents such as a request for a payment service from conveyances such as voice commands, Short-Message-Services, electronic mail, exchanges through browsers, or spoken dialogue that occurs during a telephone call or a dictation of a mobile device. A grammar may be stored in a file in the mobile wireless device 5302 and/or in the cloud and contains a list of words and phrases to be recognized by the mobile device, and in some instances, include programming logic to launch the background app providing payment services. All active grammars make up a vocabulary. The natural language processing engine retrieves the media, (which may include a translated voice-to-text segment if originating input is speech and/or audio), compares it to a vocabulary, and matches the media to the vocabulary's words and/or phrases. The natural language processing engine extracts or generates sub-entities from the conveyance and adds them as payload data to the intents to form a data structure. Some payloads include confidence scores that indicate the likelihood of a successful recognition. When confidence scores exceed a predesignated threshold, the data structure is routed to the designated app through a notification that may or may not have been directly serving a transaction to notify the designated app that a payment service may be needed. The receiving app may launch in the foreground or stay in the background and offer a payment product, such as an installment loan card payment service. The installment loan card payment service may be made as images, graphics or textual offers (e.g., a visual offer), an audio offer, or a combination images, graphics, text, video, and/or speech (e.g., audio). An audio offer may be made through a voice generator that converts a written text input into speech by the sending or receiving app or an app interfaced to one or both of them. The voice generator may generate speech through prerecorded audio samples and/or by concatenating speech sounds that generate different voices, accents, speech, and/or personality characteristics that resemble real and/or fictional characters. Fictional characters may take many forms, including animated characters, real or simulated animals, celebrities, and/or inanimate objects brought to life, and/or multiple combinations of those.

Some use cases of the system serve financial technology that offer a credit card with an installment card option referred to as an installment card. The installment card option may take a digital form or a physical form like a charge card that provides the capability to convert a charge card balance into an installment loan. The installment card option includes a repayment framework of a revolving installment payment plan that allows for the payment between users or for goods and/or services over weekly, monthly, or quarterly periods. The periods occur over a loan's term and include a cost of borrowing that includes interest charges (if applicable), fees (such as late payment fees, insufficient funds fee, etc.), and/or applicable charges. When card outstanding balances are paid in full before/when they are due, the outstanding balances do not include the cost of borrowing. When the outstanding card balance is converted into an installment loan, a cost of borrowing are swept into the installment payment plans with a pre-assigned term and predetermined payment intervals by the user. Besides the costs of borrowing, installment card options assess interchange rates that are charged to recipients, like merchants that accept them, which underwrites the cost of processing transactions, partially offsets fraud protection expenses, and is used to maintain the installment payment services.

Figure 4:
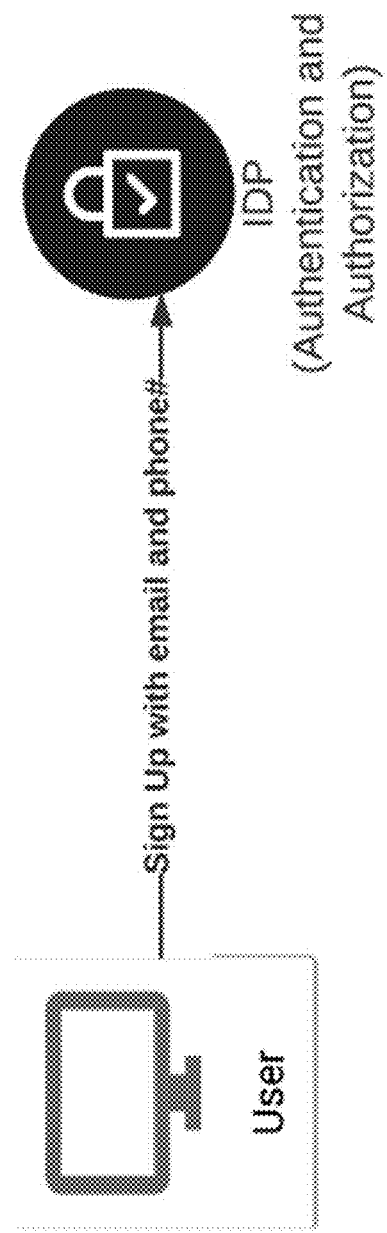
FIG. 4 is an exemplary authentication process that manages and verifies users and provides access to applications securely through an identify provider service executed through a mobile wireless device served by the adaptable processing network.
Figure 15:
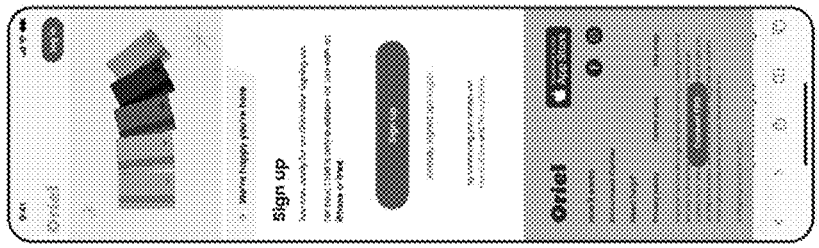
FIGS. 15-17 are graphical user interface flows of an exemplary registration executed through a mobile wireless device served by the adaptable processing network.
Figure 15:
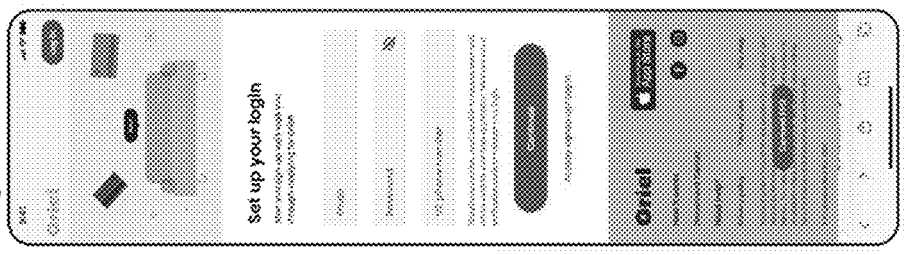
Figure 15:
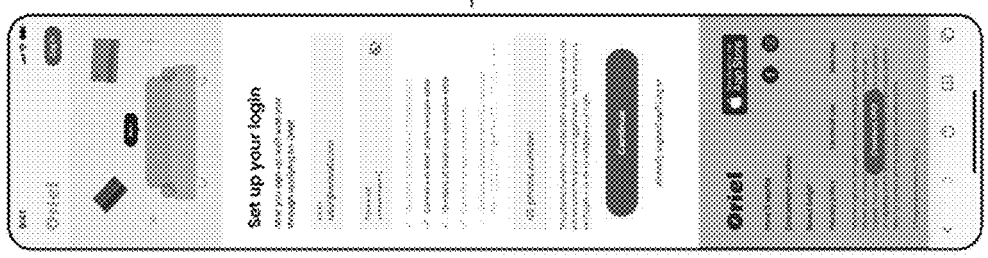
Figure 16:
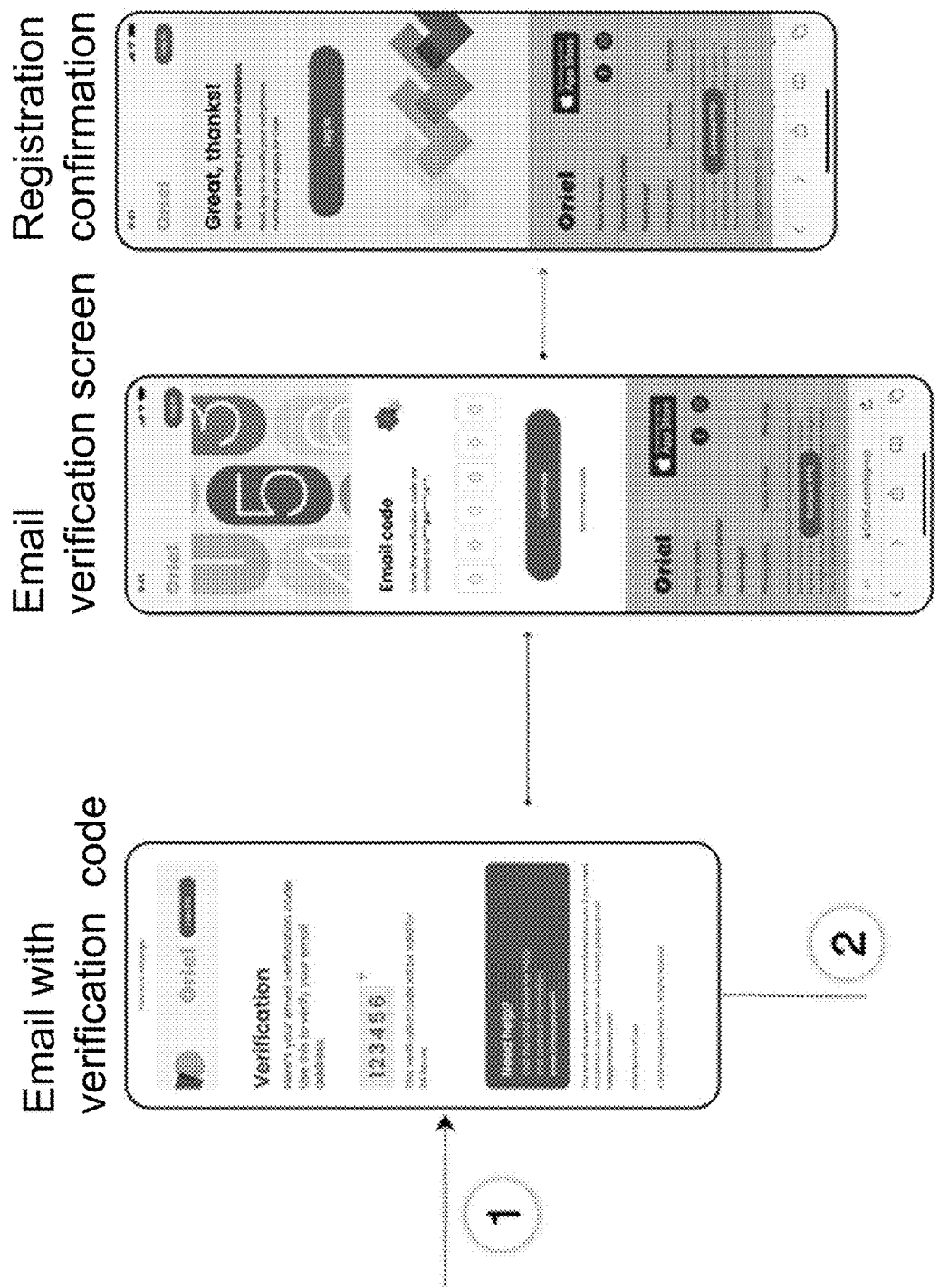
Figure 17:
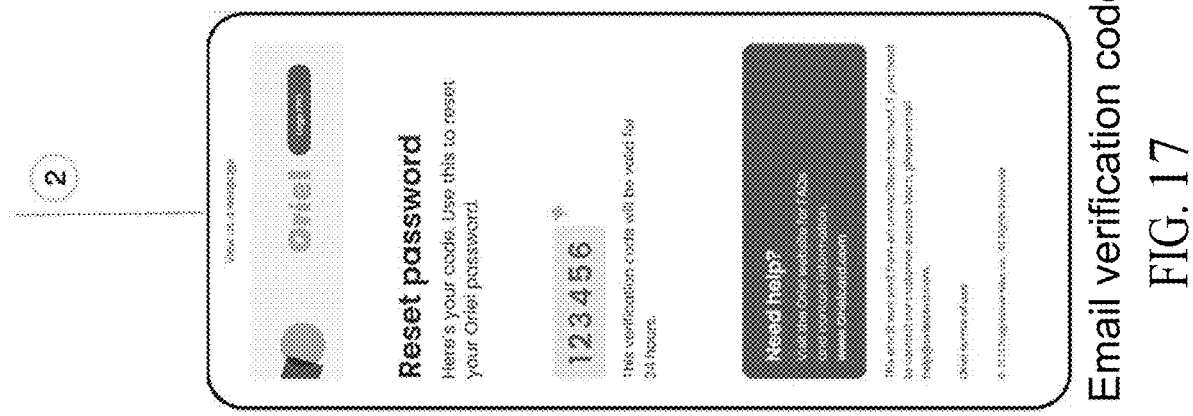
Figure 30:
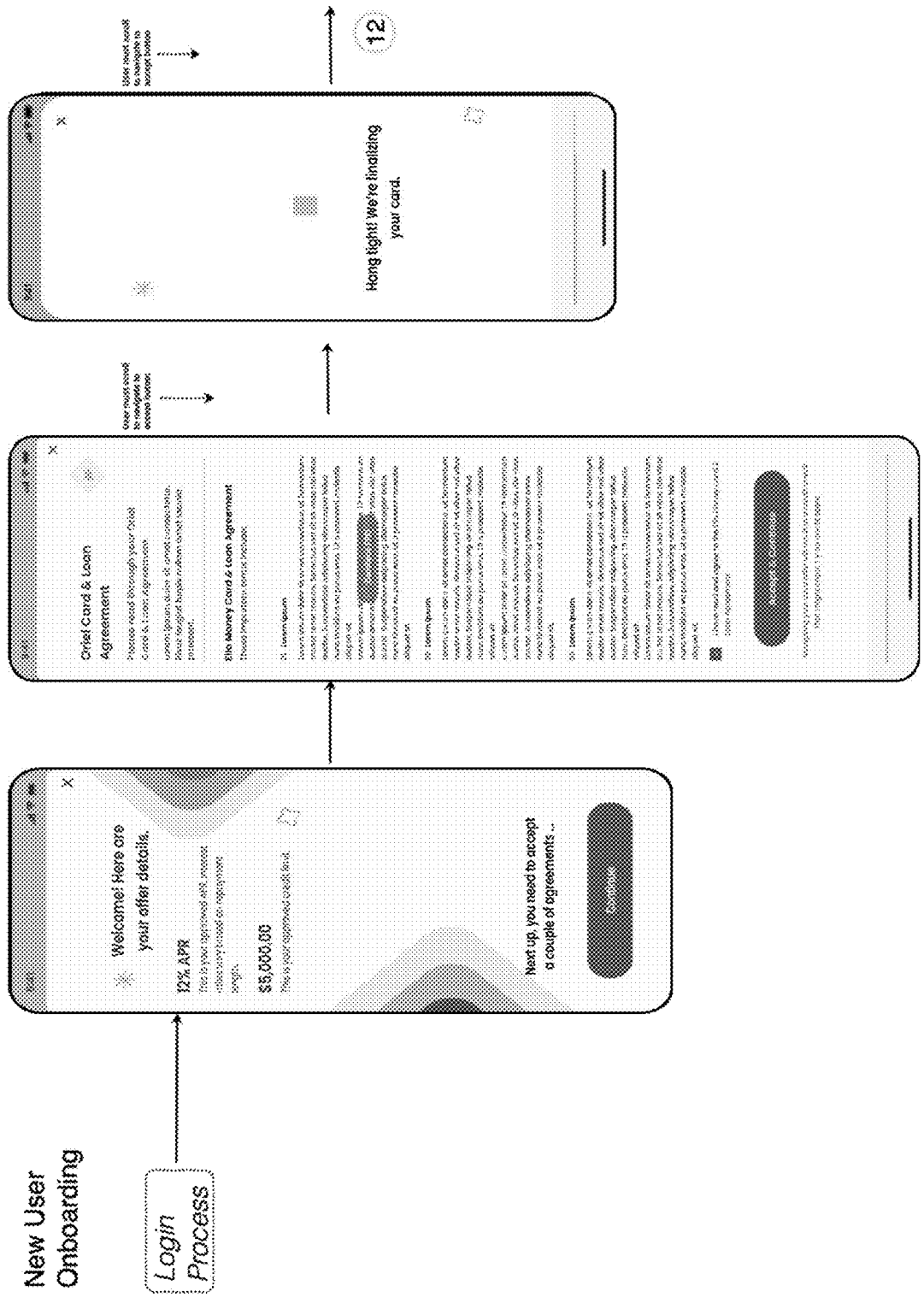
FIGS. 30-31 are graphical user interface flows of an exemplary onboarding process executed through a mobile wireless device served by the adaptable processing network.
Figure 31:
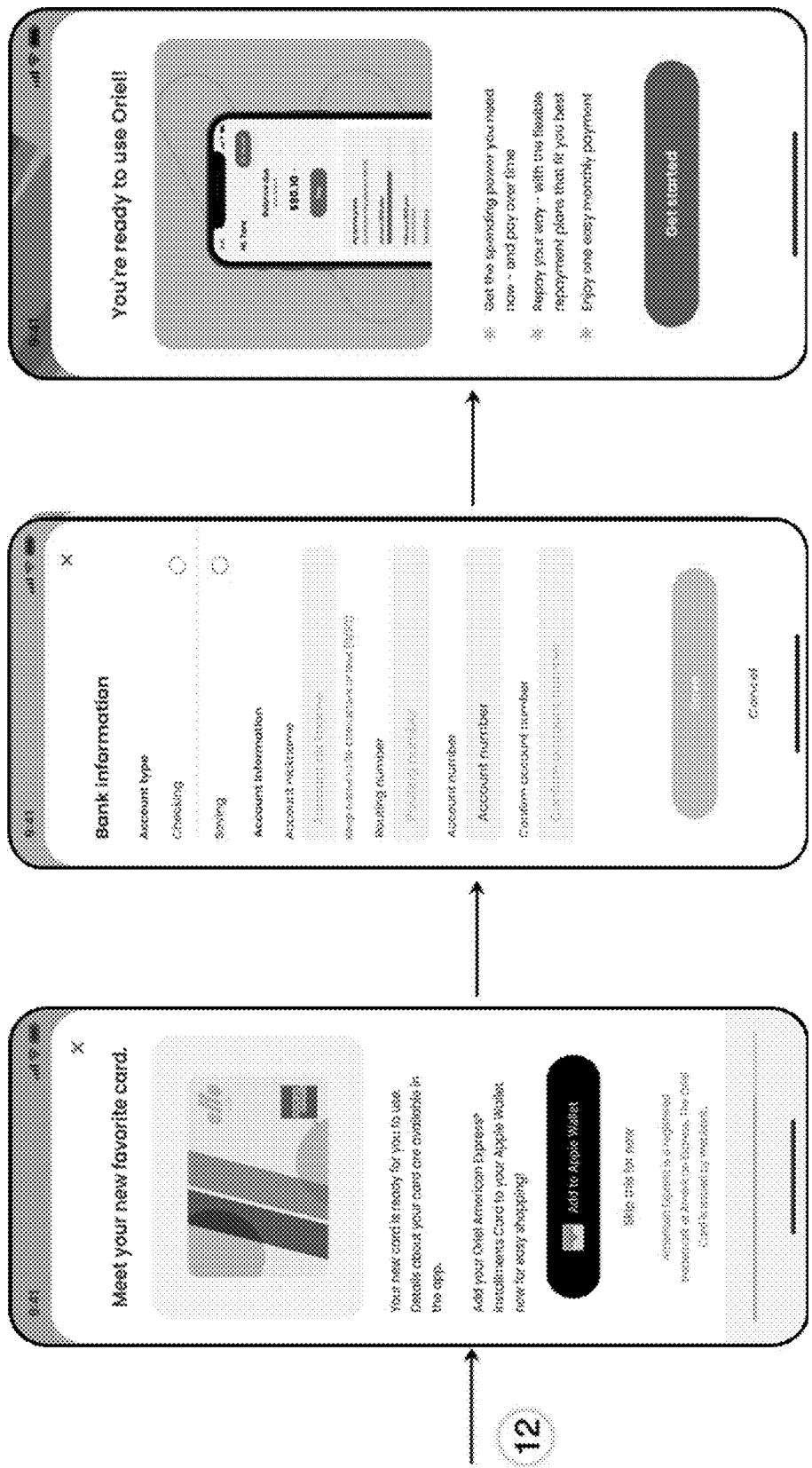
Figure 32:
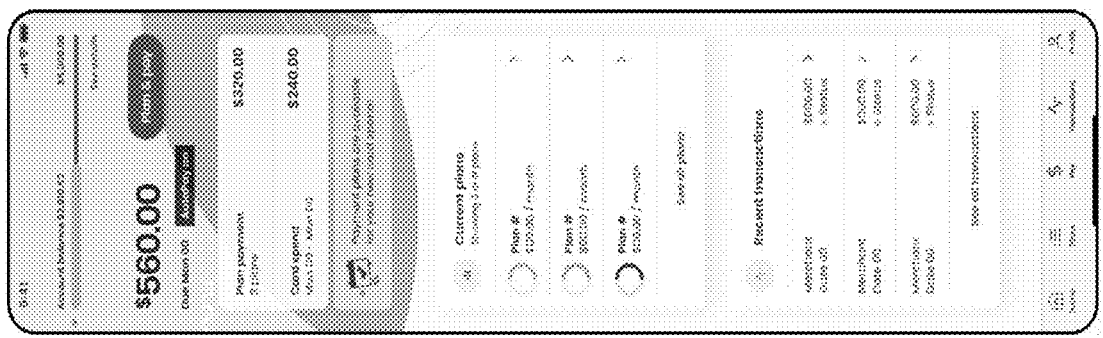
FIG. 32 is a graphical user interface rending of a pending transaction and related data executed through a mobile wireless device served by the adaptable processing network.
Figure 33:
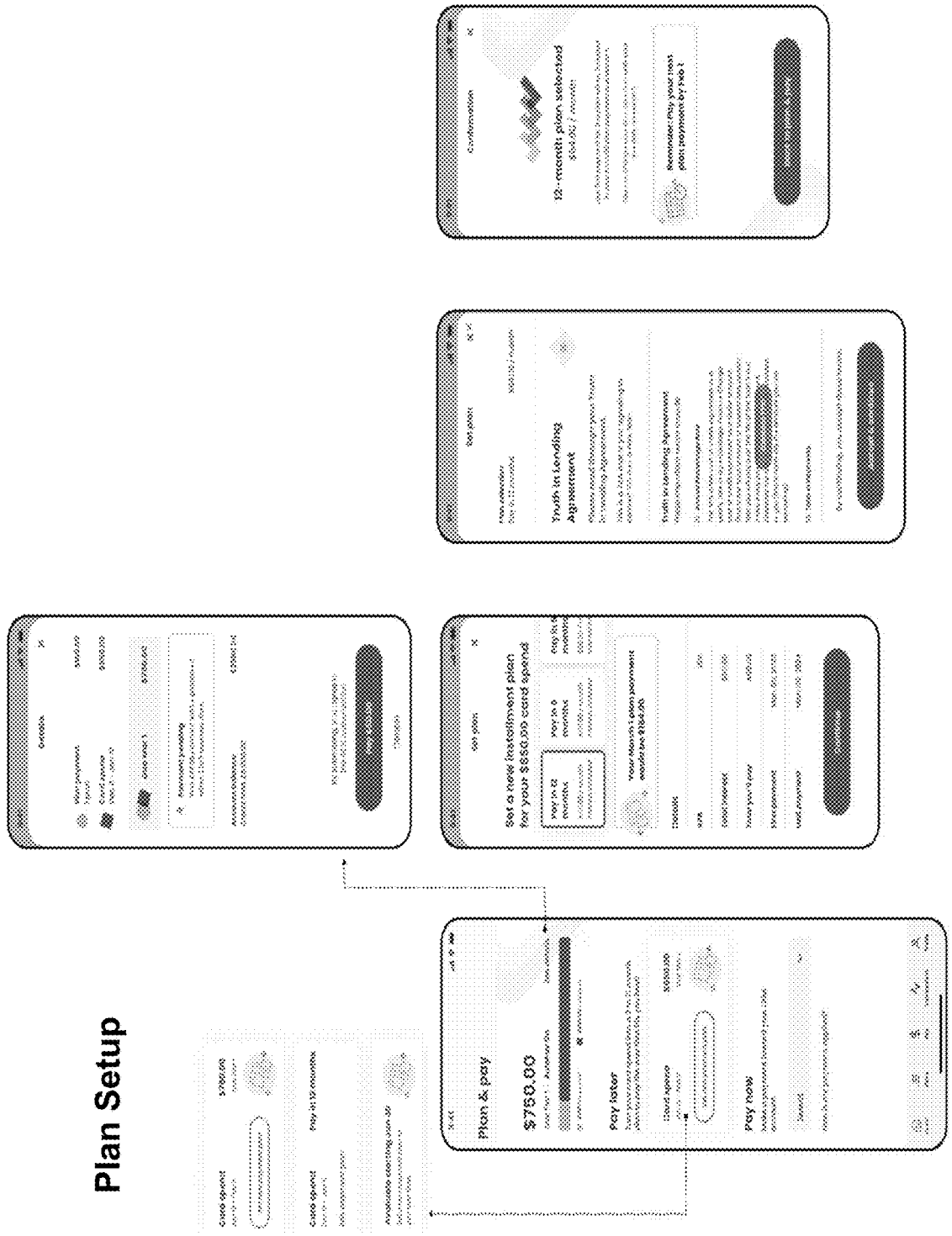
FIG. 33 is a graphical user interface flow of an exemplary plan setup flow that shows the navigation and interactive execution paths executed through a mobile wireless device served by the adaptable processing network.

To create an account in an exemplary fintech account, a user provides the requested information and credentials to the identity management services module 158 in the requested fields through the account registration flow shown through fintech mobile application dashboards or the app represented in FIGS. 15-17. The fields of the app or dashboard may request email addresses, phone numbers, user names, and passwords, for example, as shown in FIG. 4, to a system that manages and verifies the identity of the user for authentication purposes (e.g., an IDentity Provider or IDP). In some systems, users verify email addresses and/or phone numbers through the mobile wireless device app by actuating a verification link or providing a code transmitted through the email service module 160, as shown in FIGS. 16-17. Users may be required to review terms of service policies, privacy policies, lending agreements, and other agreements and provide financial information, such as banking information, during the registration and on-boarding process before reaching a home page through the app, as shown in FIGS. 30-32. The agreements and information may be stored in a database, such as the systems' open-source relational database management systems 140 and 142 of FIG. 1, for example.

Figure 5:
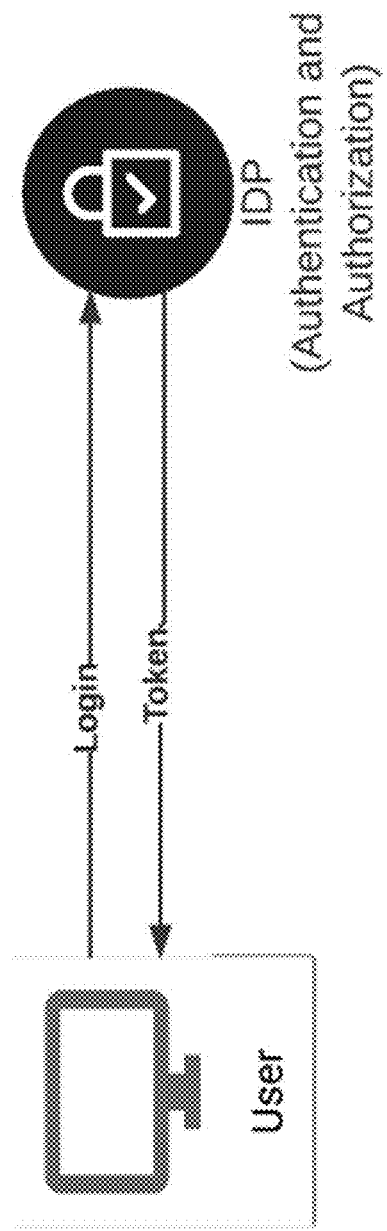
FIG. 5 is an exemplary log-in process of an application served by an identity provider service accessed through a mobile wireless device served by the adaptable processing network.
Figure 18:
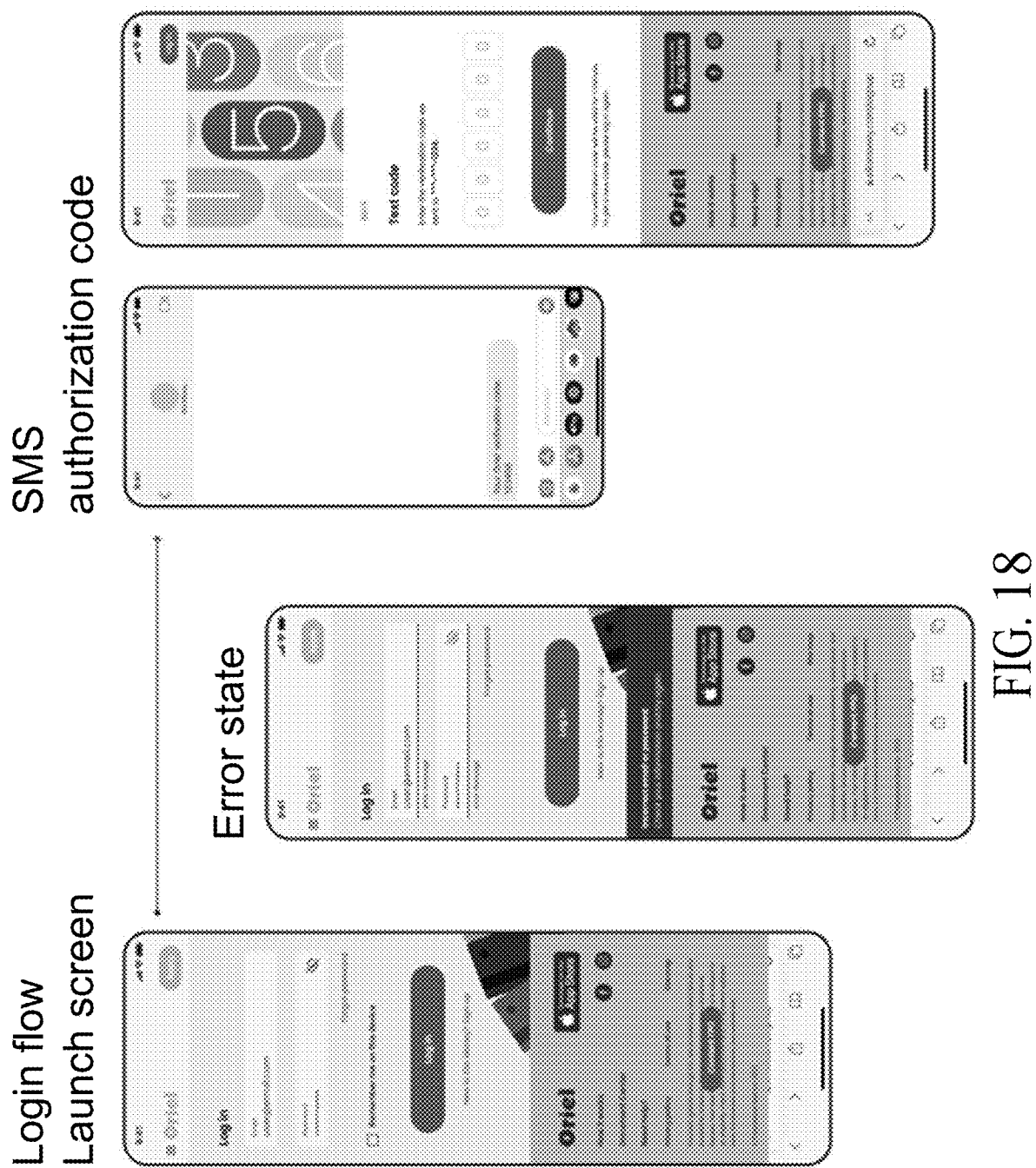
FIGS. 18 and 21-26 are graphical user interface flows of an exemplary login process that show the navigation and interactive execution paths executed through a mobile wireless device served by the adaptable processing network.

Logging into the system may require an extra layer of security. Besides entering user names, emails, phone numbers and passwords, some systems require users to enter verification codes received through Short-Message-Services or phone calls to the mobile device number registered to the account. The codes may be received through the registered mobile wireless device's telephone number and text messages through the mobile device's messaging service, as shown in FIG. 18. Access is granted when user names, emails or phone numbers, and passwords and verifications codes are correct, which causes the system to issue an access token to the mobile device and fintech app, as shown in FIG. 5. The access token is credentialed with the user's security levels and/or authorization levels and permissions levels to access specific resources on the system for a specified period of time.

Figure 21:
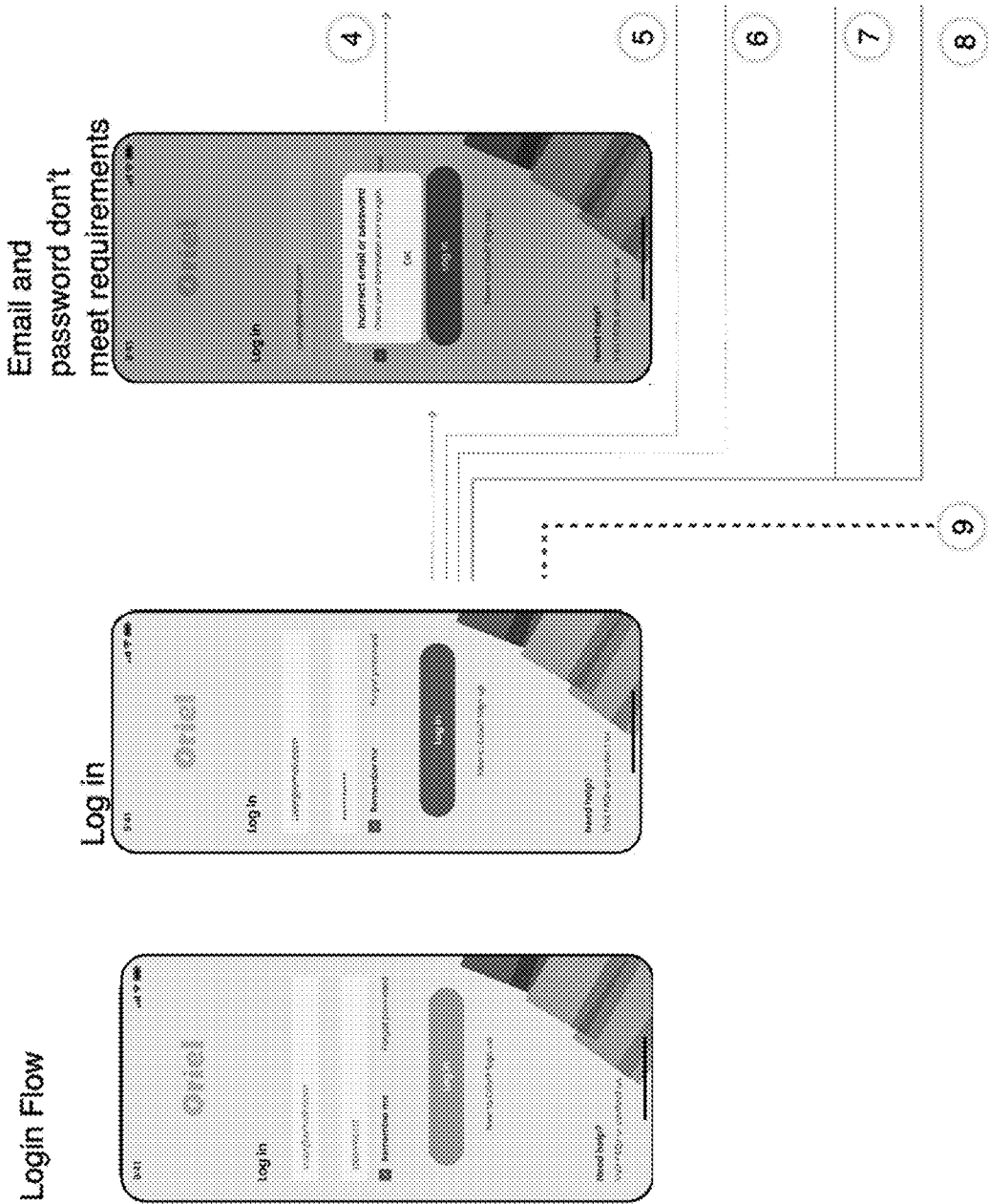
Figure 22:
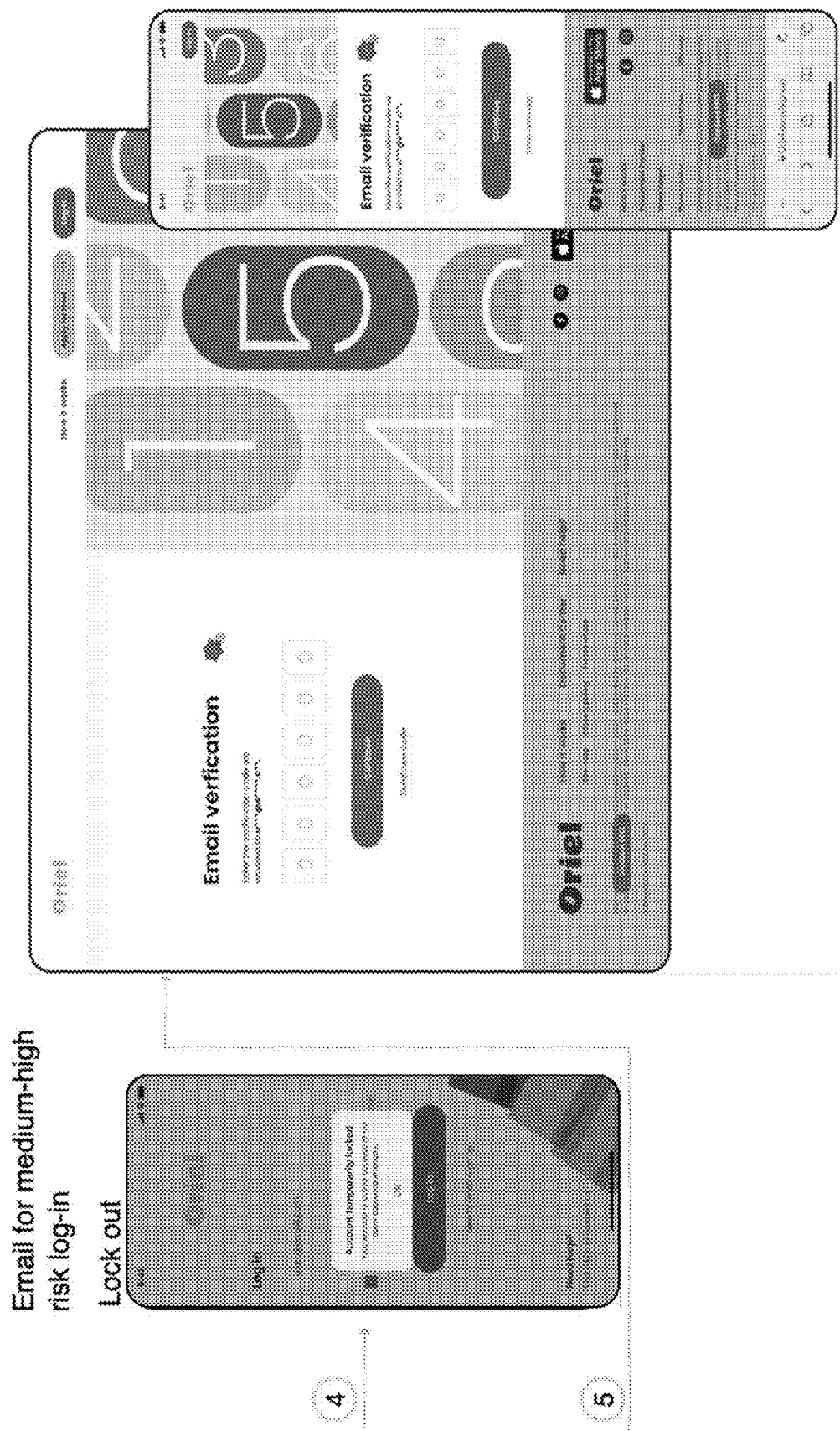
Figure 23:
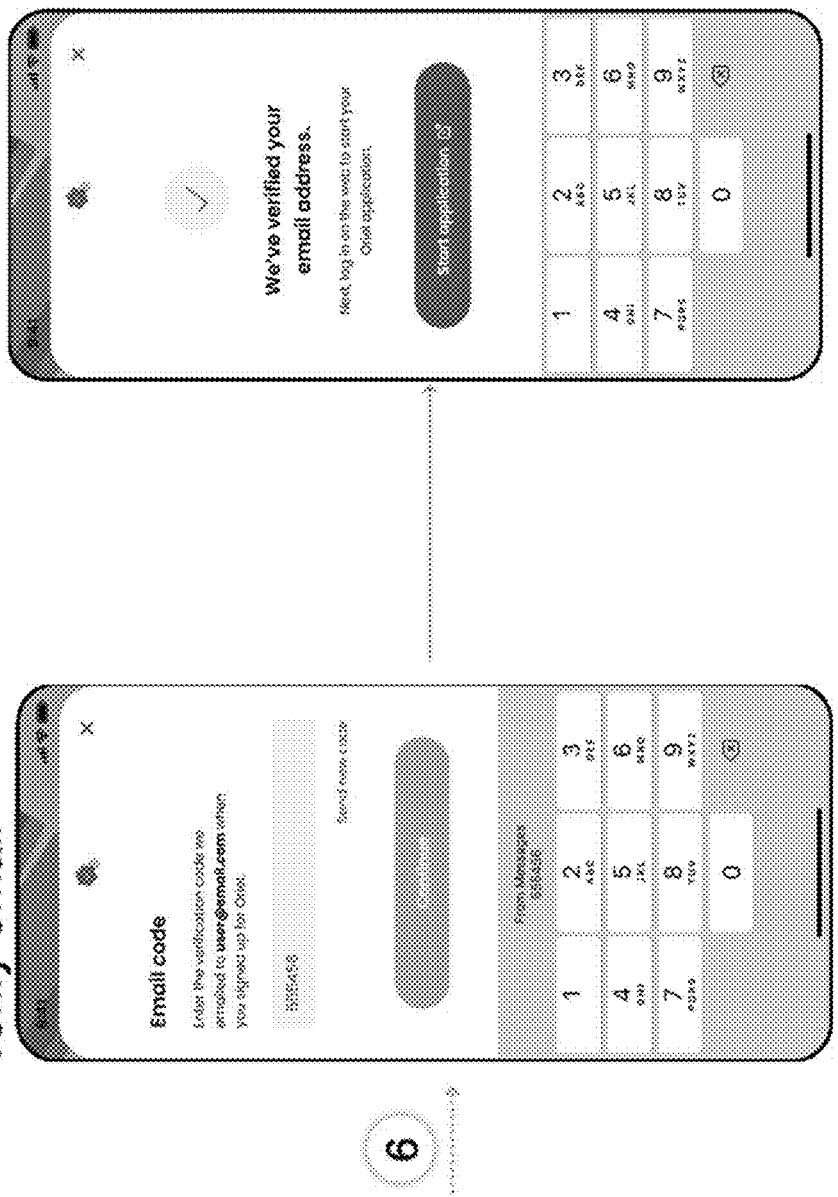

When the credentials received at the system are not correct, access may be denied and the account may be locked in some use conditions, as shown in FIGS. 21-22. In an email re-verification process, the system requires the user reverify an email address. This may occur to account for security updates, inactivity, suspected malicious activity, etc. In some processes, the system notifies the user through the identity management services module 158 of FIG. 1 through emails within instructions on how to complete the re-verification process that may include sending a unique uniform resource locator link that initiates the reverification process when actuated, as shown in FIGS. 21-23. When actuated, the user is redirected to a Web page or resource that restores the user's access privileges and transmits an access token to the user's mobile device when a verification code that matches the verification code sent to the mobile wireless device 5302 via electronic mail is entered.

Alternatively, some identity management services modules 158 generate a unique verification code that the system transmits to a user's mobile device via a short-message-service (SMS) to authenticate users, as shown in FIGS. 21, 24-26. When received by the system and when the verification code matches the verification code that was sent to the user's mobile wireless device 5302, the system issues access privileges to the app through the mobile wireless device 5302 by issuing an accesses token to the user's mobile wireless device 5302, credentialed with the user's security levels, authorization levels, and permissions levels for a period of time. Some systems send a log-in notification or an account activity notification when a login occurs from a device that the system considers to be unfamiliar or different from the user's usual login patterns. The notification may include a date, time, the IP address, and/or the type of operating system used to access the cardholder's account.

Figure 19:
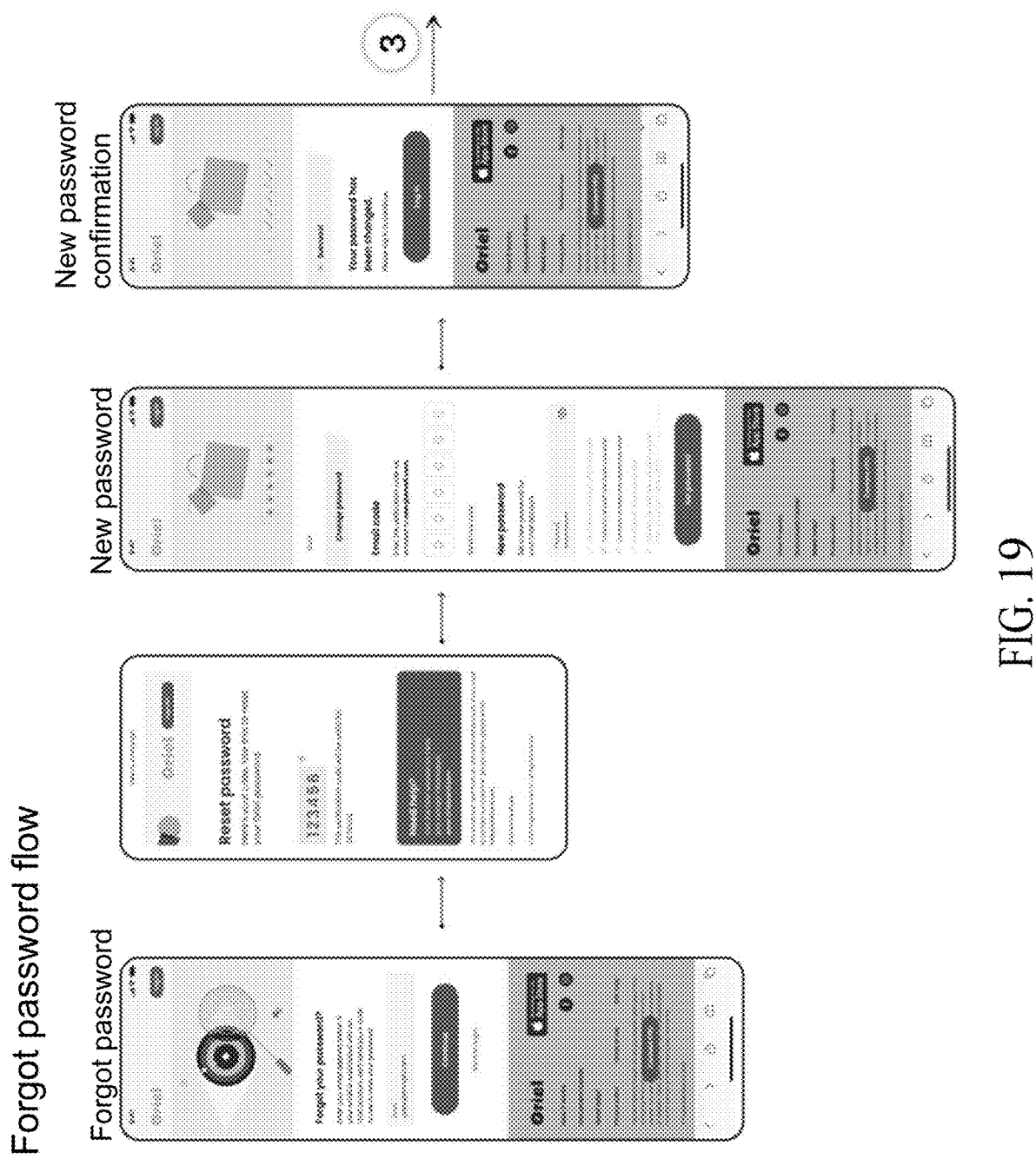
FIGS. 19-20 and 27-29 are graphical user interface flows of an exemplary password recovery and password reset flow that show the navigation and interactive execution paths executed through a mobile wireless device served by the adaptable processing network.
Figure 20:
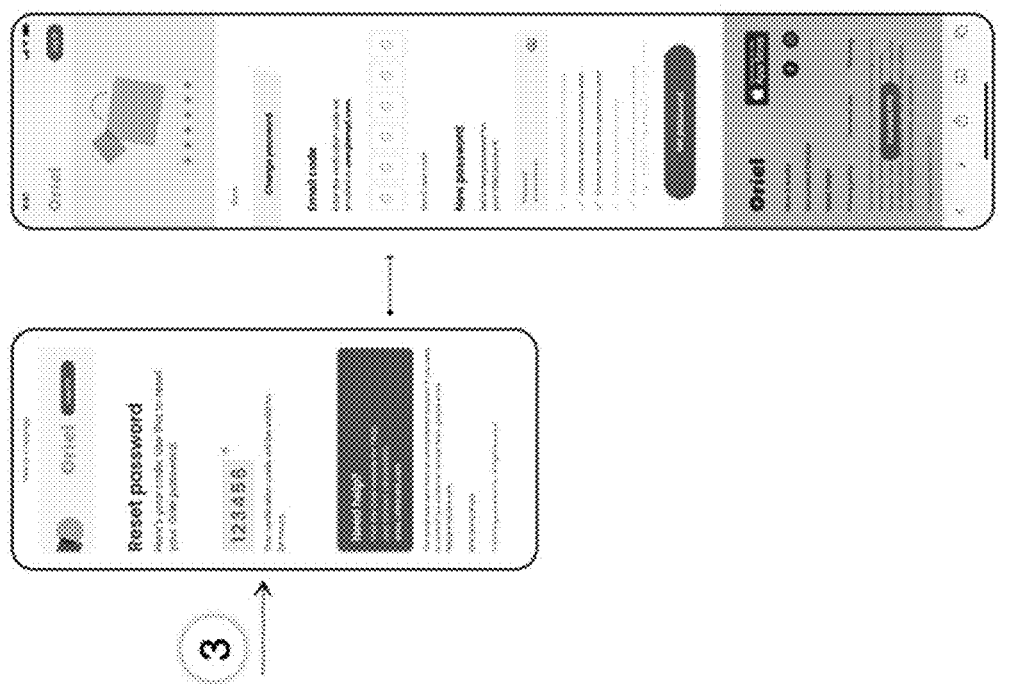
Figure 27:
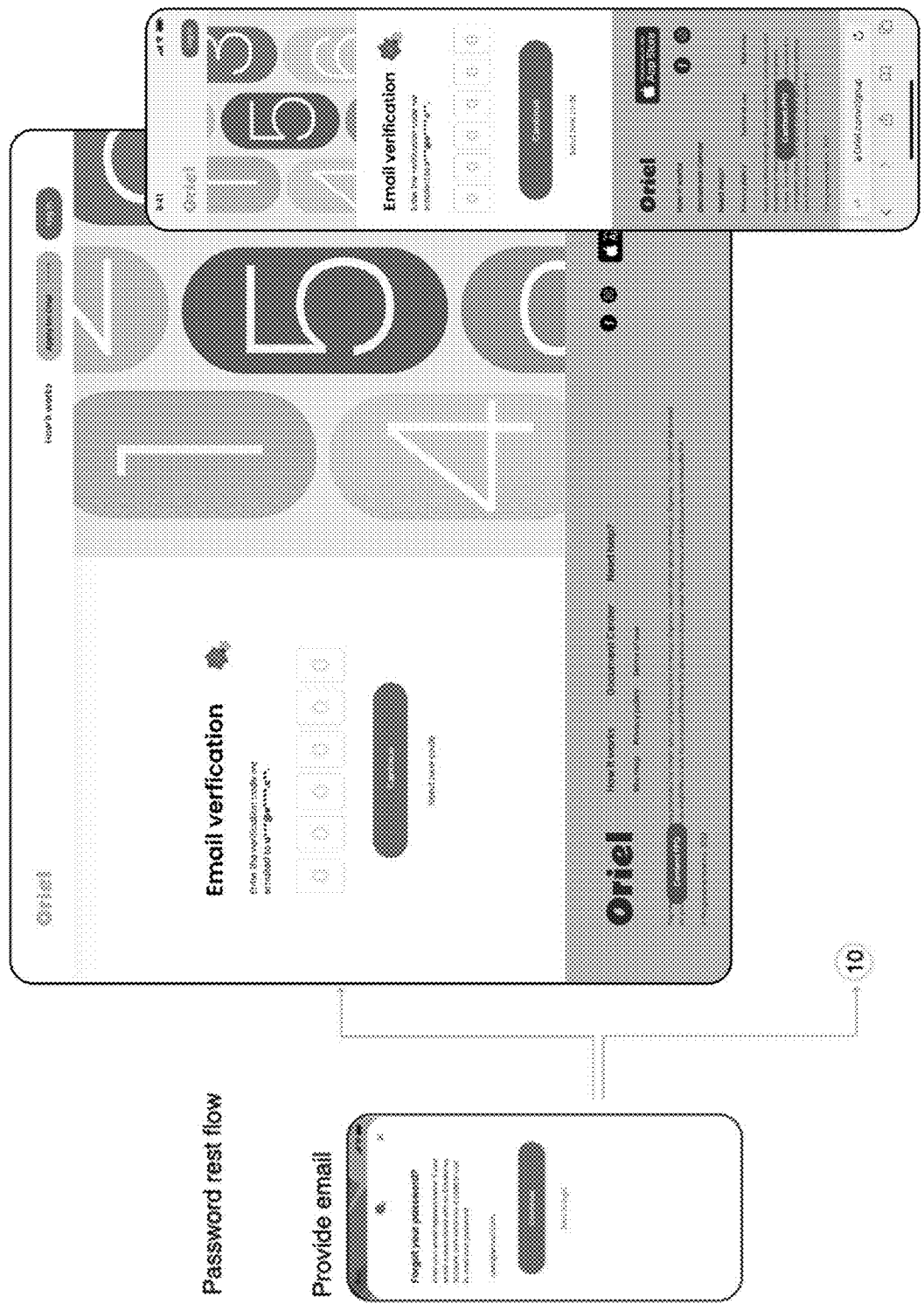
Figure 28:
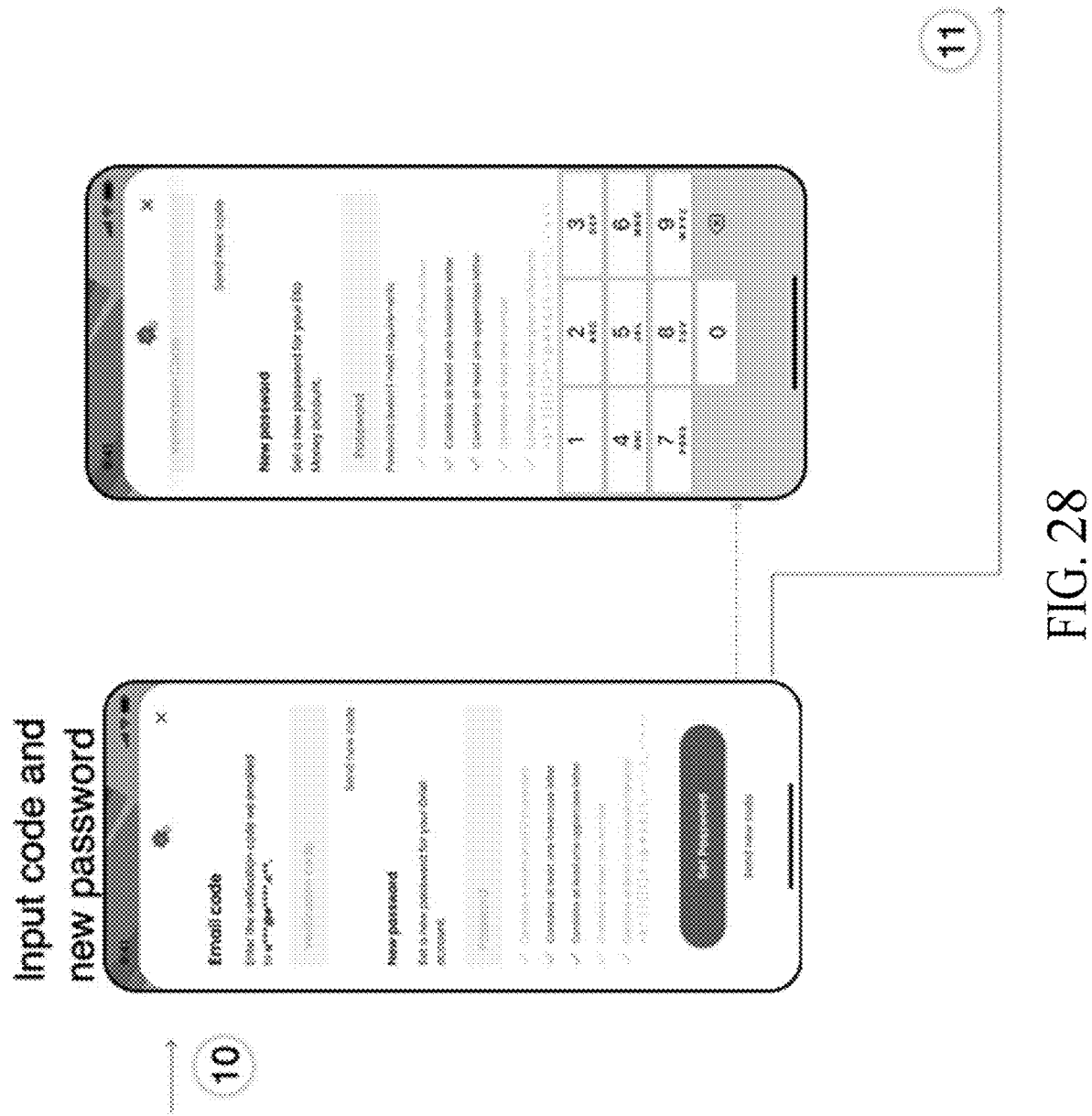
Figure 29:
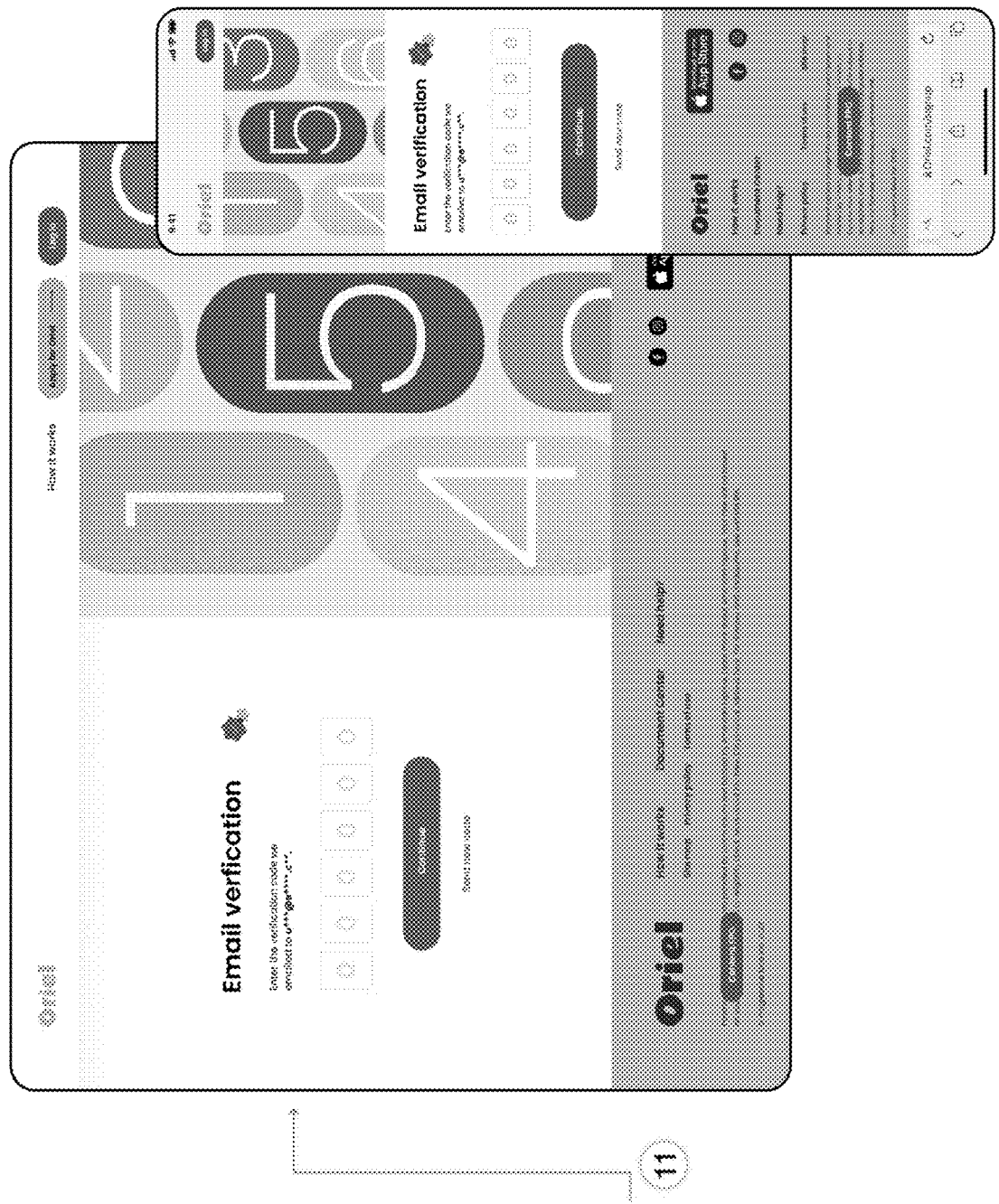

When passwords are forgotten, a verification code option may allow the user to reset their password though the fintech app's dashboard, as shown in FIGS. 19-20. When the verification code is entered into the password page, the app prompts the user to enter a unique password. Often, the system receiving the password compares it against a stored list of previously used passwords, and if not previously used, resets the password and confirms the password with an email notification and/or on-screen notification. As shown in FIGS. 27-29, the password reset flow may occur through a combination of Web page links and fintech app prompts that result in a password reset confirmation.

Figure 6:
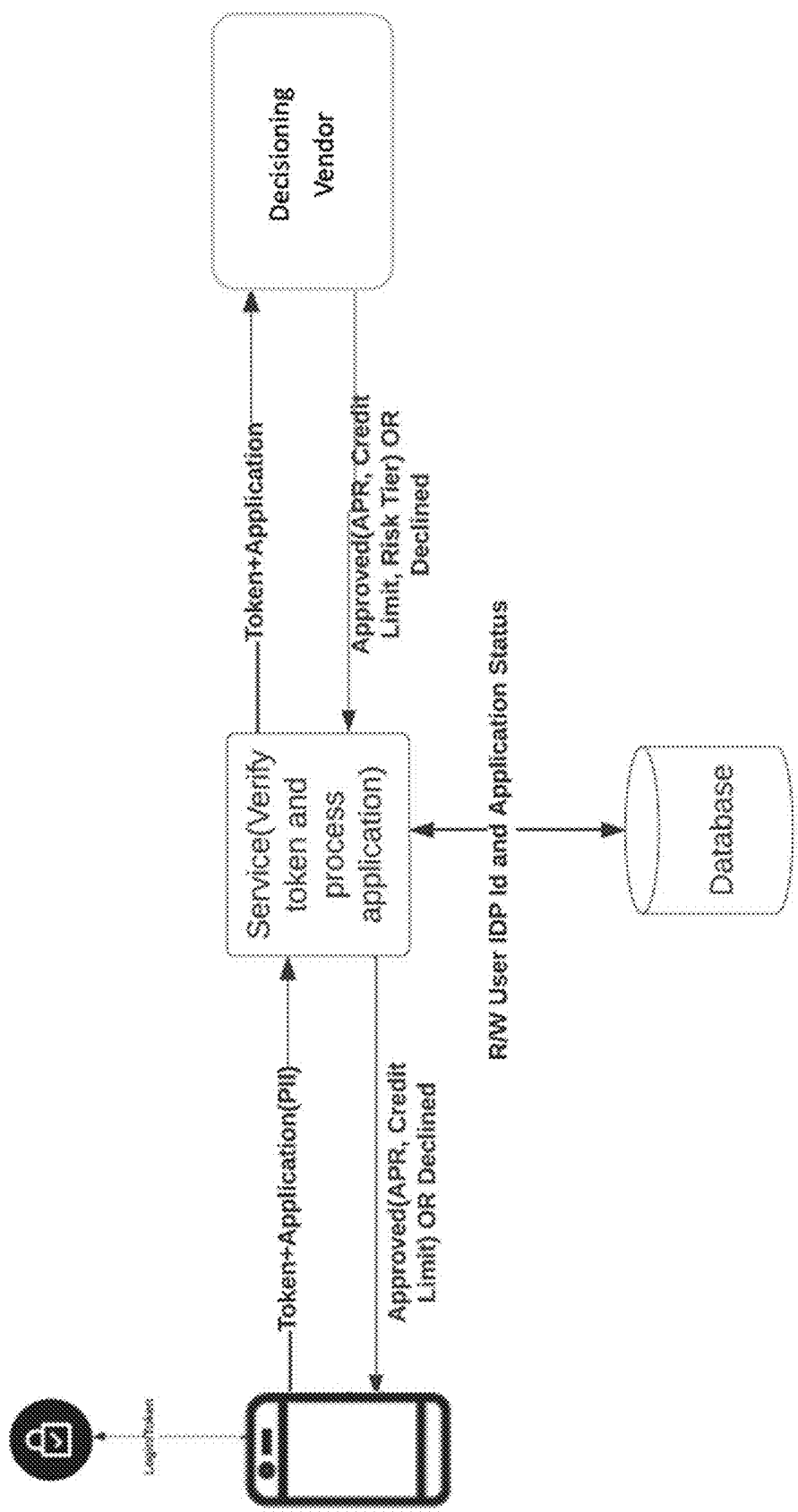
FIG. 6 is an exemplary application process executed through a web site and/or mobile wireless device served by the adaptable processing network.
Figure 14:
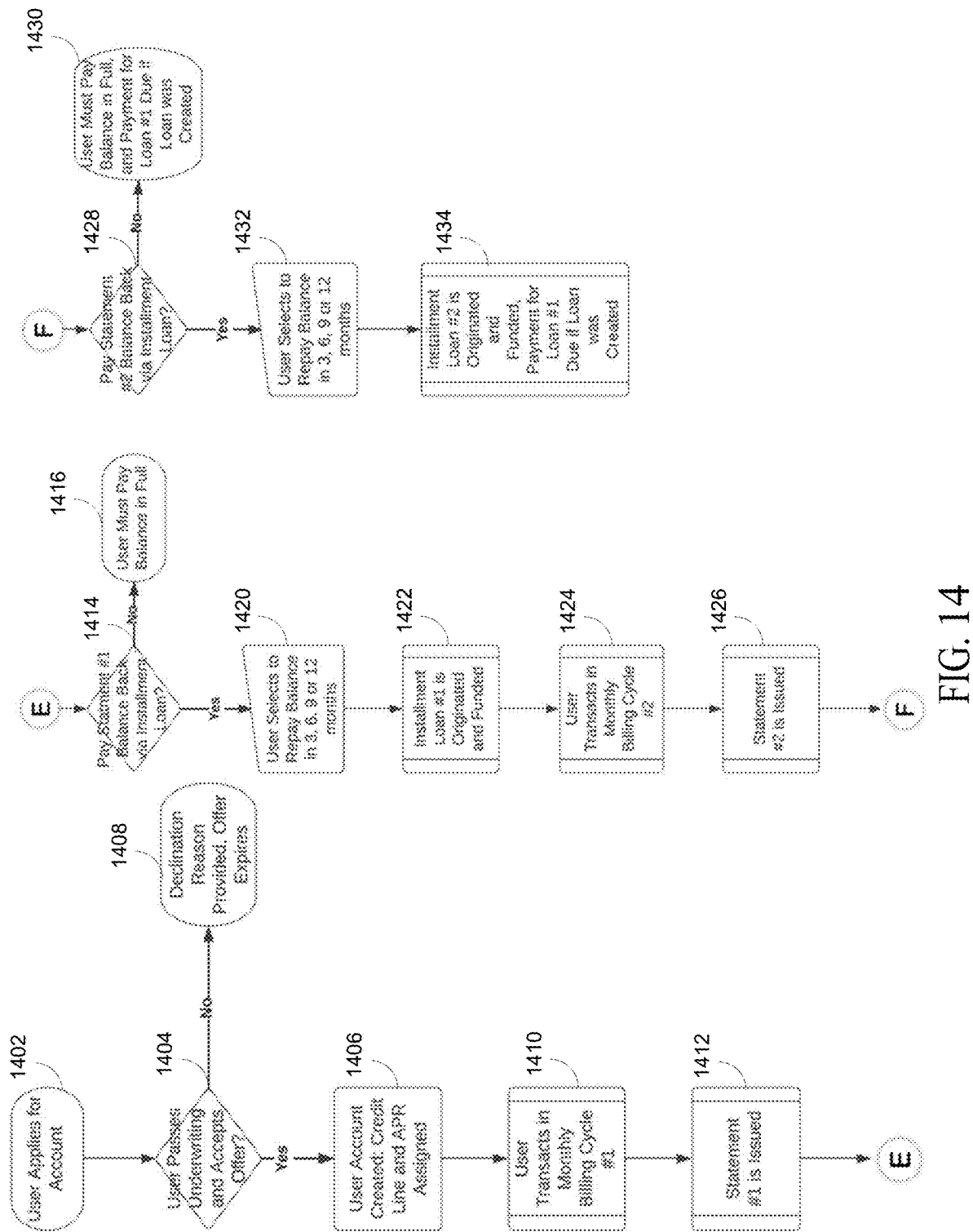
FIG. 14 is an exemplary flow through multiple statement cycles executed through a mobile wireless device served by the adaptable processing network.

To establish a credit line or credit account, such as a credit card with an installment option, an exemplary system collects personal and financial details and other relevant information from a user in the form of an application at 1402 of FIG. 14 through an on-boarding process (e.g., FIG. 30-31), which is then processed to assess a user's eligibility and credit worthiness at 1404 of FIG. 14. Personal information may include a user's name, postal address, email address, and social security number. Personal information may also include employment information, such as the applicant's employer's name, job title, length of employment, and/or annual income. Financial information may include bank account balances, investment account balances, and/or outstanding debt balances. Other relevant information may include details on credit card balances, loan balances, mortgages, other forms of credit, credit reports, etc. The application is passed with the user's access token to the secrets manager module 144, as shown via FIGS. 1, 2, and 6, which is stored in the systems database, such as the systems' open-source relational database management systems 140 and 142 or data warehouse 206, for example. When the access token is authenticated, it is passed through the application interface gateway module 172 to the orchestrator module 208 and a vendor processor that evaluates the applicant's personal information, employment and/or income history, financial information, credit history, and/or information associated with the applicant's social security number. The vendor processor activates the installment accounts, establishes an Annual Percentage Rate (APR), optional origination fees, optional annual fees, optional closing costs, and others costs that establish the true cost of borrowing and updates account attributes, etc. The vendor processor may also execute other functions described herein at 1406 all of which are stored in a database, such as the data warehouse 206, for example.

Figure 11:
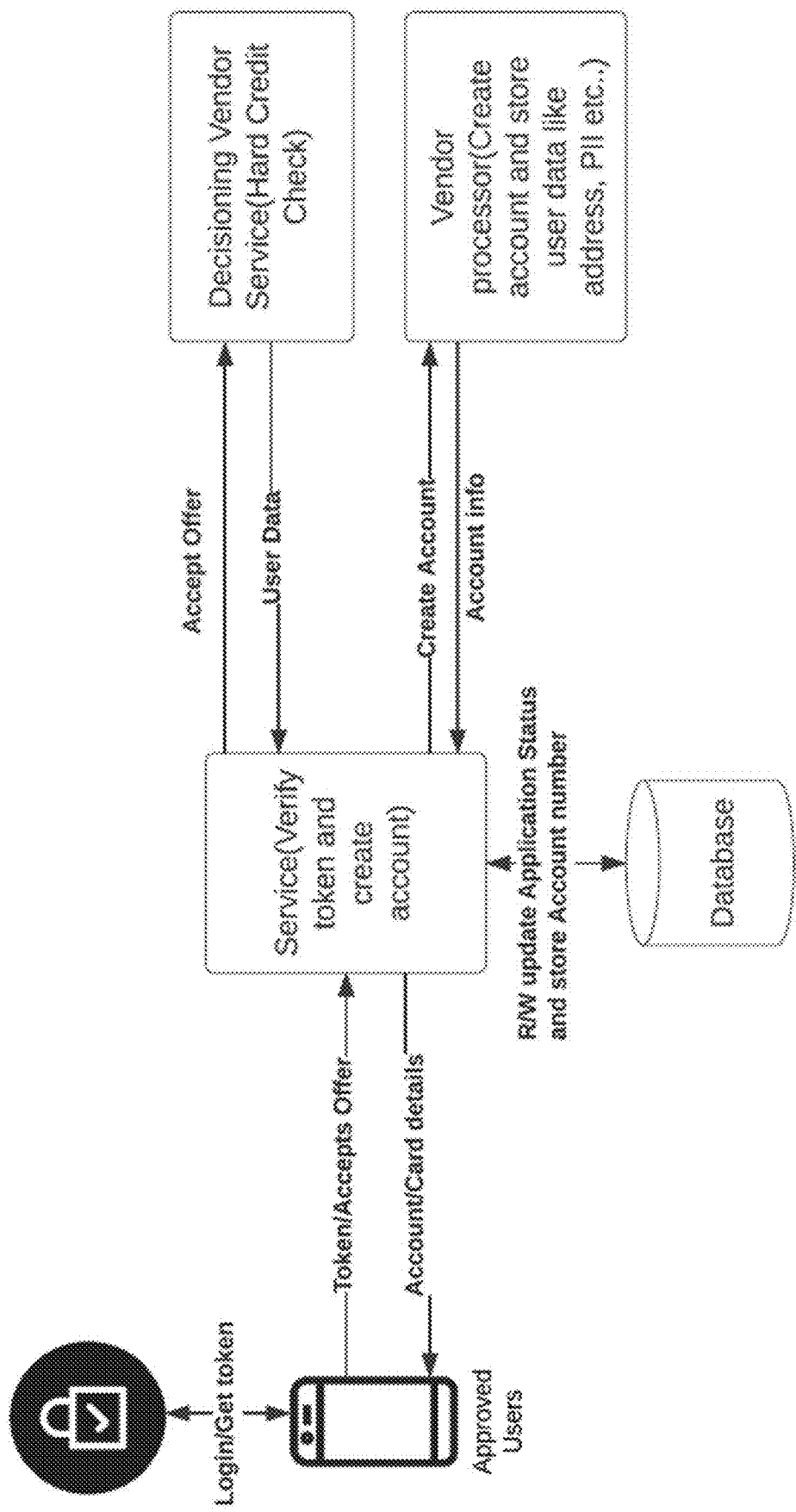
FIG. 11 is an exemplary acceptance executed through a mobile wireless device served by the adaptable processing network.

In some use cases, a credit card with an installment card option application review occurs as a result of an accepted offer as shown in FIG. 11. When approved and configured, the card may be used online, in physical stores, with service providers, in peer-to-peer (P2P) payment exchanges, and/or with anyone or anyplace that accepts credit card payments. If the application is rejected or denied, an Adverse Action Notice issues and is transmitted to the applicant's mobile device electronically that explains the reasons for the decision at 1408 (shown in FIG. 14). The Adverse Action Notice can also be viewed in the document center accessible through the graphical user interface of the mobile wireless phone app shown in FIG. 52.

Figure 24:
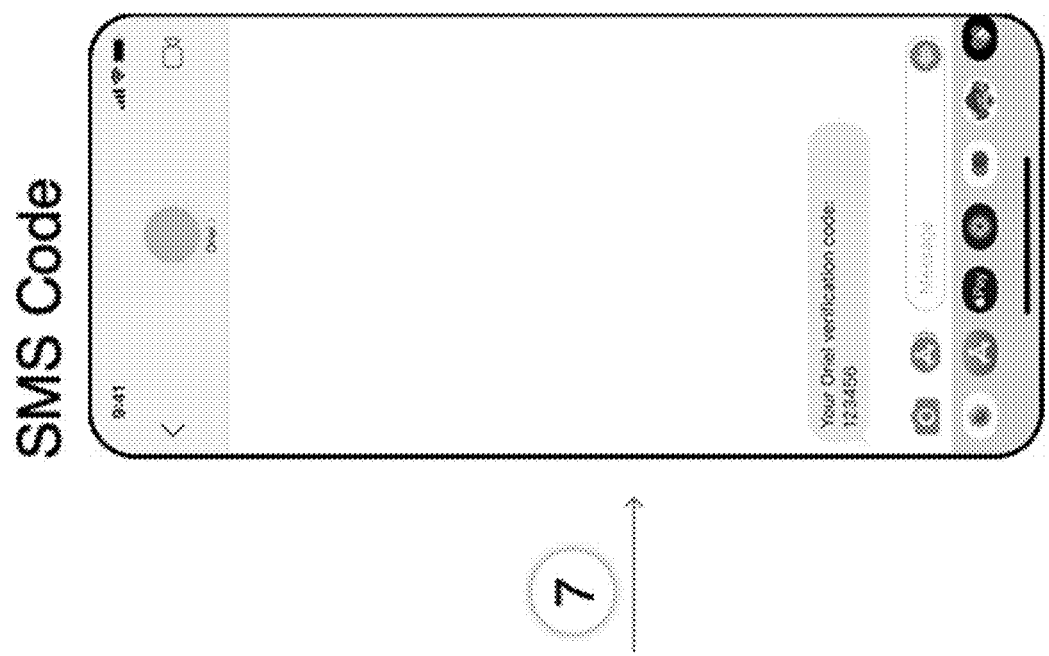
Figure 25:
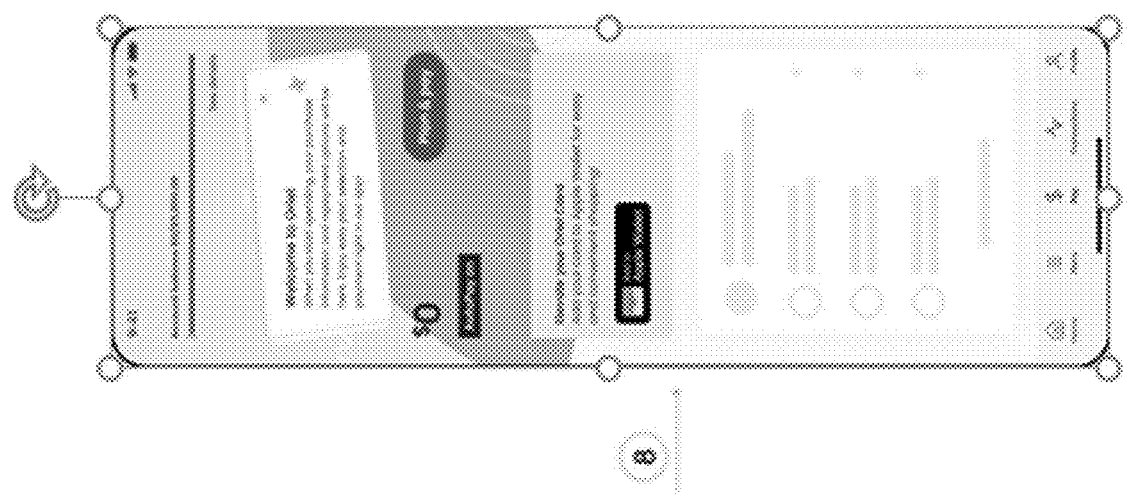
Figure 26:

Once the credit line or the credit line account, such as a credit card with the backend capability to convert a charge card balance into an installment loan (referred to as the installment card), is granted, activated, and verified, the account is configured, as partially shown via FIGS. 24-25. The configuration process may include default configuration settings shown in the account settings of the app disclosing that all outstanding balances incurred on the installment card will be converted into one or more installment loans automatically. Other default configuration settings may disclose agreements to accept late payment penalties (e.g., a dollar or other amount per day from the due date for a predetermined amount of time, such as five days, for example.).

Figure 12:
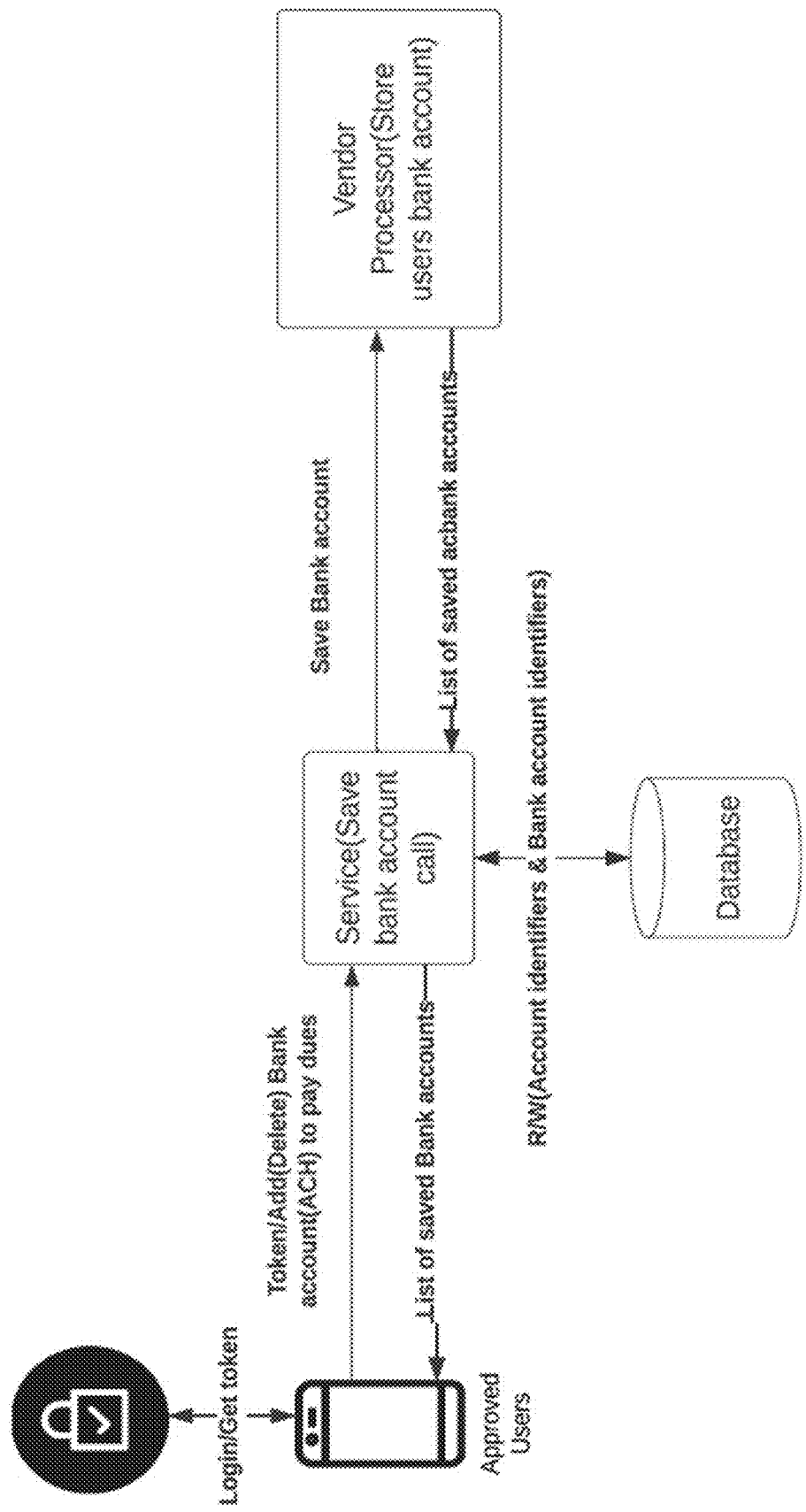
FIG. 12 is an exemplary data entry process executed through a mobile wireless device served by the adaptable processing network.

Through the account settings, cardholder may also link a payment source, such as a bank account, to the installment card account, as shown in FIGS. 12 and 31, or remove a payment source from an installment card account. Once the cardholder is logged in using the cardholder's credentials, the cardholder navigates to the account setting that manages payment options through request-response exchanges that include access token authentications and synchronous exchanges where the mobile device (e.g., the client) waits for responses from the hosting system before proceeding with further actions. In response to the prompts or by filling in forms, the cardholder adds/deletes the payment information, including account types (e.g., checking accounts, savings accounts, investment accounts, etc.) and other required details in response to the prompts and/or the forms. Some systems execute additional verification when adding payment information, such as confirming small test deposits and withdrawals in designated payment source accounts or providing other verification information and/or processes. As partially shown in the optional flow of FIG. 12, exchanges that add or delete payment sources include adding/deleting bank/investment accounts from banks and organizations that use an automated clearing house.

The exchanges occur through exchanges via the reverse proxy 120 and secrets manager module 144 of FIG. 1, with the information being stored in the system's database, such as the system's open-source relational database management systems 140 and 142, for example, through a service call. When the access token is authenticated, an exemplary request passes through the application interface gateway 172 to the vendor processor from the reverse proxy 120 to the application domain module 214 that adds or deletes and/or lists the saved payments sources (e.g., banks), which are also saved in the system's database. The addition, deletion, and/or list is returned to the cardholder that confirms the addition/deletion and renders the list of the payment sources.

In the account settings, some systems and/or mobile wireless device apps also allow cardholders to establish expenditure limits, which are predetermined financial boundaries cardmembers set within a pre-specified period on an account and/or billing cycle basis. The expenditure limits may be a flexible and loosely enforced limit that may be exceeded or allow for adjustments without incurring strict consequences. A soft limit may cause the system and/or mobile wireless device app to issue an electronic notification through the cardholder's mobile device when the expenditure limit is exceeded. Other limits may be hard expenditure limits that enforce a strict boundary that does not allow for exceptions. An exemplary strict boundary may not allow spending to exceed expenditure limit boundaries on the installment card. Some systems and/or mobile wireless device apps employ soft and/or hard expenditure limits in accordance with the cardholder's budgetary framework. Similarly, the system and/or mobile wireless device app can enforce installment limits established by the system and/or the cardholder through their mobile wireless device app in the form of an installment upper limit or a cap that restricts the number of installment payments that are permitted for a particular transaction, per an installment card statement, and/or in aggregate for installment account for a predetermined period, such as one or more billing cycles, one or more fiscal quarters, and/or one or more fiscal years, for example. The installment cap controls the repayment period and provides a structured schedule for the cardholder to repay for purchases over time.

Figure 13:
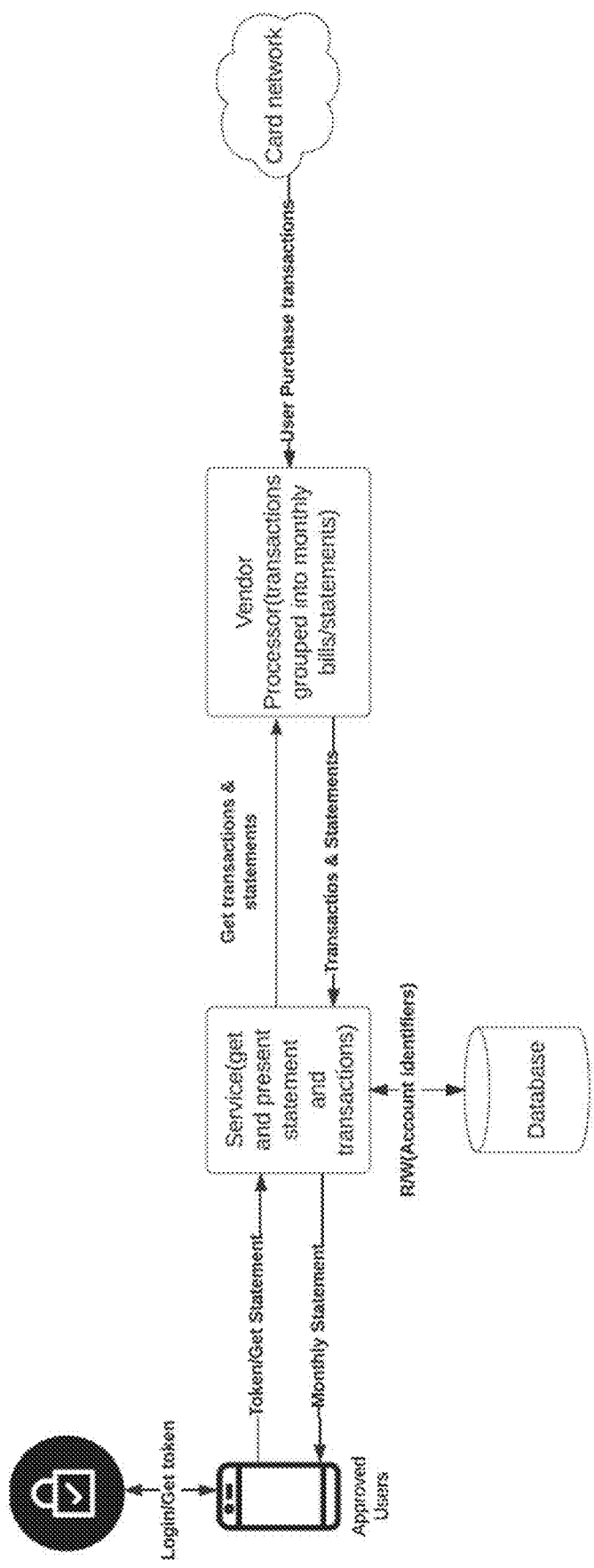
FIG. 13 is an exemplary flow generating and displaying a statement executed through a mobile wireless device served by the adaptable processing network.
Figure 38:
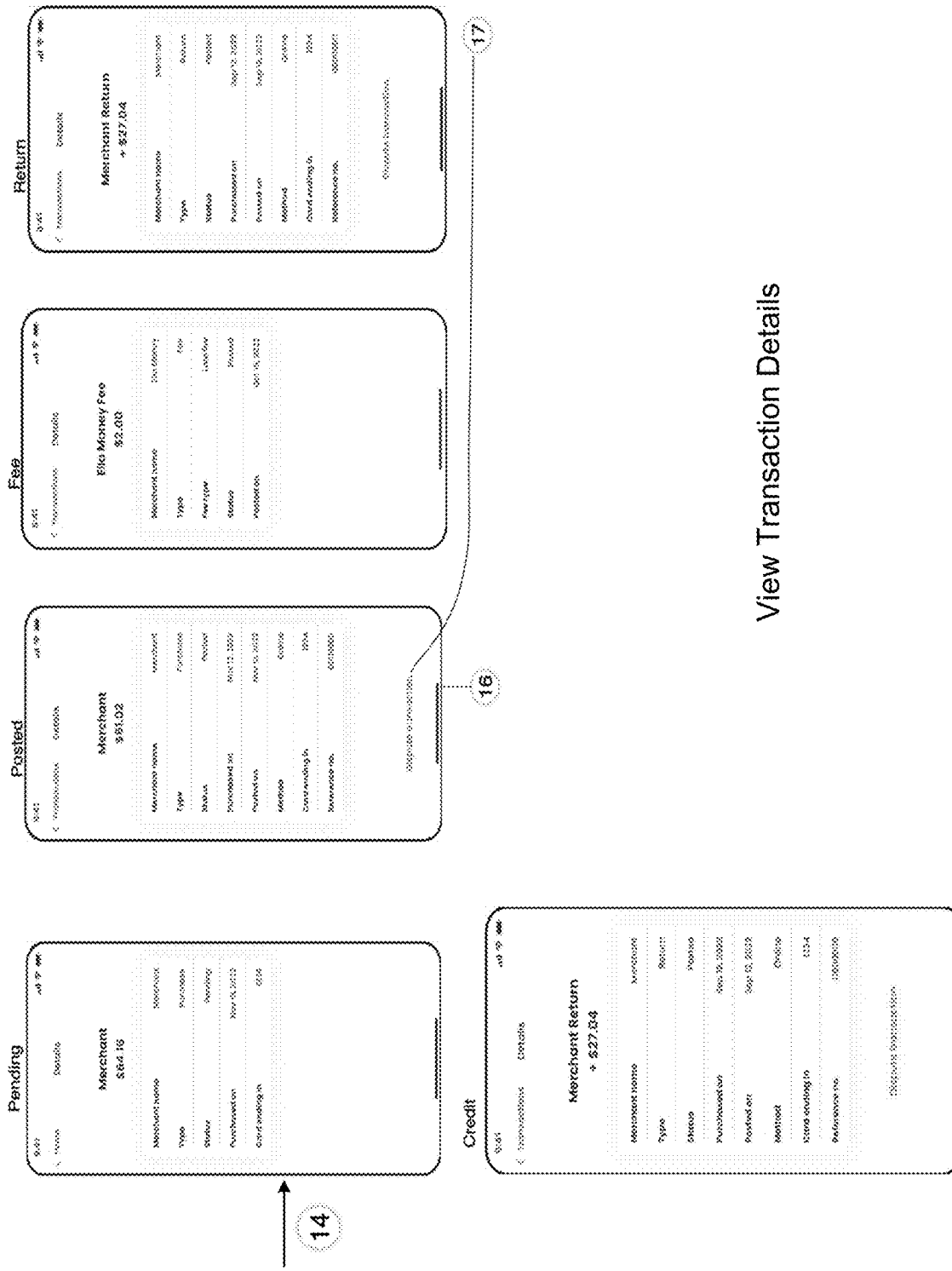
Figure 39:
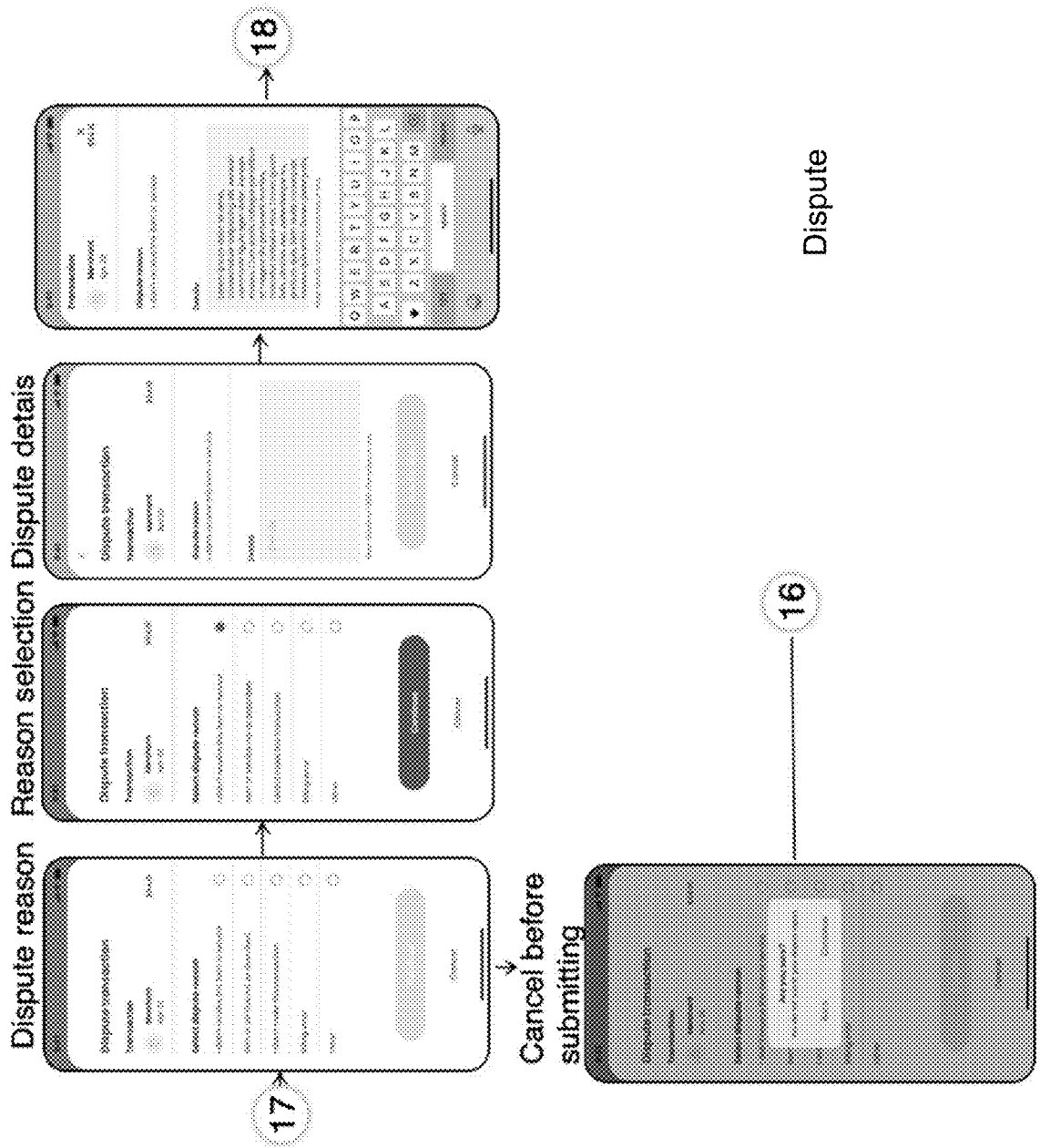
Figure 40:
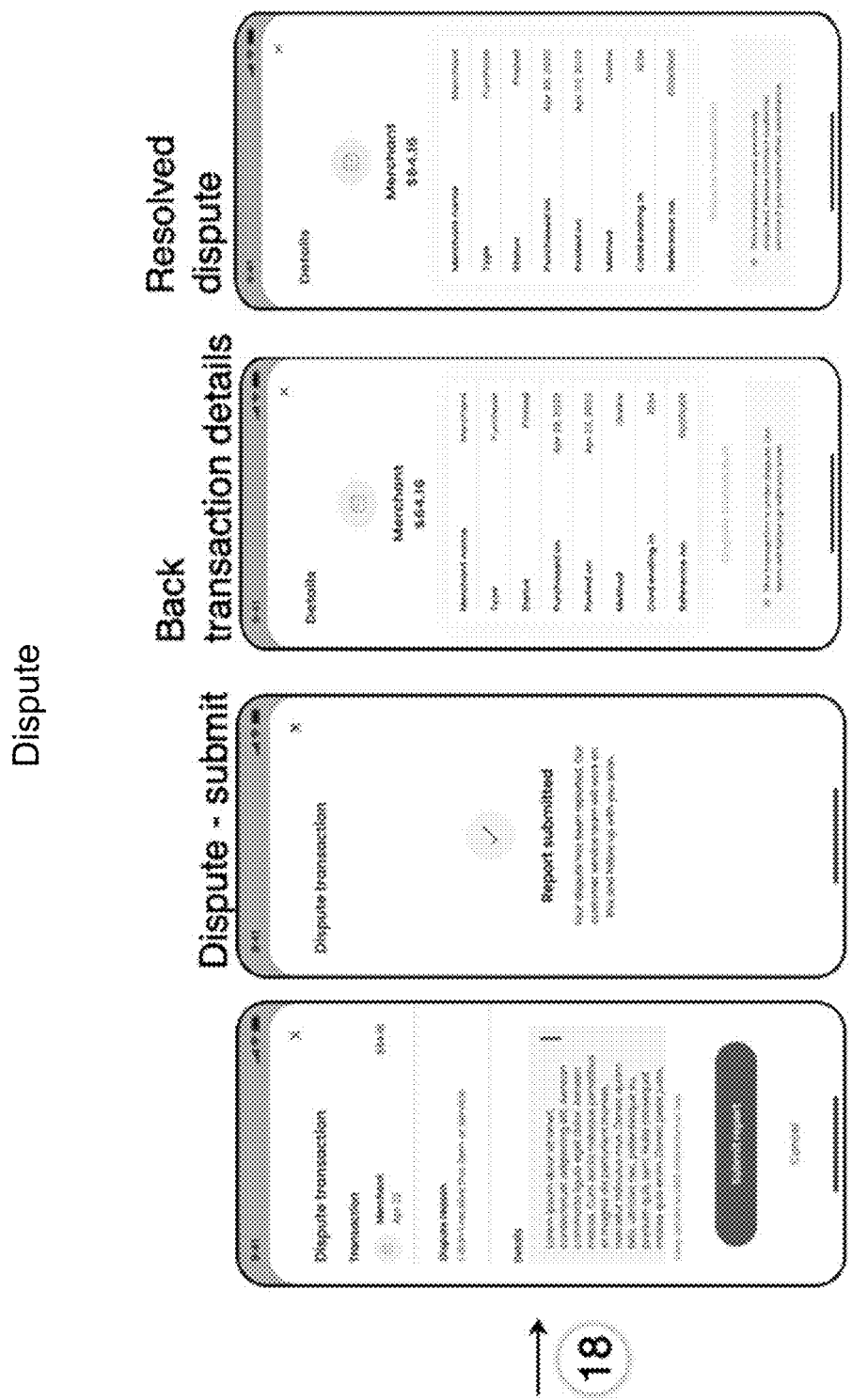
Figure 41:
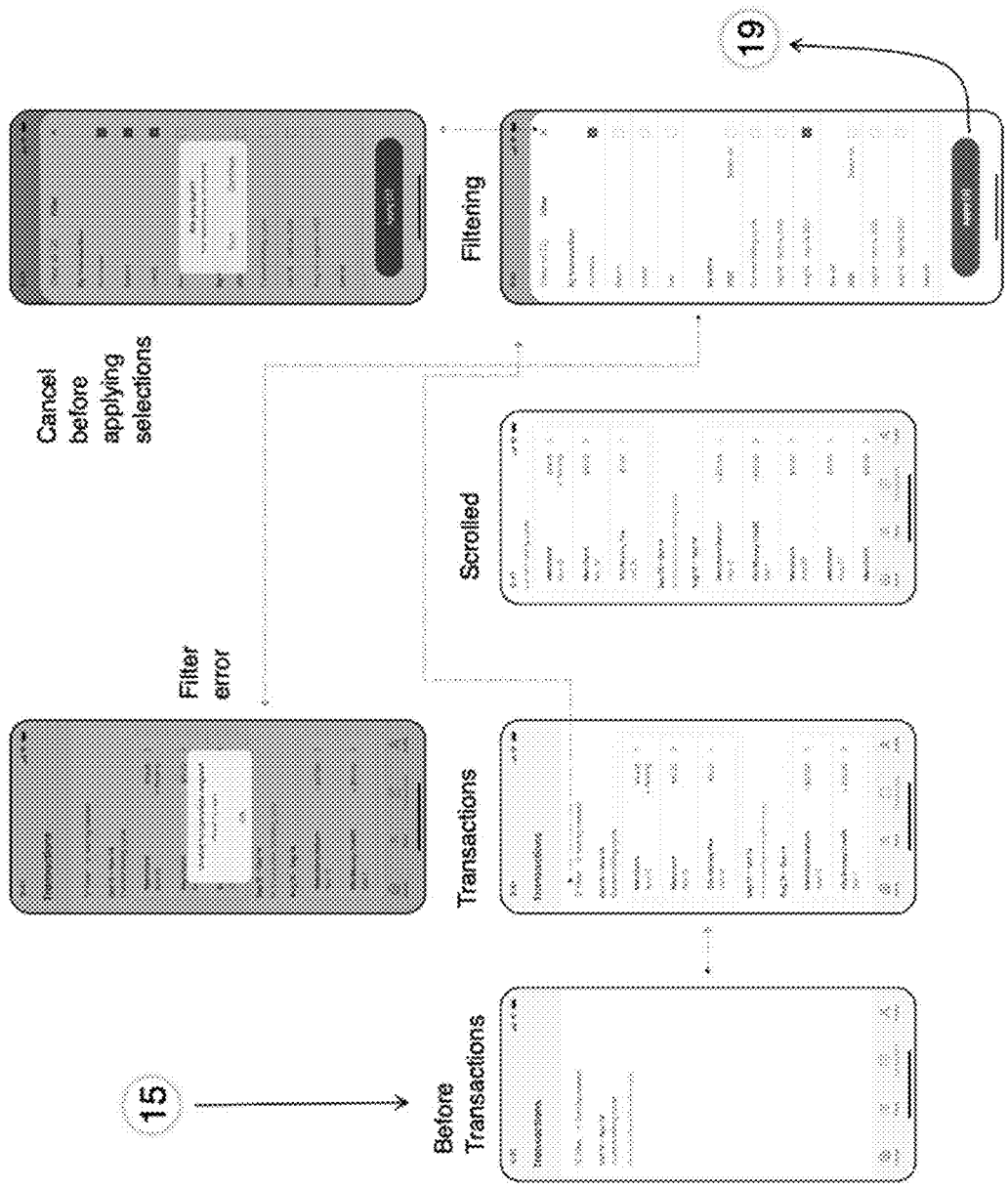
FIGS. 41-43 are graphical user interfaces displaying transactions that meet certain criteria and that may be arranged in a certain order by data manipulation commands issued to a mobile wireless device.
Figure 42:
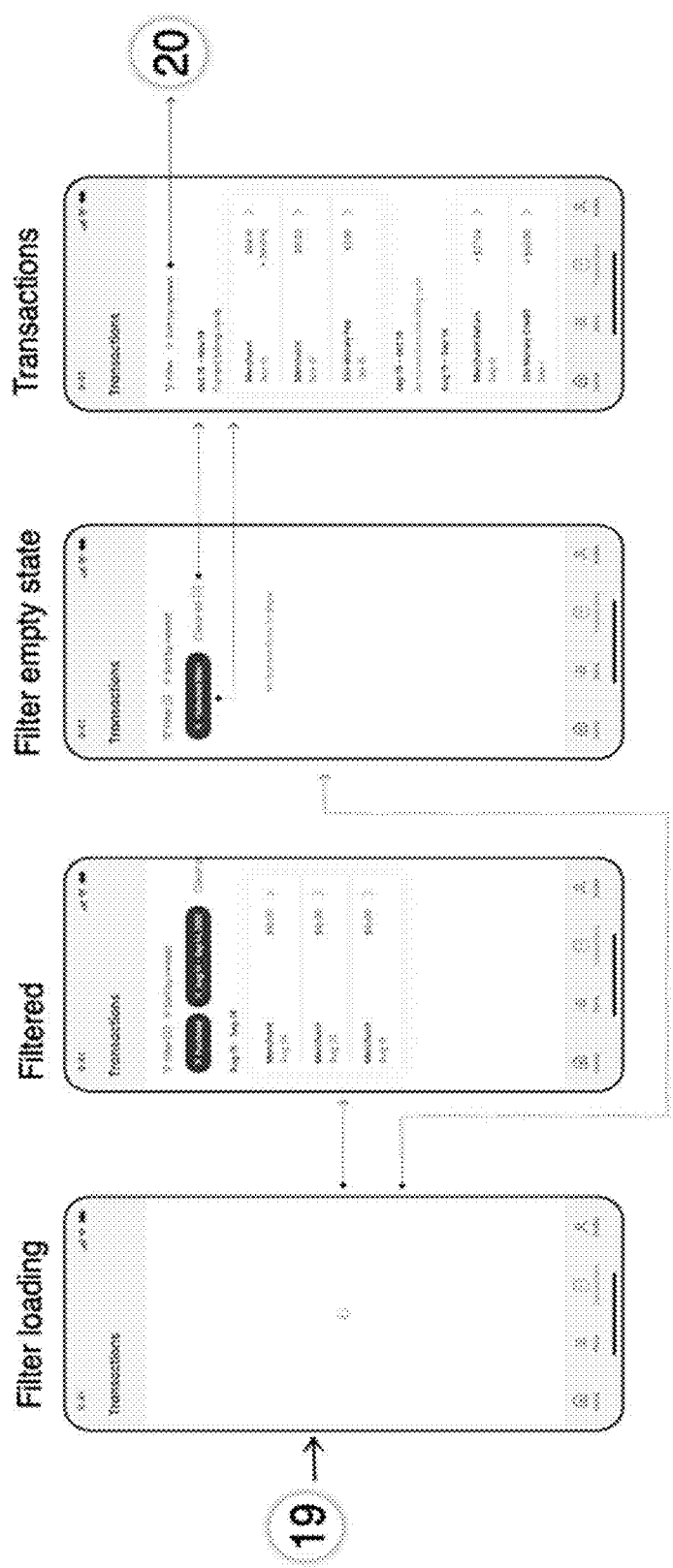
Figure 43:
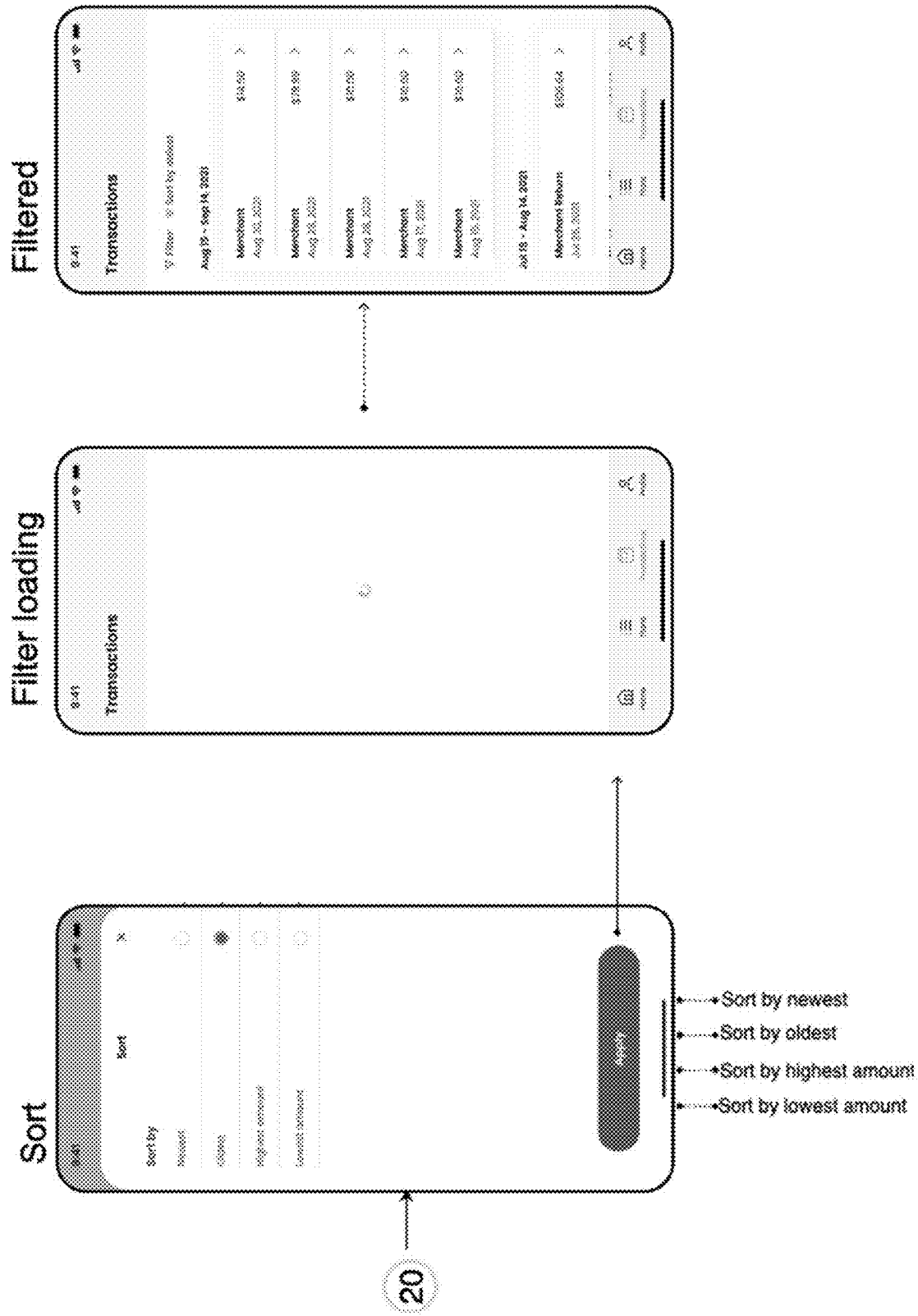
Figure 44:
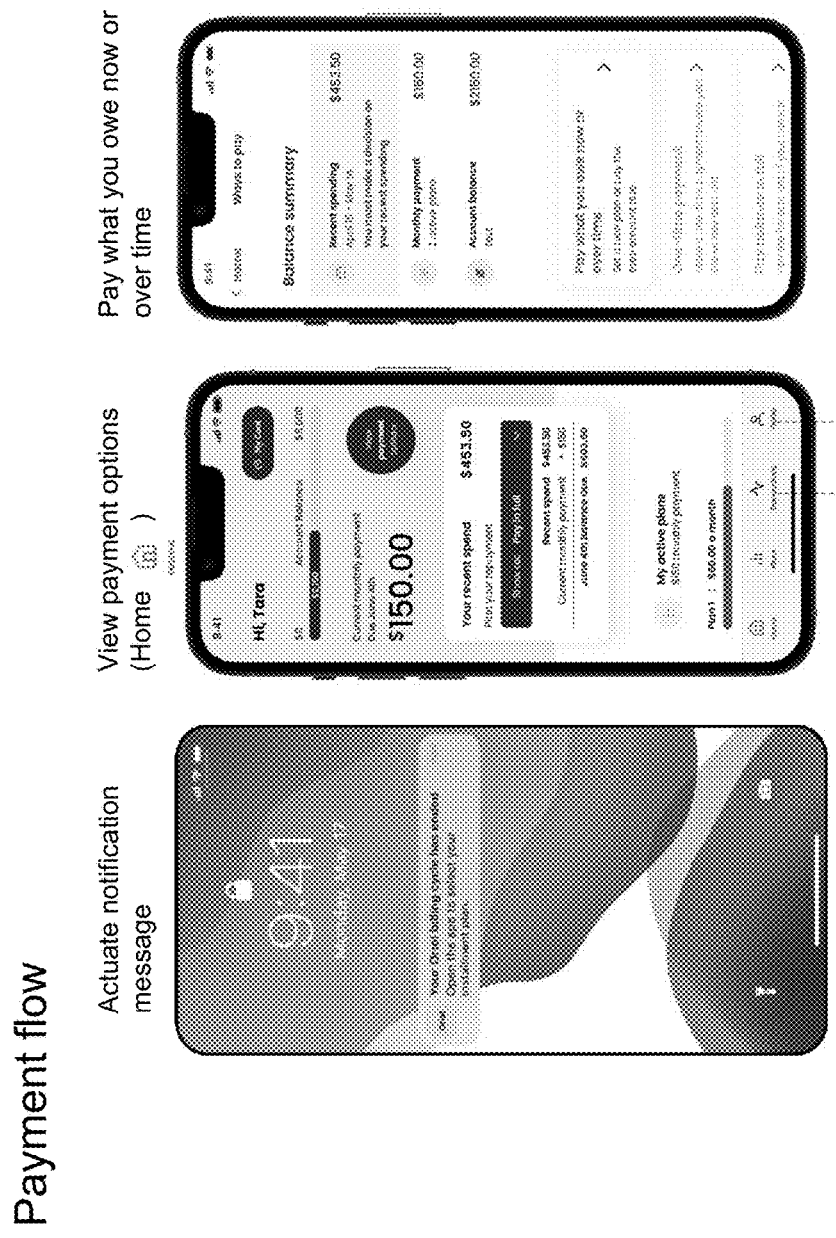
FIGS. 44-48 are graphical user interfaces displaying exemplary payment flows and the navigation and interactive execution paths executed through a mobile wireless device served by the adaptable processing network.

The installment card's billing cycle is established by the issuer, which establishes the period of time during which the cardholder's transactions are recorded at act 1410 in FIG. 14. At the end of each billing cycle, the installment card issues a statement at act 1412 of FIG. 14 by the process shown in FIG. 13 that includes the date of the statement, an overview of the account, an account number, a payment deadline, and the billing period. It includes details on the purchases made, cash advances taken, balance transfers made, fees assessed, seller's names, transaction dates, transaction amounts, and other activities related to the installment card's use. As shown through FIG. 38, the system allows users to view pending transactions, posted transactions, assessed fees, credits, return credits, and returns in detail. It allows cardholders to label and classify transactions, transfers, and/or installment loans with a customized label and/or classification, allowing cardholders to track and manage their expenses according to the labels and categories that make sense to them. Some posted transactions are subject to a chargeback, which is a process that allows the installment cardholder to dispute a charge and request a refund for a fraudulent transaction, unsatisfactory purchase, a billing error, and/or a problematic purchase, as shown in FIGS. 39-40. The system also allows the cardholders to view current transactions and transaction history that provides a record of financial transactions that occur within a period of time. The transactions that comprise the transaction history may be moved in a display window of the mobile device to view other transactions (e.g., scrolling), and may be displayed and selected from other transactions by applying data filters, which allow user to specify criteria and/or conditions that transaction records must satisfy to be rendered and shown as a result as shown in FIGS. 37 and 41-43. The transaction history allows cardholders to stay informed about their financial transactions and ensure their accuracy by identifying and disputing unauthorized and fraudulent activities.

To view transactions online, cardholders can request that the system access account information, as shown in FIGS. 32, 37-38, and 41-43, that allows active transactions details not yet billed and/or transactions summarized in issued statements to be displayed through the app. Cardholders may request transaction details or statements by a request that is passed with an access token through the reverse proxy 120 to the secrets manager module 144 shown in FIG. 1. When the access token is authenticated, the request is passed through the application interface gateway module 172 to the vendor processor through the reverse proxy 120 and application domain module 214. The application domain module 214 communicates with the payment network and/or the installment card association that operates the infrastructure and facilitates the processing of installment card transactions between the sellers, the cardholders, and the issuers. The transactions and statements are stored in the system's database such as the system's open-source relational database management systems 140 and 142, for example, and returned to the cardholder through the app.

Figure 45:
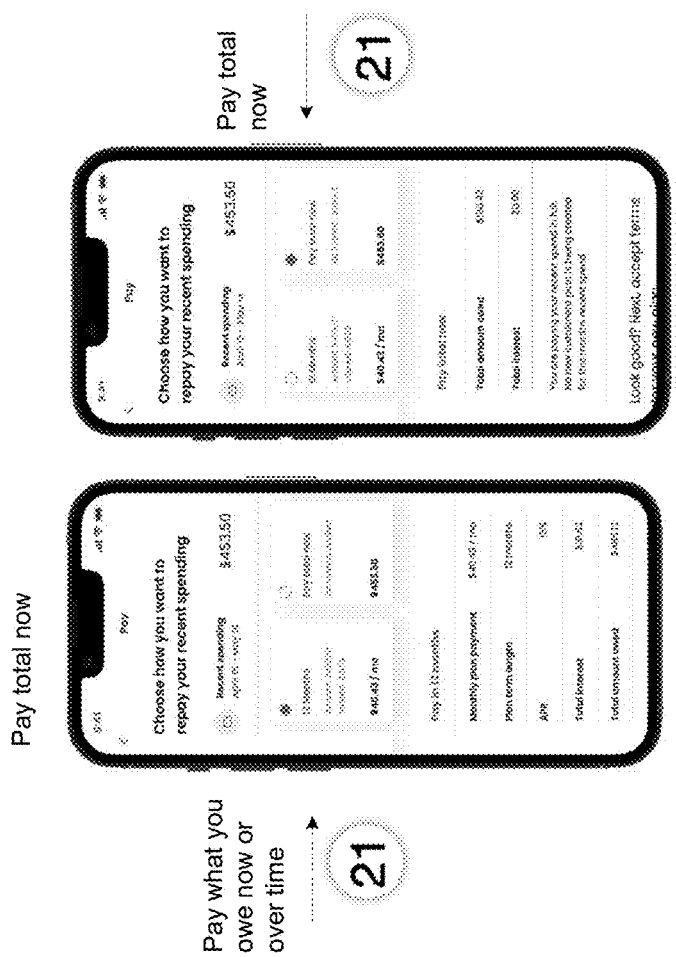
Figure 46:
Figure 47:
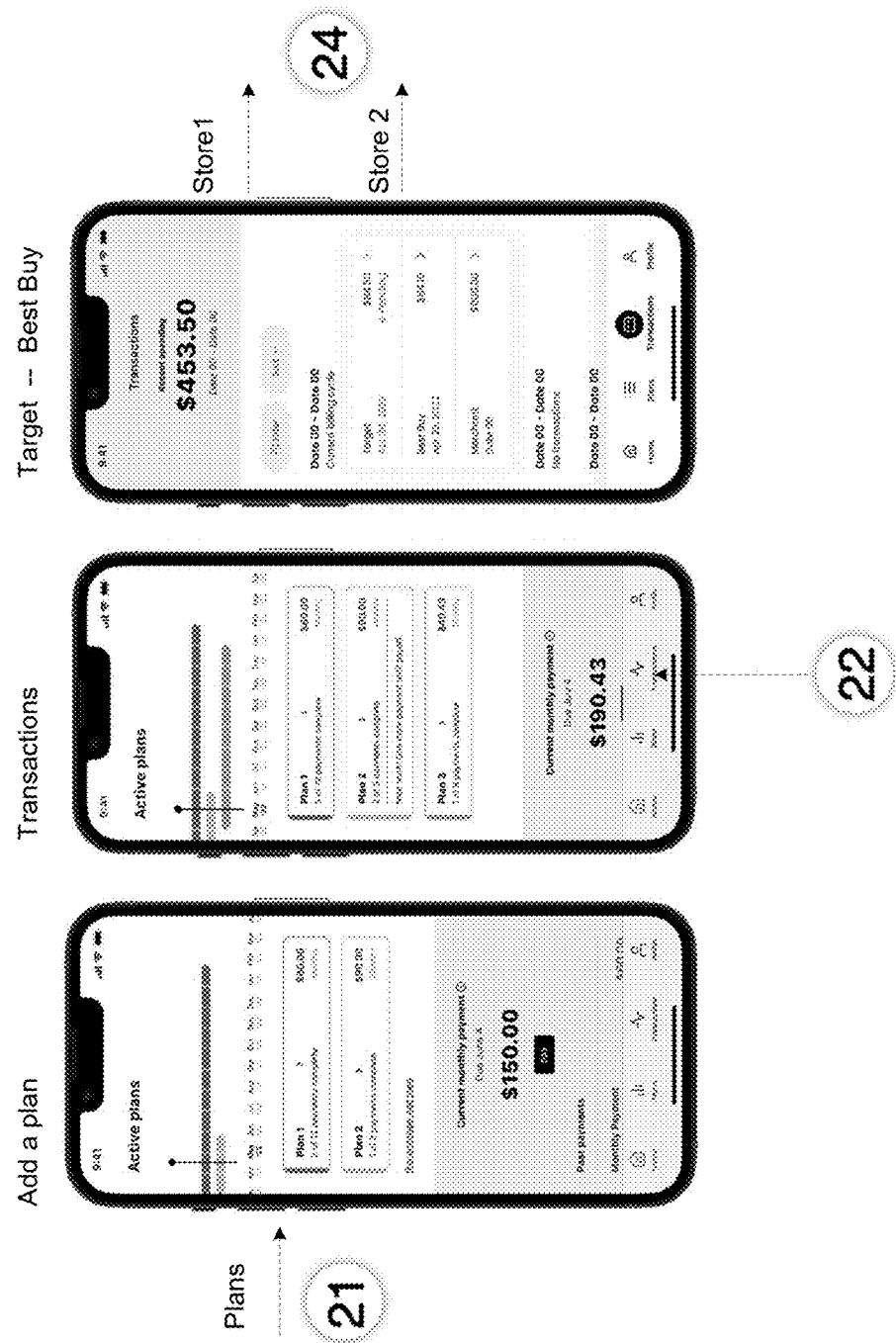
Figure 48:
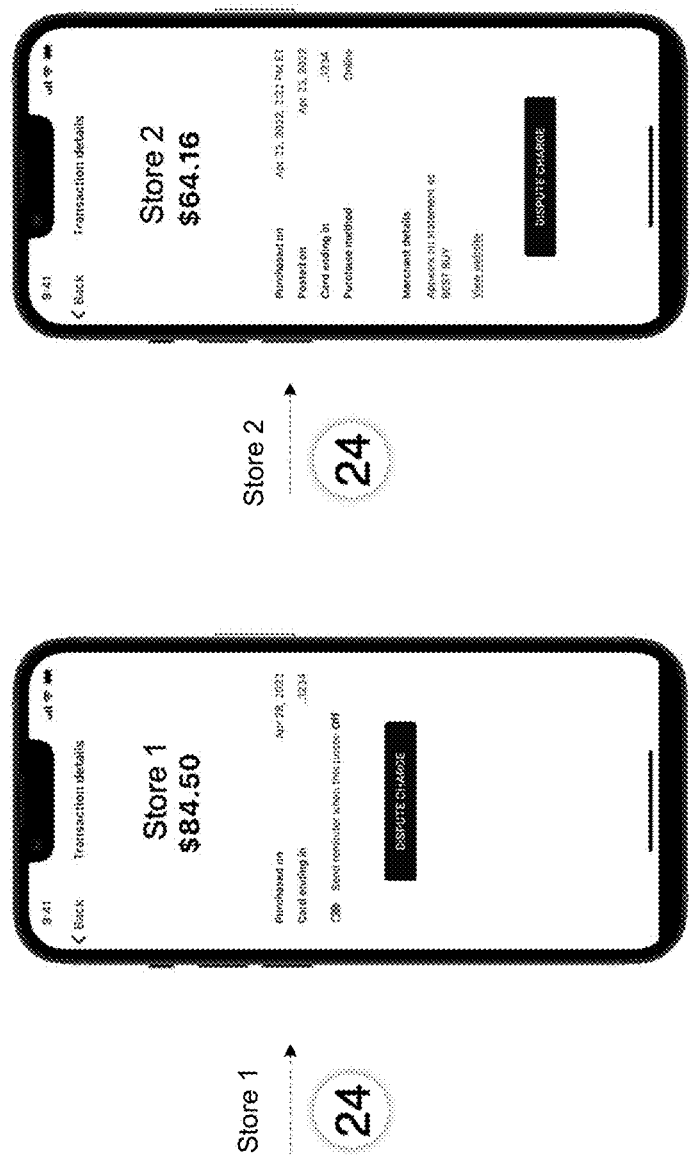
Figure 49:
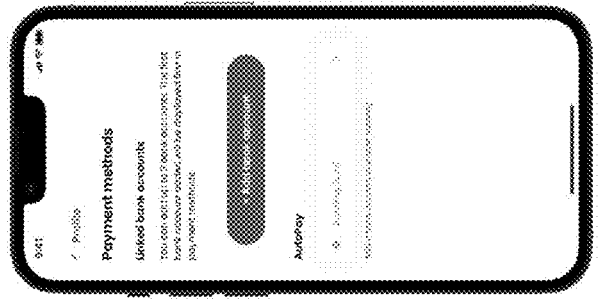
FIGS. 49-52 are graphical user interfaces displaying navigation features of a mobile wireless device served by the adaptable processing network.
Figure 49:
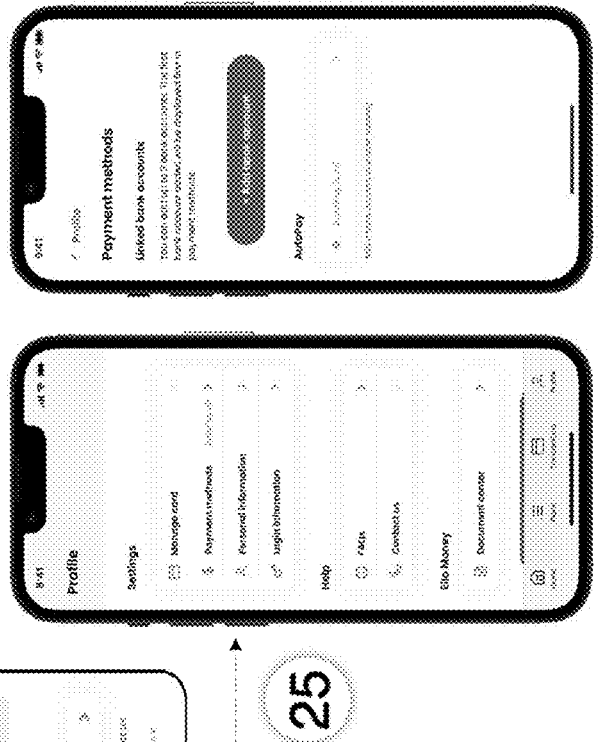
Figure 49:
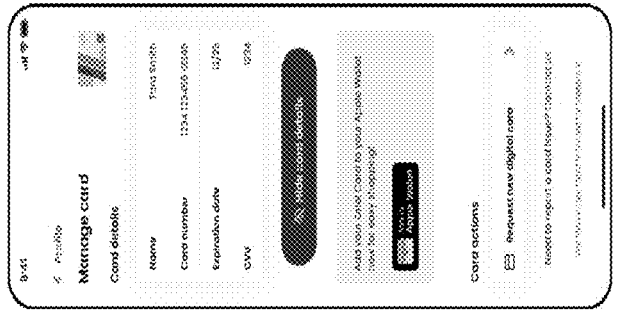
Figure 49:
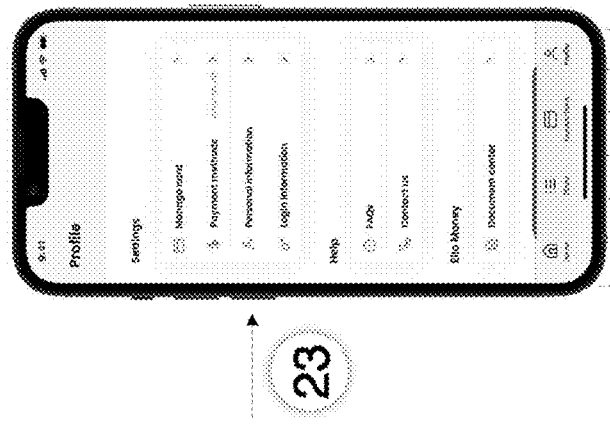
Figure 50:
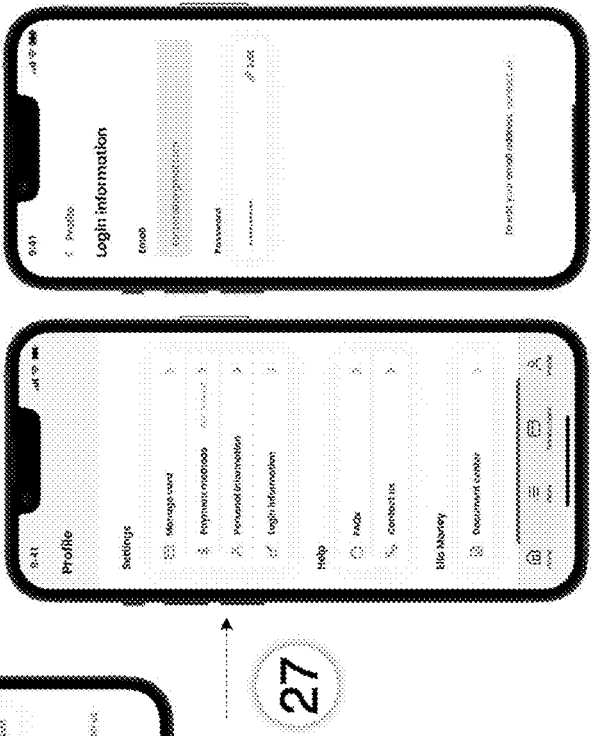
Figure 50:
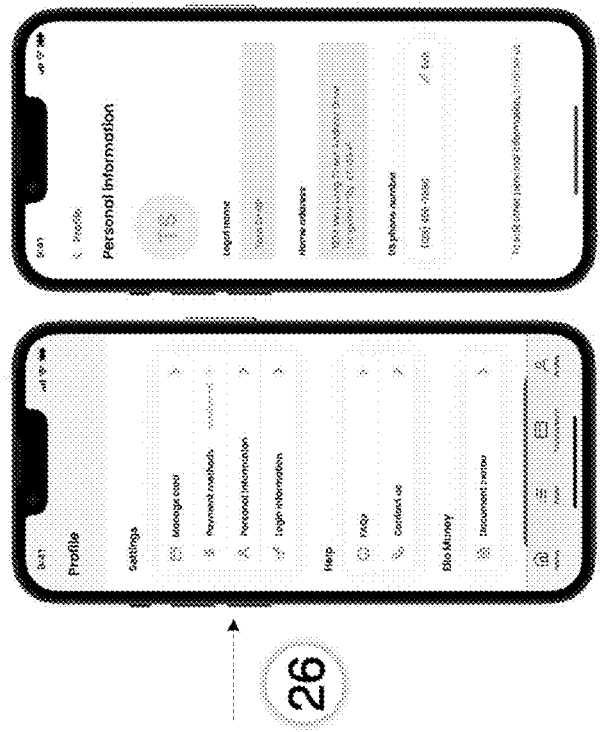
Figure 51:
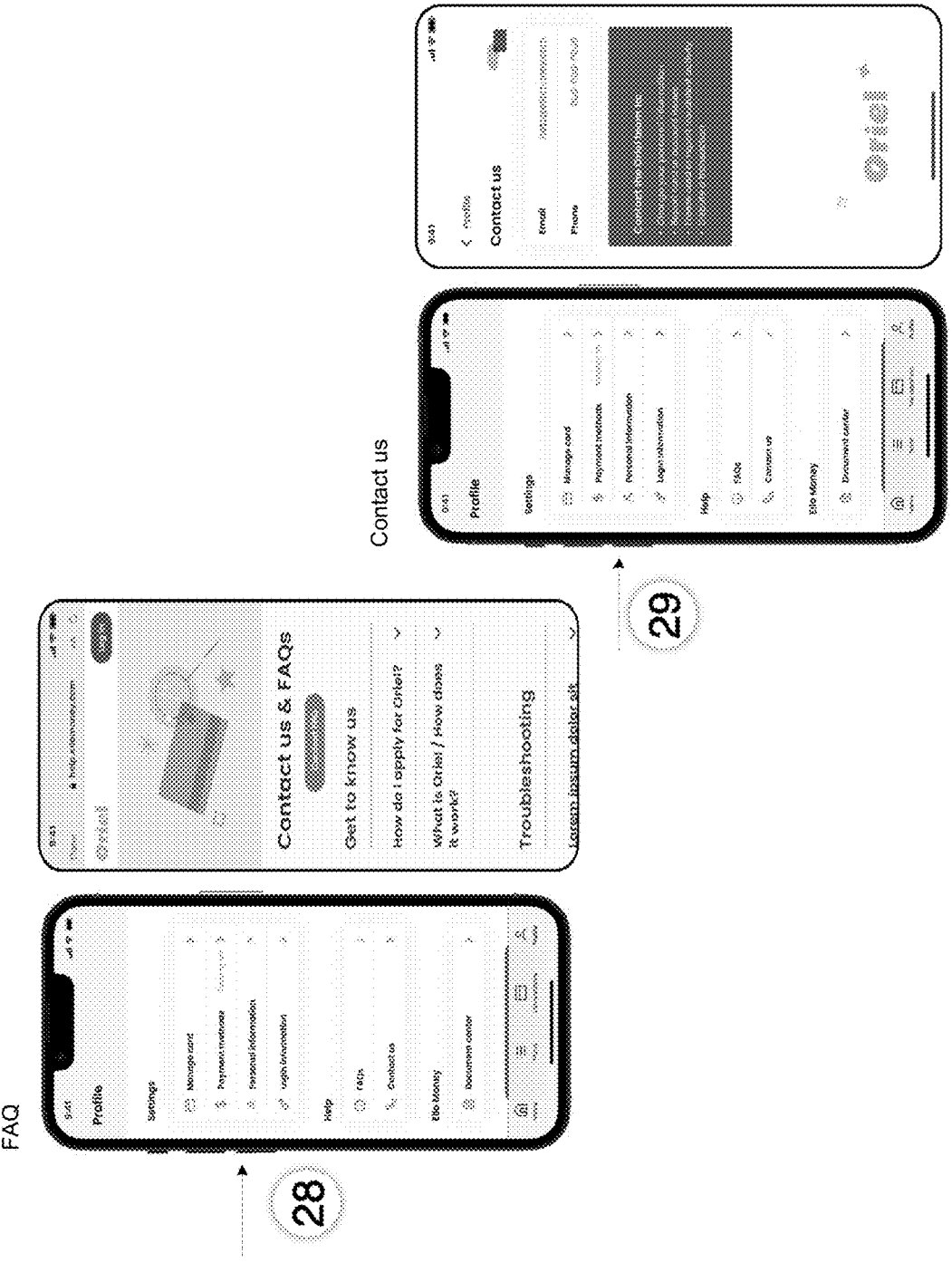

The system provided payment options that represent the various ways a payment can be made, edited, and/or processed and legacy installment plans viewed as shown in FIGS. 7-9, 34, 35-36, and 44-48. FIG. 45 shows the cost of paying in twelve installments or paying a total outstanding balance through a contactless payment process. On or before the statement due date, the cardholder may choose to either 1) pay their charge card balance in full at no additional interest cost and transaction fees or 2) convert some or all of the outstanding balance into an installment loan (e.g., with a three to twelve month term length), with interest only be charged when the cardholders elects to convert some or all of the outstanding balances into an installment loan. The system allocates payments in a payment hierarchy or a waterfall structure that distributes payments through a sequential process in a predetermined order. In an exemplary order, payments are applied first to credit card balances past due, then the late fees due (if applicable), then the installment loan interest due, then toward the current minimum payments due on the charge card, then the installment loan principal not yet due, then the remaining principal due on the credit card. When credit card balances and installment loans become delinquent during the same billing cycle, an exemplary order may comprise payment of unpaid late fees first, which include the late fees that have accrued from the previous billing cycle, then toward the delinquent loan interest, then the delinquent loan principal, then the delinquent payments due on the credit card. If multiple instalment loans are pending on the account, payments are first applied to the loan balances with the higher annual percentage rates, then the older senior pending loans on the account, in that exemplary order. When the loans have the same annual percentage rates, payments are first applied to the oldest pending loan due in an exemplary order. In some alternate use cases, when a credit card or other card (e.g., a transferring card) balance is converted into an installment loan, the outstanding balance of the original card at the time of the conversion is converted into an installment loan. In some use cases, interest begins accruing on the transaction date with a predetermined fixed loan term, such as thirty-six month term, for example. In other exemplary use case, interest begins accruing on the origination date, which is the billing statement due date.

In some systems, optional predictive service analytics systems 5304 provide the cardholder with automatic recommendations. The recommendations may identify some or all of the outstanding balances (charge and/or installment) cardholders should pay in full versus the charges that should be paid through one or more installment loans. The optional predictive service analytics systems 5304 may also suggest accelerated payment schedules and/or minimum payment schedules for outstanding balances and/or installment loans and/or other debts, including those that are not installment loans or credit charges. The optional predictive service analytics systems 5304 may recommend a payment schedule in which payments are made ahead of a due date and/or in a larger amount than the minimum or regular payment due on some debts and recommend minimum payments on others to reach a cost-effective debt consolidation program. The schedule allows cardholders to reduce the installment terms and/or the borrowing costs and fees paying off high cost debt faster, allowing the installment cardholder to potentially save money. Some alternate optional predictive service analytics systems 5304 schedule automatic payment schedules without user intervention, which may base optimized payment schedules on such factors as loan amounts, interest rates, desired payoff schedules, current income and/or projected income, aggregated debt, etc. In these alternate systems, data and authorizations are first provided by the installment cardholder, including providing authorization for the predictive service analytics systems to access the cardholder's other financial accounts and/or debts. Data encryption and access controls systems limit access to the predictive service analytics systems to only authorized users. Further, auditing and/or real-time monitoring and anomaly detection systems (e.g., predictive anomaly analytics systems 5306 that identify activities and/or patterns of malicious activity) detect unusual and suspicious activities. In yet another alternate system, some predictive service analytics systems 5304 monitor existing and predicted purchases to notify the cardholder of the consequences of predicted purchase and/or one or more upcoming purchases. The sensitivity analysis allows installment card holders to review informal decisions that evaluate risks, opportunities, and tradeoffs that accompany purchases. The sensitivity analysis promotes behavior modifications that adjust purchase strategies and resource allocations, and allows installment cardholders to adjust the assumptions based on the outcome of the analysis. Some predictive service analytic systems 5304 generate documents that report the installment cardholder's outstanding credit lines, the term and/or lengths of current and predicted incurrences of additional installment loans and other debt, and/or etc. that are accessible in the app's graphical user interface document center shown in FIG. 52.

Figure 7:
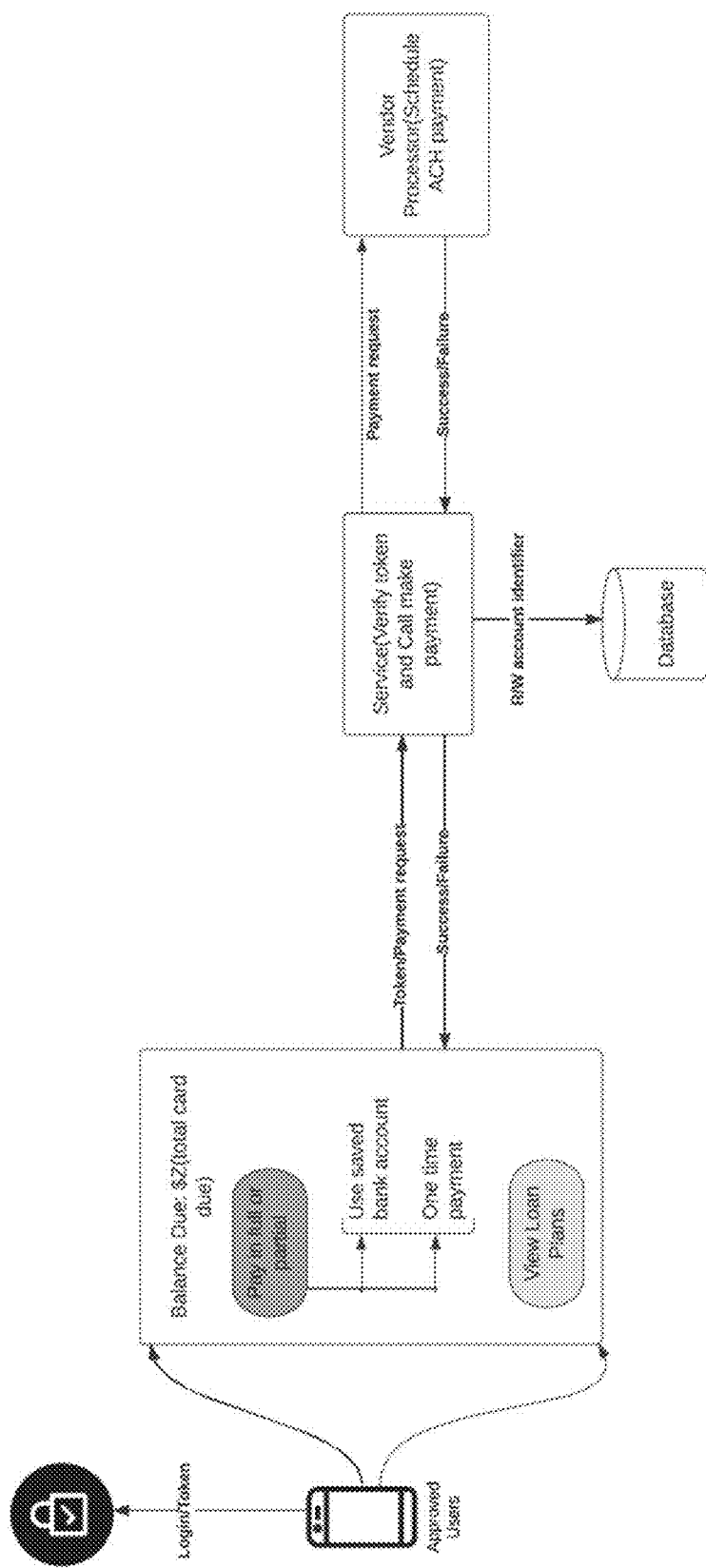
FIG. 7 is an exemplary payment process executed through a mobile wireless device served by the adaptable processing network.
Figure 8:
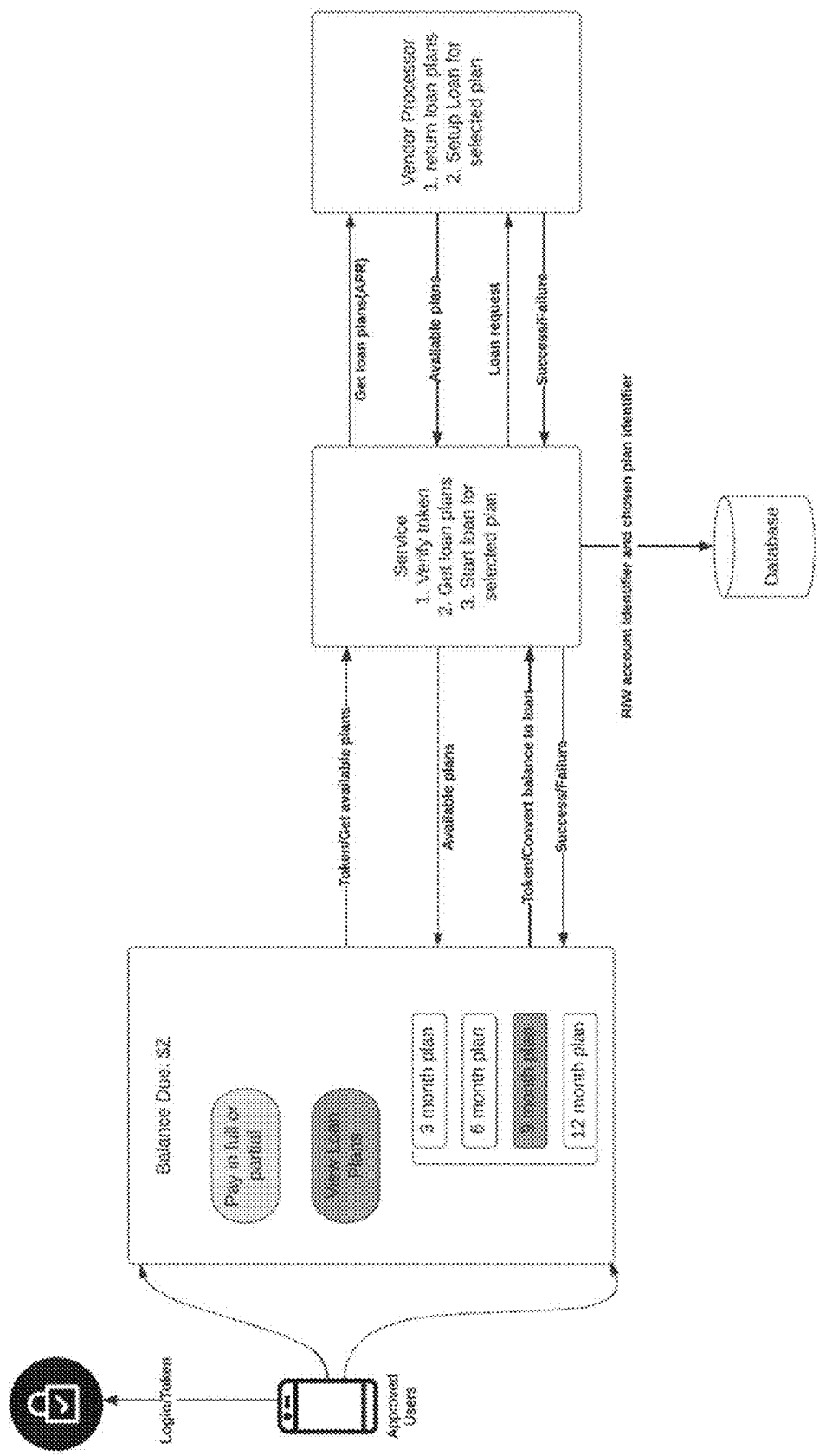
FIG. 8 is an exemplary conversion process executed through a mobile wireless device served by the adaptable processing network.

Once the cardholder is logged in per FIGS. 1 and 7 and the installment cardholder makes a payment request, the request is passed through the reverse proxy 120 to the secrets manager module 144 with the user's access token. When the access token is authenticated, the payment request is passed through the application interface gateway module 172 to the vendor processor through the application domain module 214, which processes the payment request. The payment request may be processed by an automated clearing house (ACH) in communication with the application domain module 214, which comprises a network that facilitates financial transactions, including direct payments and electronic fund transfers between participating financial institutions. If the payment request settles the statement balance in full and on time, the statement balance is met, which does not trigger an interest charge or transaction fees.

Payment details are stored in the system's database, such as the system's open-source relational database management systems 140 and 142, for example, referring to FIGS. 1 and 7. If the payment request is rejected or the payment source declines to transmit the payment, a declined late payment fee, a return payment fee, interest penalties, and/or higher interest rates may be assessed and the installment card may be suspended and/or cancelled. Those details are also stored in the system's database, such as the system's open-source relational database management systems 140 and 142, for example. In FIG. 7, confirmations are returned to the cardholder that either confirm payments were accepted or confirm that they were rejected can also be accessed through the app's document center partially shown in FIG. 52. In some exemplary systems, payment methods and bank account validations occur before payments are made through an automated clearing house (ACH).

When a cardholder elects to convert an outstanding balance to an installment loan, the system provides multiple loan options, as shown in FIGS. 8, 14, 33-36, and 47. The contactless payment dashboard allows users to view payment plans and elect installment loan plans having different terms. In FIG. 14, the cardholder may choose from a three month plan, a six month plan, a nine month plan, or a twelve month plan, for example, at act 1420 of FIG. 14, that may also be set up by the process shown in FIG. 33. The app dashboard is rendered in response to a loan plan request that is passed with an access token to the secrets manager module 144 of FIG. 1. When the access token is authenticated, the request is passed to a vendor processor through the application interface gateway 172 and the application domain module 214 of FIG. 2, which returns available plans that are then passed to the cardholder. The plan details are stored in the system's database, such as the system's open-source relational database management systems 140 and 142, for example. When a cardholder selects a plan through the app dashboard, a request to convert the outstanding balance passes with an access token through the reverse proxy 120 to the secrets manager module 144. When the access token is authenticated, the request passes through the application interface gateway 172 to a vendor processor through the application domain module 214, which returns an approval or a denial to the cardholder. If the elected plan is rejected or denied, an Adverse Action Notice is transmitted to the client cardholder electronically that explains the reasons for the decision. If the elected plan is approved, payment by the installment card issuer transfers funds to the recipient's acquiring bank (e.g., the merchant's bank), less the interchange fees and transaction fees charged to the recipient for facilitating payment.

Figure 34:
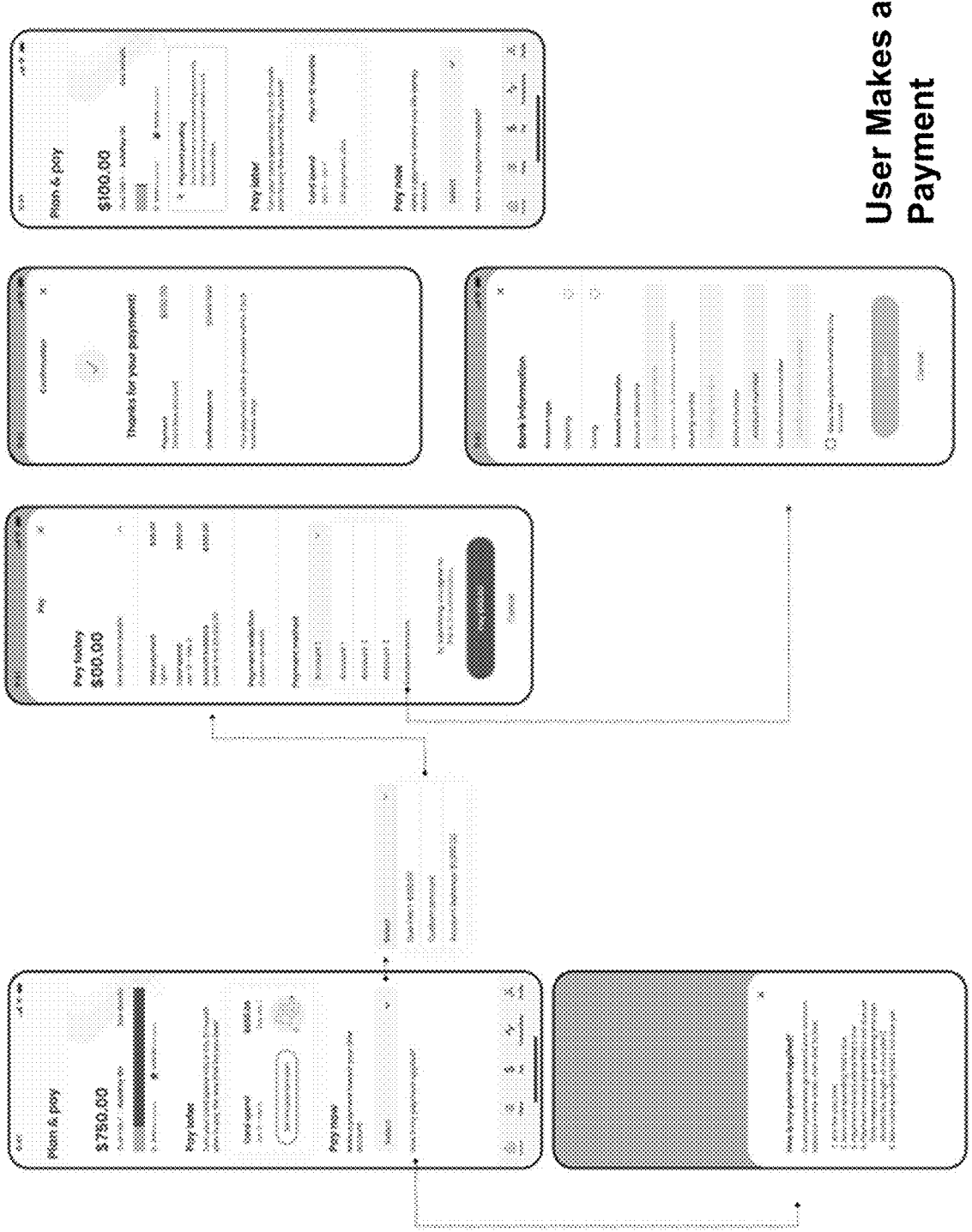
FIGS. 34-35 are graphical user interface flows of an exemplary payment process that show the navigation and interactive execution paths executed through a mobile wireless device served by the adaptable processing network.
Figure 35:
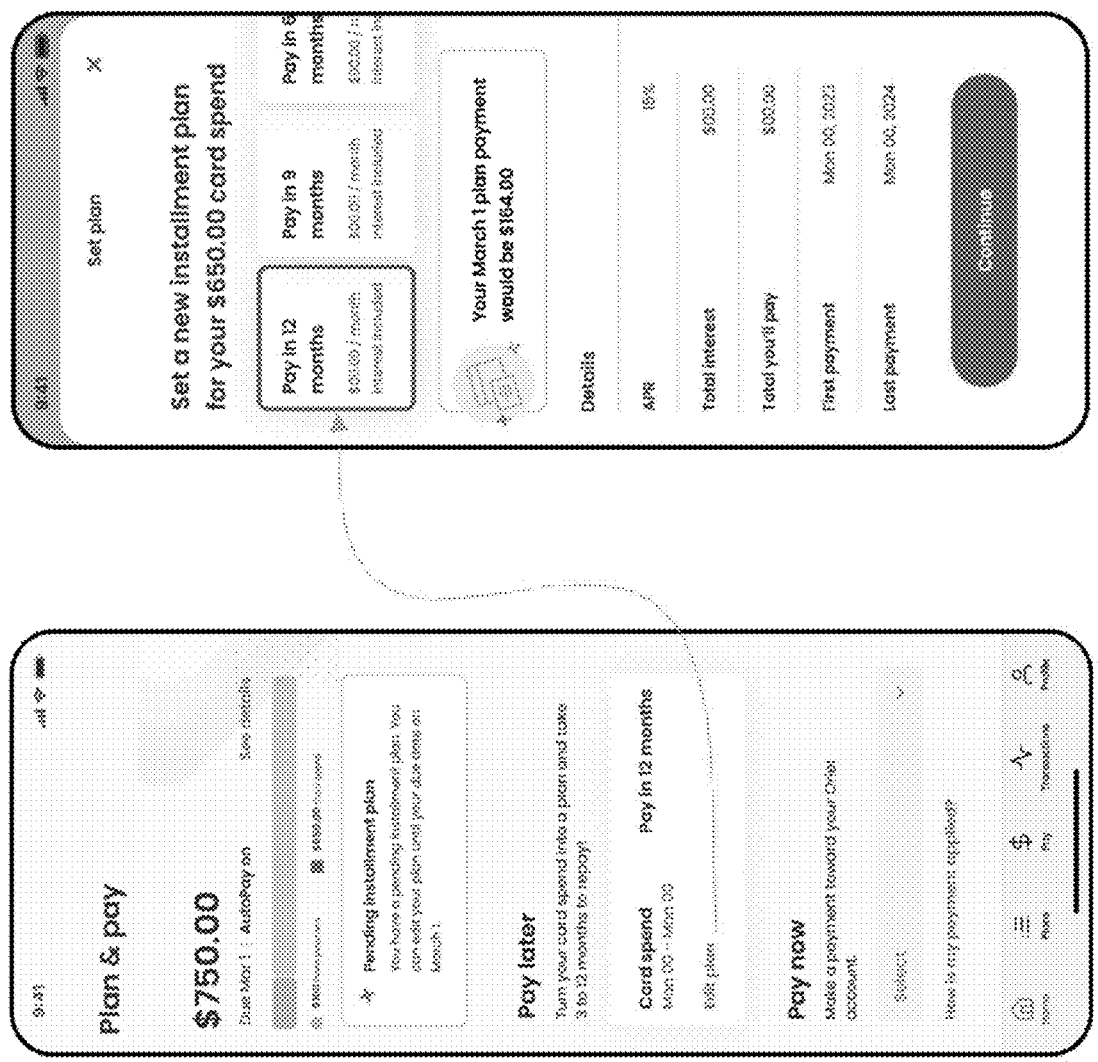
Figure 36:
FIG. 36 is a graphical user interface displaying exemplary legacy and current installment plans executed through a mobile wireless device served by the adaptable processing network.
Figure 37:
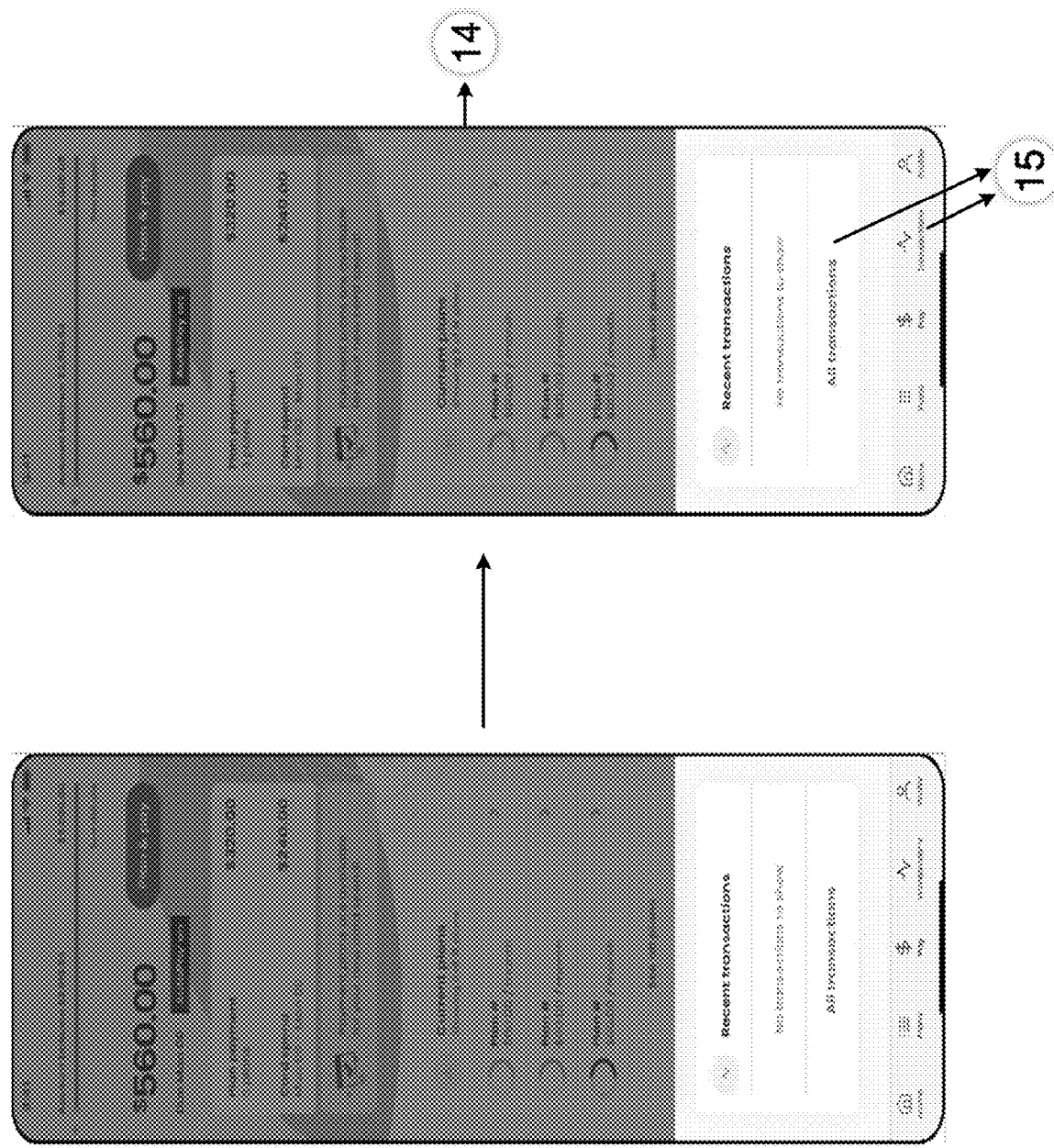
FIGS. 37-40 are graphical user interfaces displaying exemplary transactions in various states and the navigation and interactive execution paths for disputing charges executed through a mobile wireless device served by the adaptable processing network.

Cardholders can also view existing financial management plans through a dashboard rendered by the app that provides a consolidated view of the plans, loan information, data, and metrics in a concise and easily understood format, as shown in FIGS. 34-36. The visualizations are designed to make more complex information intuitive and finances easy to understand at a glance. The interactive features and use of color allows cardholders to track progress, explore plan detail, convert outstanding balances to loans, and interact with specific lending and app elements. When a cardholder elects to view the cardholder's existing financial plans and/or loans, the dashboard is generated in response to a request that passed with an access token through the reverse proxy 120 to the secrets manager module 144 of FIG. 1. When the access token is authenticated, the request is passed through the application interface gateway module 172 to a vendor processor through the application domain module 214 of FIG. 2, which returns existing financial plans and/or loans that are then passed on to the cardholder. The financial plans, loans, and their details are stored in the system's database, such as the system's open-source relational database management systems 140 and 142, for example.

Figure 9:
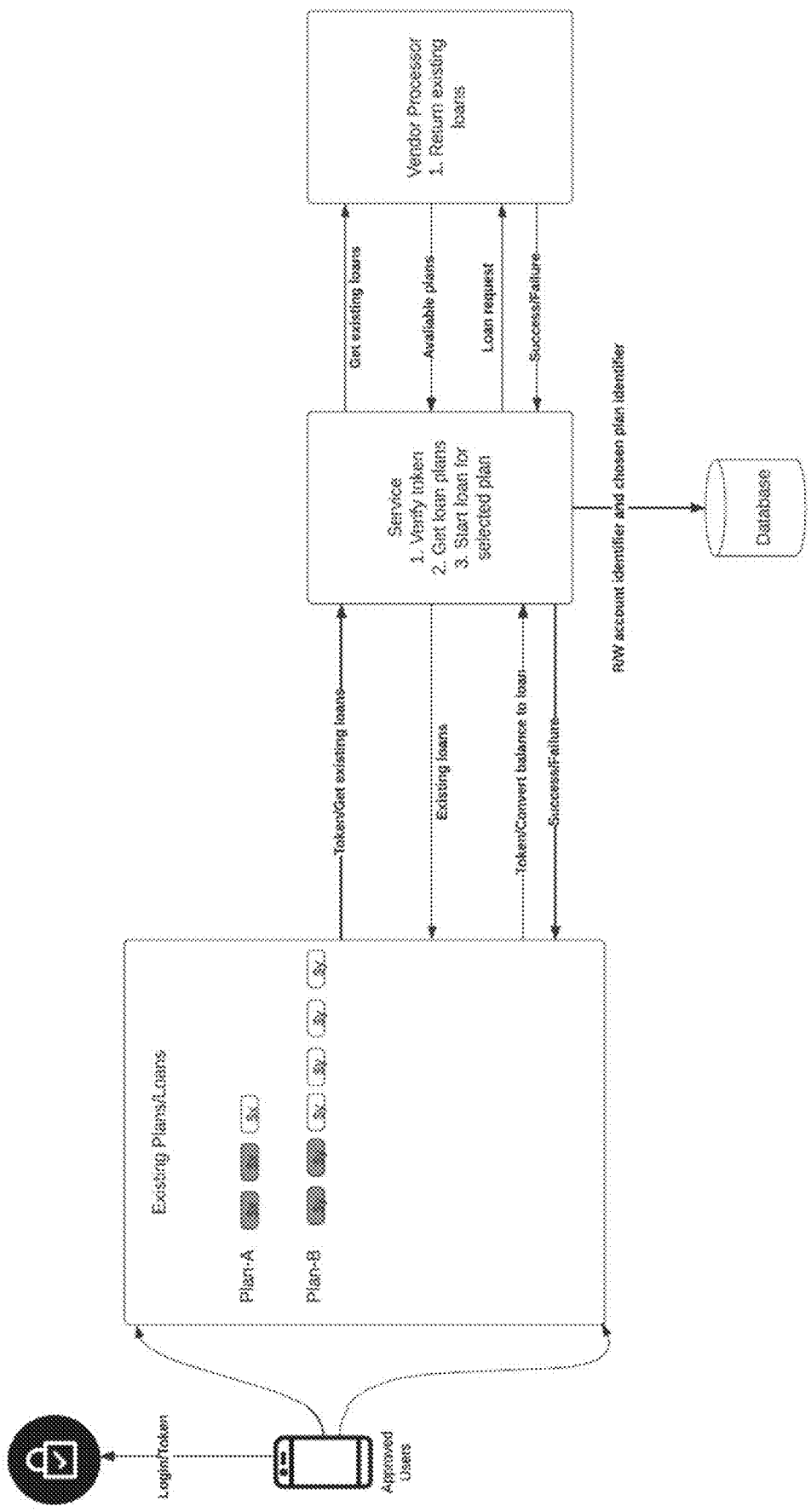
FIG. 9 is an exemplary rendering of a display executed through a mobile wireless device served by the adaptable processing network.

The system's financial plans reflect a strategy that effectively manages cardholder's finances, attempts to guide them to their financial goals, and/or work to achieve long-term financial stability. Some financial plans are based on financial management analyses that assess current financial situations, financial goal setting, debt management, and recommend financial adjustments (e.g., through balance conversions to installment loans, for example) through predictive service analytics systems 5304, for example. Financial assessments may involve evaluating the cardholder's current financial situations, including income, expenses, current debt, and/or current and predicted cashflows, for example. Goal setting allows cardholders to establish measurable, achievable, and time time-limited long-term and/or short-term goals (e.g., paying off debts, establishing an emergency fund). Debt management may render strategies that prioritize lowering-interest debt, scheduling regular payments, retiring senior debt, and exploring options to consolidate debt balances. Adjustments mean real-time or near real-time reviews and assessments that allow for real-time or near-real time corrections, such as payment corrections. Assessments may also occur over time allowing the installment cardmembers to track their financial management progress toward their financial goals. In some use cases, assessments and adjustments may include converting some outstanding balances into installment loans through the cardmember's access token request response exchange through the reverse proxy 120 of FIG. 1, the secrets manager module 144, the application interface gateway module 172, the application domain module 214, and a vendor processor, for example, as shown in FIG. 9. The term real-time refers to systems that process information at the same rate the systems receive information, enabling the systems to direct and make adjustments to situations as they occur. In transaction processing, it means making corrections based on activities as they occur.

Figure 10:
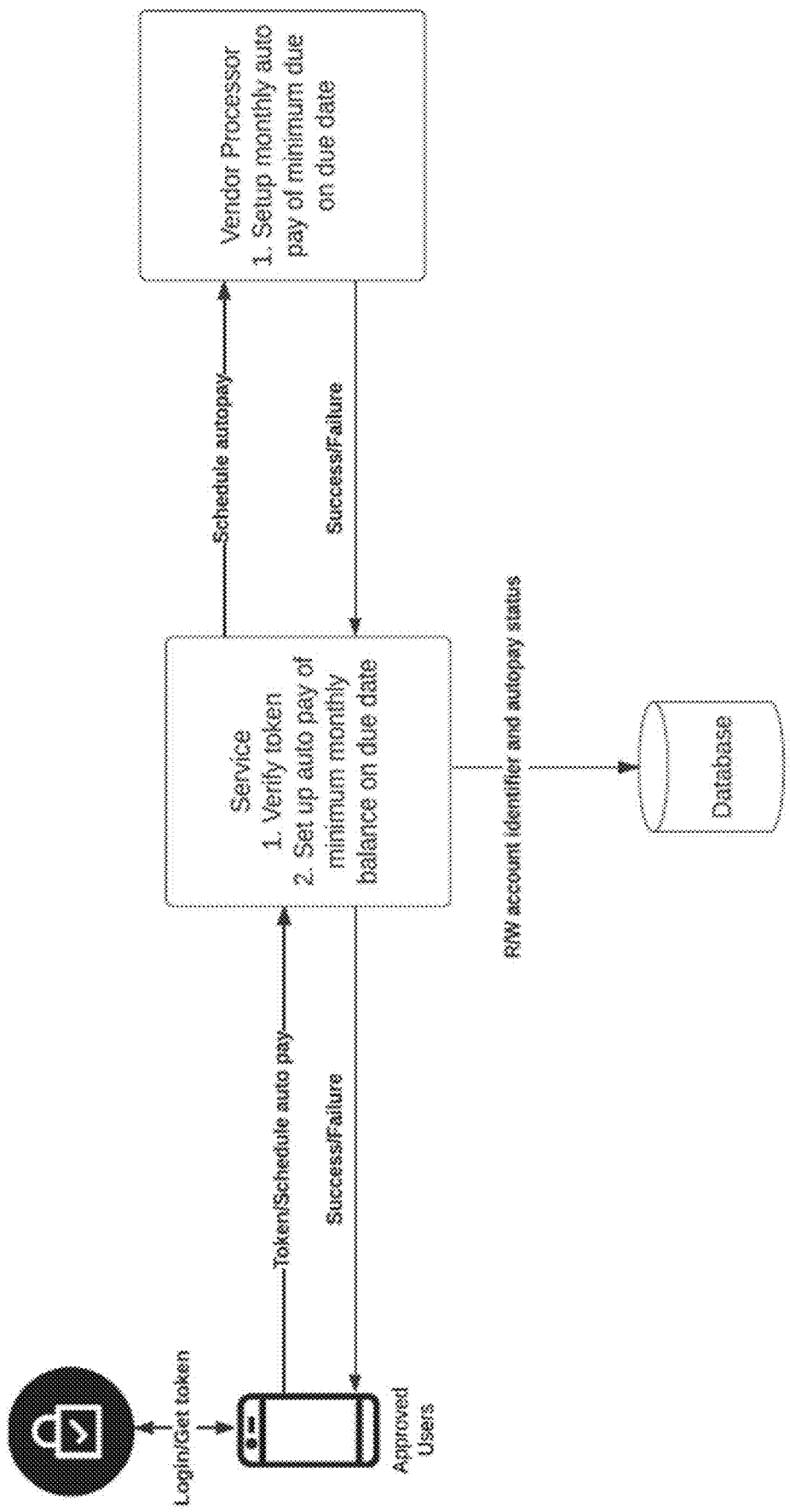
FIG. 10 is an exemplary scheduling process executed through a mobile wireless device served by the adaptable processing network.

Payments are scheduled by finding the statement or transactions the cardholder elects to pay. In some use cases, cardholders may provide financial instructions to automatically move funds from a designated account to cover fixed and/or variable amounts, such as scheduling the minimum payment due on the installment card through an autopay process shown in FIG. 10. The minimum payment due is the amount required to keep the installment account in good standing to avoid late fees. When a cardholder issues a request to schedule a payment, the request with an access token is transmitted to the secrets manager module 144 of FIG. 1. When the access token is authenticated, the request is passed through the application interface gateway module 172 to a vendor processor through the application domain module 214, which confirms or denies the request to set up a fixed or variable amount to be deducted from a payment account and transferred to the installment card issuer. Autopay schedules may require cardholders to set up the cardholder's autopay preferences that may include details about the allocating source and account number serving the payment, the routing details, the statement(s) details, desired the payment date(s), and/or frequency. When successfully configured, the vendor processor stores the details in a database, such as a data warehouse 206, for example, and transmits a confirmation on the agreed upon payment, which repeats at the specified frequency (e.g., monthly, quarterly, etc.) until it is cancelled. If the automatic installment card payment is unsuccessful or denied, an electronic message is transmitted to the cardholder explaining the reasons for denying the automatic payment scheduling.

In some use cases, cardholders receive electronic notifications of their statement's availability through messages, such as electronic mail messages. In these use cases, statements are accessible through a document center served by the Web. In some other use cases, cardholders receive electronic statements through the installment cardholder's app. Once logged-in, the user may navigate to the payment flow of the cardholder's account that in some apps is labeled "plan your payment" to settle a first billing cycle. The cardholder has the option to pay the outstanding balance in full at act 1416, as shown in FIG. 14 (which the cardholder elected not to do), make a partial payment and convert the remaining balance into an installment loan, or pay the full statement balance through an installment loan at act 1414. If the cardholder selects to pay some of or the full first statement balance through an installment loan having terms of three, six, nine or twelve months at act 1420, the loan is funded at act 1422, the payment is processed and the system transfers the funds charged for the transaction less the interchange fees and transaction fees to the merchant or recipient's bank or financial institution.

At the end of a second billing cycle, the system generates a second statement that summarizes the user transactions and account activity for the second billing cycle that can also be accessed through the app at acts 1424 and 1426. When the billing cycle ends, the installment card issuer calculates the outstanding balances for the billing cycle, which includes the outstanding installment balance, the loan valuation that reflects the principal amount of the loan, the interest rate fees, and the other associated fees charged to the loan when applicable. If the user elects to pay the outstanding balance for the second billing cycle, the system may require the user to pay the monthly installment amount the user elected in the first billing cycle and the full statement balance for the second billing cycle at act 1428 and act 1430. The cardholder must pay the monthly installment amount that user elected from the 1S t billing cycle by the statement due date. The cardholder can elect to pay any installment card and loan repayment amount at any given time. The payment amount will be allocated according to a waterfall structure. The exemplary waterfall structure allocates funds first to card balances past dues, then late fees due (if applicable), then the installment loan interest due, then toward the minimum payments due on the charge card, then the installment loan principal not yet due, then the remaining principal due on the credit card. If multiple installment loans are active, funds are allocated to the loan having the highest annual percentage rate and then the most senior debt. In FIG. 14, if the cardholder selects to pay some or the full statement balance through an installment loan having a terms of three, six, nine or twelve months at act 1432, the loan is originated and funded at act 1434, and the payment is processed. The system transfers the funds charged for the transaction, less the interchange fees and transaction fees to the merchant or recipient's bank or financial institution for the transactions occurring in the second billing cycle, and credits payment for the loan that originated in the first billing cycle at act 1434.

The exemplary mobile wireless device app provides many navigation interfaces that allow the exemplary installment card cardholder move between different functionalities of the system through visual representations. For example, clickable options are shown in the navigation bar represented by text and icons that correspond to different sections, pages, and functionality of the system accessible from the home page shown in FIG. 44. The different sections allow for returning to a home screen, accessing the phone, accessing transactions, and accessing the cardholder's profile through the navigation bar. Menus accessible through transactions icons expand to reveal functionality that manages the installment card, payment methods, personal information, provides answers to frequently asked questions, provides contact information, and provides access to a storage center or depository of various types of documents, including cardholder communications, installment card, system, and app disclosures, policies, procedures, manuals, and other files as reflected in FIGS. 44 and 49-52.

The exemplary installment card served by the system, mobile wireless device 5302 and app, functions like a charge card with back-end loan conversion option. The outstanding balance on the installment card needs to be paid off by its payment due date each month to avoid being charged with the cost of borrowing. The installment card has a revolving credit line and issues with a credit limit that cardholders can establish and can spend freely against it. As the cardholder repays outstanding balances, the cardholder's credit line replenishes. The outstanding balance may be converted into a repayment plan that has a set term with monthly payments after billing statement cycles.

The exemplary installment card provides cardholders full visibility into the cost of borrowing. A cardholder knows precisely the debt they are paying in dollars and has full visibility into a payment calendar feature on the mobile wireless device app showing when cardholder will be done paying off that debt. The installment card allows cardholders to hold themselves accountable to repay their transactions on a predefined time schedule. There are no never-ending revolving debt cycles or uncertainty around when cardholders will meet the cardholder's full debt obligations for the exemplary installment card. The exemplary installment card allows cardholders to control the term length and installment payment value that meet the their cash flow needs. A cardholder can enforce expenditure limits or spend caps to control how much the cardholder spends in any time period. Once approved, a cardholder can transact anywhere installments cards and/or credit cards are accepted, and the cardholder's credit line replenishes as the cardholder repays the cardholder's outstanding debt, without completing any additional credit applications or further qualification steps to apply for further credit.

The exemplary installment cards may be integrated into digital wallets and mobile payments services, allowing cardholders to make contactless payments through Near Field Communication (NFC), and secure element encryption with compatible wireless mobile devices (e.g., those devices compatible with operating system or wireless protocol of the wireless mobile device). In a physical store, cardholders hold their wireless mobile devices near the contactless terminal, while keeping their finger on the capacitive touch sensor embedded beneath a designated area of the mobile wireless device 5302 to provide a fingerprint authentication, or by providing a face identification through the facial recognition system of the mobile wireless device's camera and facial recognition software, or by providing another form of cardholder authentication. When the cardholder is authenticated, the mobile wireless device 5302 communicates with the contactless terminal through near field communication, the payment is securely authorized, and the contactless terminal sends an authorization request to the system or the acquirer's financial institution (e.g., the merchant's or recipient's bank).

Figure 52:
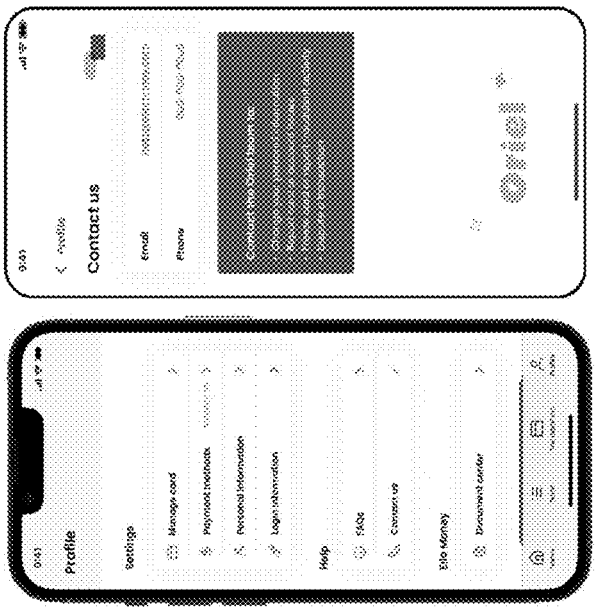
Figure 52:
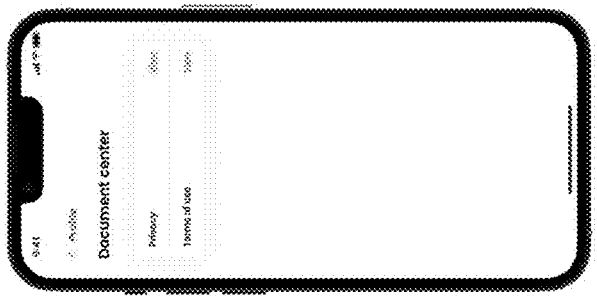
Figure 52:
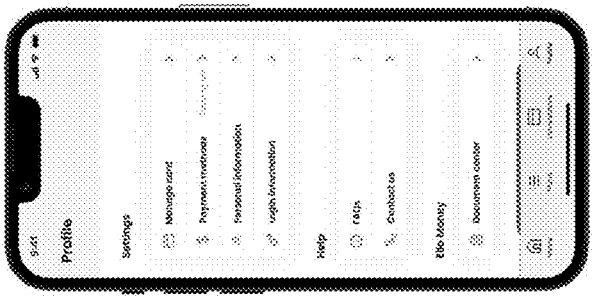

FIG. 53 is another exemplary architecture of the system that executes the process flows and/or performs the functions executed by the systems described herein and shown in FIGS. 1-52. The system comprises one or more processors 5314-5318, one or more non-transitory computer readable media, such as one or more memories 5320 (the contents of which are accessible by and executed by one or more of the processors 5314-5318, respectively), and I/O interface 5322. I/O interface 5322 connects devices and local and/or remote applications 5324, such as computer-mediated devices and other external applications. The one or more memories 5320 stores instructions, which, when executed by one or more of the processors 5314-5318 cause the system to render some or all of the functionality associated with the system. The one or more memories 5320 store instructions, which, when executed by the one or more processors 5314-5318, causes the computer readable medium to render the functionality associated with the backend networks 102 and 104, the translators 106 and 108, the Internet gateway 110, the traffic balancers 112 and 114, the storage service module 116, the container registries 118, the reverse proxies 120, the storage services 122 and 124, the domain name service module 126, the compute engines 128-134, the relational database service proxy 136 and 138, the open-source relational database management systems 140 and 142, the secrets manager module 144, the configuration management module 146, the firewall modules 148, the queue service module 150, the certificates manager module 152, the edge networks 154 and 156, the identity management services module 158, the email service module 160, the notification service module 162, the analytics module 164, the centralized storage module 166, the event queues 168 and 170, the application interface gateway module 172. The one or more memories 5320 also stores instructions, which, when downloaded to the mobile wireless devices offers the device and financial functionalities described herein. Some memories 5320 store apps 5330, speech recognition engines (also referred to as a speech recognition app) 5332, etc., which provide downloadable software applications to the mobile wireless device 5302 or to an app store. An app store is a digital platform where users can browse, download, and install software applications into the users' mobile wireless devices 5302, like smartphones, tablets, and other computing platforms.

The I/O interface 5322 connect the system to cloud resources and computing that server the message management module 202, monitoring and analytics platform module 204, the data warehouse 206, the orchestrator module 208, the middleware module 210, the credit reporting module 212, the application domain module 214.

Some mobile wireless devices 5302 interface the system through a wireless interface 5326. The mobile wireless devices 5302 include one or more processors that perform computational tasks and manage the mobile wireless device 5302, a subscriber identify module or SIM that provides user identification information to the wireless network, a memory for storing firmware, apps, etc., a touchscreen display that allows users to interact, view, and navigate content and apps, a camera for capturing images and video, a rechargeable battery that provides the energy to run the mobile wireless device's components and its sensors that include accelerometers, gyroscopes, magnetometers, for example, radio frequency components that enable wireless communication, audio components that receive and convey audio input, audio processors for command and word recognitions, connectivity modules including wireless fidelity (Wi-Fi), near field communication (NFC) and Bluetooth® (which is disclosed for solely descriptive purposes and does not imply any endorsement, affiliation, or an association with the trademarks or their owners), and/or wireless open source or proprietary mobile device operating systems, such as operating systems that sandboxing, the operating systems facilitate app installation, execution, and provide user interfaces.

The memories 5320 and/or storage that include the databases disclosed herein may retain an ordered listing of executable instructions for implementing the functions described above in a non-transitory computer code or computer media code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memories 5320 comprise a single device or multiple devices that may be disposed on one or more dedicated memory devices or be part of a processor or other similar device. The disclosed engines may comprise a processor or a portion of a software program that executes or performs specific tasks and operations and supports information exchanges. When functions, steps, etc. are said to be "responsive to" or occur "in response to" another function or step, etc., the functions or steps necessarily occur as a result of another function or step, etc. It is not sufficient that a function or act merely follow or occur subsequent to the result or the another function. Computer-mediated technology enables human communication that occurs through two or more electronic devices. The devices may provide input from various sources, including, but not limited to, audio, text, images, video, augmented reality, etc. The term "environment" refers to the collection of resources served by a network serving a public resource.

While each of the systems and methods shown and described herein operate automatically and operate independently, they also may be encompassed within other systems and methods, including any number of iterations of some or all of the process used to process tasks and/or execute transactions such as serving an installment card program, for example. Alternate systems may include any combinations of structure and functions described or shown in one or more of the FIGS. These systems are formed from any combination of structures and functions described. The structures and functions may process additional or different input. For example, each of the systems described may process speech (e.g., spoken utterances). The systems that process speech include automatic speech recognition engines and/or platforms that serve computer-mediated technology and speech applications. A speech application, which is often run independently and remote from a speech platform and speech engine, interacts with users through computer-mediated technology. The speech application provides input to the speech platform that passes spoken utterances to a speech engine. The speech engine 5332 converts the spoken utterance to a representation, compares the representation of the spoken utterance to a vocabulary, and matches the representation to a vocabulary of words. The speech engine 5332 returns its interpretation of the spoken utterance, process commands, intents and related sub-entities, confidence scores of the intents and in some instances confidence scores of the related sub-entities, etc., as a recognition result. The recognition result is passed back to the background or foreground mobile wireless device app and/or backend networks 102 and 104 to execute the functions described in each of the embodiments and shown in each of the FIGS. separately, described in the written disclosure and/or in combination.

In some architectures, systems can interface physical enterprise systems and/or from a network resource and/or a virtual private and/or public cloud. Once connected to an on-premise physical network, the systems adds script reference tags to the hosting site and stored hypertext markup language (HTML) elements and page templates. The system workspace maps information to predefined object properties. When information is not available, the backend networks 102 and 104, apps and/or their proxies, generates or harvests the required information. In operation, the hosting site passes information to a system interface with data posting with an activation (e.g., a click) of a relative and/or absolute pointing device. The destination leverages data fill, its processors, its intelligence engines, and/or default modules to return a resource, such as an offered installment card or an installment loan in an exemplary transaction context.

Some systems include high-performance processors that include artificial intelligence (AI) that allow the disclosed apps and/or enterprise system decision making. These systems perform functions that characterize human thought through trained neural network engines. The systems include one or more neurons that communicate with artificial intelligence elements modeled after dendrites and axons. While some systems are layer based using convolutional neural networks other systems use neuromorphic computing processors that are structured as pipeline sections in which the output of one module such as a synapse module, a dendrite module, a neuron module, and/or an axon module is an input to another module in this exemplary neural network engines. The systems are event-driven that allow for functions to be interchangeably coupled to each other. Each element of the system is responsible for its domain and transmits events when actions occur without caring about how those events or other events are being processed by other stages of the neural network.

The functions, acts, and/or tasks illustrated in the FIGS. or otherwise described may be executed in response to one or more sets of logic or instructions stored in or on the non-transitory computer readable media. The functions, acts, and/or tasks are independent of the particular type of instructions set, storage media, processor or processing strategy and may be performed by software, hardware, integrated circuits, firmware, micro code and the like, operating alone or in combination.

Alternate systems are not limited to the particular hardware, processes, and/or algorithms described herein. Other suitable hardware, processes, and algorithms can be used. The systems can serve other systems across local and distributed networks and serve services without calls to vendor processors. For example, the vendor functionality and/or vendor processors are served by one or more of systems processors 5314-5318 and/or the backend networks 102 and 104, and other functionality are moved to or provided by the corresponding physical components and/or functionality associated with the elements shown in FIG. 1. For the sake of clarity, some of the descriptions intentionally omit certain components shown that are involved in executing the described functionality. As a result, not all components explicitly shown in the systems of FIGS. 1 and 2 are explicitly described with respect to the exemplary use cases. Nonetheless, the omitted components are necessarily disclosed and part of alternative embodiments as the omitted components that interface the described components facilitate the disclosed functionality. For example, the reverse proxy 120 communicates with the application domain modules through an Internet gateway 110, traffic balances 112 and 114, and/or backend networks 102 and 104 in an alternative embodiment. Further, public traffic flows through the expressed firewalls 148 and some traffic flows to the functional firewalls as well (e.g., 106 and 108 of FIG. 1).

The systems illustratively disclosed herein may be suitably practiced in the absence of any element or module (e.g., hardware and/or software), and in the absence of some or all of the described functions association with a process step or component or structure of a system that are expressly described. The systems may operate in the absence of one or more of those process steps, elements and/or any subset of the expressed functions. Further, the various elements described in each of the many systems described herein are regarded as divisible with regard to the individual elements described, rather than inseparable as a whole. In other words, alternate systems encompass any variation and combinations of elements, components, and process steps described herein and may be made, used, or executed without the various elements described (e.g., they operate in the absence of any element, including those elements, systems and/or processes or certain process steps or elements disclosed in the prior art including those not expressly disclosed herein).

Other alternative systems execute continuous integration/continuous deployment tools that comprise software solutions that automate the disclosed processes, integrate code changes, build applications, and/or deploy the applications in the production environment. Some systems also use tools to install, configure, manage, and deploy the infrastructure through provisioners. To ensure that from different sources can be consolidated, standardized, and accessible in a unified form, some alternate systems execute extract, transform, and load processes for data integration and data warehousing, The process extracts data from disparate sources, transforms it into a consistent format, and loads it into one or more databases through interfaces relational database service proxy instances 136 and open-source relational database management systems 140 and 142, for example. Each of the disclosed systems may communicate through email, text messages (Short Message Service) and/or telephone calls allowing users to communicate quickly and efficiently through virtually all mobile phone and/or telephone networks. In some systems, customer interactions are tracked though a ticketing system. When a unique issue arises, a unique number is assigned to that issue in the form of a ticket that may also contain information about a customer request, customer details, the priority level, and/or other associated information such as those conveyed by notes and attachments.

Other alternative systems may also include business intelligence reporting software that collects, analyzes, and presents data in a structured format. The systems transform the data through data models that may identify patterns, trends, and connections such as by applying statistical analysis and machine learning and/or neural networks to derive insight from the data. Some systems generate visualizations that are designed to effectively communicate the data. Some alternative systems further mange customer and/or user interactions though customer relationship management software and/or tools that store and/or organize user data that enables the system to track, manage, and support users and derive a holistic understanding of the.

The systems are stand-alone, independent, or a unitary part of a system programmed to execute specific tasks repeatedly. The systems render a seamless user experience that avoids the questions and form fatigue most users experience. The system's flexible integration minimizes enterprise effort and abstracts away complexity for adopting systems while improving transaction completions. The interface gateway module 172 shields the backend networks 102 and 104 from software and other remote device dependencies or the complexities of executing the underlying software that provide the resources and services, and/or executes the tasks and/or transactions. In some applications, the interface gateway modules 172 focus on coordination and distribution by a secure architecture.

The systems deliver content and services to users. The systems improve response times and scale loads across multiple geographic regions. When regulations necessitate compliance with specific geographic regions, the systems' edge resources ensure data sovereignty, meaning that the systems' processing and data are in compliance with the laws and regulations that govern the geographic regions servicing the users. The systems' dynamic infrastructure allow the systems to interface state of the art platforms cost effectively. The systems' seamless compatibility ensures efficient data management, storage, and security.

The systems conserve IP addresses and facilitate connections to multiple external devices on publicly accessible distributed networks like the Internet by a process that replaces a network's IP addresses with a single IP address that conserves IP addresses. The conservation enhances security by making the translators 106 and 108 software firewalls that hide the location of the devices/software services they serve, which prevents direct access to them. Network management is improved by connecting some or all of the devices to the Internet without assigning unique IP addresses to each of the devices.

Some disclosed mobile wireless apps integrate with and/or monitor other apps even when operating in the background to provide additional services and functionality the originating apps do not provide. For example, some alternate mobile wireless device apps running in the background provide additional functionalities and services, such as processing payment through installment loan cards, allowing users to complete merchant transactions with an installment loan directly from a merchant's app like a credit card. Using a contextual awareness, some mobile wireless device background apps supplement the discrete functions that some apps and wireless mobile device provide or do not provide for apps that operate in an unrestricted operating environments and apps that are confined to or sandboxed in a restricted operating environment.

Some systems train neural networks to perform certain functions that characterize human thought. The neural network's parallel processing, learning, and adaptation, and automatic extraction of relevant information allows the systems to process information in a manner similar to human perception. In some use cases, the neural networks manage user resources and make recommendations. In other use cases, the neural networks detect pre-failure and/or failure conditions and detect trends and patterns that predict unstable conditions, and in some instances, mitigate the system failures before they occur by offloading the processing before the instability or the failures occur. The system's further mitigate these conditions by sometimes restricting communication with infected/failing components, quarantining components, and/or wiping, rebuilding, and/or replacing hardware and/or software components.

The subject-matter of the disclosure may also relate, among others, to the following aspect or aspects (referenced by numbers):

1. A scalable system that delivers local access to remote resources and remote data across multiple geographic regions comprising:
   a parallel circuit that transfers data between a plurality of components;
   a volatile memory;
   one or more processors that reads to and writes to the volatile memory;
   a computer readable medium storing a program in a non-transitory media that provides access to a plurality of remote resources locally by:
   processing a plurality of requests received from a plurality of different computer devices remote from the one or more processors from a publicly accessible distributed network that is addressed to a single device address within a backend network;
   generating routing commands based on a content of a payload of packets being processed, a protocol used to deliver data, or detections of one or more data types; and
   routing the plurality of requests from the plurality of different computer devices remote to the one or more processors to a plurality of intended devices based on the single device address; the plurality of intended devices executes different computer functions and communicate with each other through a local area network;
   the plurality of different computers includes physical devices and a plurality of endpoints that sever as a plurality of entry points for accessing cloud served computer functionality.
2. The system of aspect 1 where access to a plurality of remote resources occurs through a translation table.
3. The system of aspect 1 where the routing commands are based on a plurality of headers.
4. The system of aspect 1 where the routing commands are based on real-time network conditions.
5. The system of aspect 1 where the computer readable medium detects a failure of the one or more processors before the one or more processors fail by a predictive anomaly analytics system monitoring operating conditions of one or more processors during a normal operating period.
6. The system of any of aspect 5 where the computer readable medium diverts the data to a stable system before the one or more processors fail through the predictive anomaly analytics system
7. The system of aspect 5 where the predictive anomaly analytics comprises a neural network.
8. The system of aspect 6 where the computer readable medium stores training and evaluation data and respective target labels that exclude data representing authentication failures, data representing recovery conditions of the one or more processors, and data that are indicators of transitory events that train and validate a neural network.
9. The system of any of aspects 2, 3, 4, 5, 6, 7, and/or 8 where the computer readable medium further predicts future user behavior and renders information that modifies user behavior by suggesting transactions though a predictive service analytics systems.
10. The system of aspect 9 where the predictive service analytics systems issues commands to the one or more processors that prevent a fraudulent transaction.
11. The system of aspect 9 where the predictive service analytics systems issues commands to the one or more processors that recommend products.
12. The system of any of aspects 2, 3, 4, 5, 6, 7, 8, 9, 10, and/or 11 where the computer readable medium stores an app downloadable through an app store that monitors a second app on a mobile wireless device when downloaded to the mobile wireless device and responds to a request made to the second app by serving a response to a user of second app when in a background state.
13. The system of aspect 12 further comprising detecting the request made to the second app by detecting a launch of the second app.
14. The system of aspect 12 where the second app runs in a sandbox that prevents other apps from tracking activities.
15. The system of aspect 12 where the request is recognized by a speech recognition engine running on the mobile wireless device.
16. The system of aspect 12 where the second app comprises a software program that functions like a charge card but offer a back-end loan conversion.
17. The system of aspect 16 where the app enables the mobile wireless device to execute a payment for a transaction through a capacitive touch engagement.
18. The system of aspect 16 where the app enables the mobile wireless device to execute a payment through a facial recognition.
19. The system of any of aspects 2, 3, 4, 5, 6, 7, 9, 10, 11, 12, 13, 14, 15, 16, 17, and/or 18 further includes an access token generator that generates an access token provides a plurality of credentials and authentication to access the plurality of devices.
20. The system of aspect 19 where the access token include a tracking code that identifies a plurality of user devices and identifies a user's active device from the user's plurality of devices.
21. A scalable system that delivers local access to remote resources and remote data across multiple geographic regions comprising:
    a parallel circuit that transfers data between a plurality of components;
    a volatile memory;
    one or more processors that reads to and writes to the volatile memory;
    a computer readable medium storing a program in a non-transitory computer media accesses a plurality of remote resources locally by:
    processing a plurality of requests received from a plurality of computer devices remote from the one or more processors from a publicly accessible distributed network that is addressed to a single device address within a backend network;
    generating routing commands based on a translation table of the backend network or content of a payload of packets being processed, a protocol used to deliver the data, and detections of one or more data types; and
    routing the plurality of requests from the plurality of computer devices remote to the processor to a plurality of intended devices based on the single device address; the plurality of intended devices executes different computer functions and communicate with each other through a local area network;

the plurality of computer devices includes physical devices and a plurality of endpoints that sever as a plurality of entry points for accessing cloud served computer functionality.

22. The system of aspect 21 where access to a plurality of remote resources occurs through a translation table.

23. The system of aspect 21 where the routing commands are based on a plurality of headers.

24. The system of aspect 21 where the routing commands are based on real-time network conditions.

25. The system of aspect 21 where the computer readable medium detects a failure of the one or more processors before the one or more processors fail by a predictive anomaly analytics system monitoring operating conditions of one or more processors during a normal operating period.

26. The system of any of aspects 21, 22, 23, and/or 24 where the computer readable medium diverts the data to a stable system before the one or more processors fail through the predictive anomaly analytics system 27. The system of aspect 25 where the predictive anomaly analytics comprises a neural network.

28. The system of aspect 27 where the computer readable medium stores training and evaluation data and respective target labels that exclude data representing authentication failures, data representing recovery conditions of the one or more processor, and data that are indicators of transitory events that train and validate the neural network.

29. The system of aspect 21 where the computer readable medium further predicts future user behavior and renders information that modifies user behavior by suggesting transactions though a predictive service analytics systems.

30. The system of aspect 29 where the predictive service analytics systems issues commands to the one or more processors that prevent a fraudulent transaction.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A scalable system that delivers local access to remote resources and remote data across multiple geographic regions comprising:
a parallel circuit that transfers data between a plurality of components;
a volatile memory;
one or more processors that reads to and writes to the volatile memory;
a computer readable medium storing a program in a non-transitory media that provides access to a plurality of remote resources locally by:
processing a plurality of requests received from a plurality of different computer devices remote from the one or more processors from a publicly accessible distributed network that is addressed to a single device address within a backend network;
generating routing commands based on a content of a payload of packets being processed, a protocol used to deliver data, or detections of one or more data types; and
routing the plurality of requests from the plurality of different computer devices remote to the one or more processors to a plurality of intended devices based on the single device address and the routing commands; the plurality of intended devices executes different computer functions and communicate with each other through a local area network;
the plurality of different computer devices includes physical devices and a plurality of endpoints that serve as a plurality of entry points for accessing cloud served computer functionality.

2. The system of claim 1 where access to a plurality of remote resources occurs through a translation table.

3. The system of claim 1 where the routing commands are based on a plurality of headers.

4. The system of claim 1 where the routing commands are based on real-time network conditions.

5. The system of claim 1 where the computer readable medium detects a failure of the one or more processors before the one or more processors fail by a predictive anomaly analytics system monitoring operating conditions of one or more processors during a normal operating period.

6. The system of claim 5 where the computer readable medium diverts the data to a stable system before the one or more processors fail through the predictive anomaly analytics system.

7. The system of claim 5 where the predictive anomaly analytics comprises a neural network.

8. The system of claim 6 where the computer readable medium stores training and evaluation data and respective target labels that exclude data representing authentication failures, data representing recovery conditions of the one or more processors, and data that are indicators of transitory events that train and validate a neural network.

9. The system of claim 1 where the computer readable medium further predicts future user behavior and renders information that modifies user behavior by suggesting transactions through a predictive service analytics systems.

10. The system of claim 9 where the predictive service analytics systems issues commands to the one or more processors that prevent a fraudulent transaction.

11. The system of claim 9 where the predictive service analytics systems issues commands to the one or more processors that recommend products.

12. The system of claim 1 where the computer readable medium stores an app downloadable through an app store that monitors a second app on a mobile wireless device when downloaded to the mobile wireless device and responds to a request made to the second app by serving a response to a user of second app when in a background state.

13. The system of claim 12 further comprising detecting the request made to the second app by detecting a launch of the second app.

14. The system of claim 12 where the second app runs in a sandbox that prevents other apps from tracking activities.

15. The system of claim 12 where the request is recognized by a speech recognition engine running on the mobile wireless device.

16. The system of claim 12 where the second app comprises a software program that functions like a charge card but offer a back-end loan conversion.

17. The system of claim 16 where the app enables the mobile wireless device to execute a payment for a transaction through a capacitive touch engagement.

18. The system of claim 16 where the app enables the mobile wireless device to execute a payment through a facial recognition.

19. The system of claim 1 further includes an access token generator that generates an access token provides a plurality of credentials and authentication to access a user's plurality of devices.

20. The system of claim 19 where the access token include a tracking code that identifies a plurality of user devices and identifies a user's active device from the user's plurality of devices.

21. A scalable system that delivers local access to remote resources and remote data across multiple geographic regions comprising:
- a parallel circuit that transfers data between a plurality of components;
- a volatile memory;
- one or more processors that reads to and writes to the volatile memory;
- a computer readable medium storing a program in a non-transitory computer media accesses a plurality of remote resources locally by:
- processing a plurality of requests received from a plurality of computer devices remote from the one or more processors from a publicly accessible distributed network that is addressed to a single device address within a backend network;
- generating routing commands based on a translation table of the backend network or content of a payload of packets being processed, a protocol used to deliver the data, and detections of one or more data types; and
- routing the plurality of requests from the plurality of computer devices remote to the processor to a plurality of intended devices based on the single device address and the routing commands; the plurality of intended devices executes different computer functions and communicate with each other through a local area network;
- the plurality of computer devices includes physical devices and a plurality of endpoints that sever as a plurality of entry points for accessing cloud served computer functionality.

22. The system of claim 21 where access to a plurality of remote resources occurs through a translation table.

23. The system of claim 21 where the routing commands are based on a plurality of headers.

24. The system of claim 21 where the routing commands are based on real-time network conditions.

25. The system of claim 21 where the computer readable medium detects a failure of the one or more processors before the one or more processors fail by a predictive anomaly analytics system monitoring operating conditions of one or more processors during a normal operating period.

26. The system of claim 25 where the computer readable medium diverts the data to a stable system before the one or more processors fail through the predictive anomaly analytics system.

27. The system of claim 25 where the predictive anomaly analytics system comprises a neural network.

28. The system of claim 27 where the computer readable medium stores training and evaluation data and respective target labels that exclude data representing authentication failures, data representing recovery conditions of the one or more processor, and data that are indicators of transitory events that train and validate the neural network.

29. The system of claim 21 where the computer readable medium further predicts future user behavior and renders information that modifies user behavior by suggesting transactions through a predictive service analytics systems.

30. The system of claim 29 where the predictive service analytics systems issues commands to the one or more processors that prevent a fraudulent transaction.

* * * * *